United States Patent
Ishimoto et al.

(10) Patent No.: US 6,826,465 B2
(45) Date of Patent: Nov. 30, 2004

(54) INFORMATION DISPLAY DEVICE AND DISPLAY CONTROL DEVICE FOR CONSTRUCTION MACHINE

(75) Inventors: Hidefumi Ishimoto, Tsuchiura (JP); Hiroshi Ogura, Ryugasaki (JP); Hiroshi Watanabe, Ushiku (JP); Hiroyuki Adachi, Tsuchiura (JP); Tsuyoshi Sakyou, Ibaraki-ken (JP)

(73) Assignee: Hitachi Construction Machinery Co., Ltd., Tokyo (JP)

(*) Notice: Subject to any disclaimer, the term of this patent is extended or adjusted under 35 U.S.C. 154(b) by 0 days.

(21) Appl. No.: 10/169,934

(22) PCT Filed: Nov. 28, 2001

(86) PCT No.: PCT/JP01/10372
§ 371 (c)(1),
(2), (4) Date: Jul. 11, 2002

(87) PCT Pub. No.: WO02/44480
PCT Pub. Date: Jun. 6, 2002

(65) Prior Publication Data
US 2003/0001750 A1 Jan. 2, 2003

(30) Foreign Application Priority Data
Nov. 29, 2000 (JP) .......................... 2000-363745

(51) Int. Cl.[7] ............... E02F 9/00; G06F 17/00
(52) U.S. Cl. ............... 701/50; 701/1; 340/459
(58) Field of Search ............... 701/50, 1, 29; 340/438, 439, 459, 462

(56) References Cited

U.S. PATENT DOCUMENTS

| 5,854,988 A | | 12/1998 | Davidson et al. |
| 5,956,255 A | * | 9/1999 | Flamme ............... 700/244 |
| 6,039,141 A | * | 3/2000 | Denny ............... 180/329 |
| 6,275,231 B1 | * | 8/2001 | Obradovich ............... 345/970 |
| 6,349,252 B1 | * | 2/2002 | Imanishi et al. ............... 701/50 |

FOREIGN PATENT DOCUMENTS

| JP | 5-287782 | 11/1993 |
| JP | 5-288648 | 11/1993 |
| JP | 10-103925 | 4/1998 |
| JP | 11-69258 | 3/1999 |
| JP | 11-81393 | 3/1999 |
| JP | 11-286971 | 10/1999 |

* cited by examiner

Primary Examiner—Michael J. Zanelli
(74) Attorney, Agent, or Firm—Mattingly, Stanger & Malur, P.C.

(57) ABSTRACT

An information display unit is provided inside a cab of a hydraulic excavator and has a display portion capable of displaying plural kinds of information including body information and maintenance information. A screen image has one main screen and a plurality of sub-screens. The main screen displays information regarding one of a plurality of information categories in detail and the plurality of sub-screens respectively correspond to th plurality of information categories. The information category displayed on the main screen can be selected and changed with key manipulation made on an operating portion. As a result, plural kinds of information can be displayed in a combined and selective manner, and an operator is able to confirm the information with higher efficiency.

11 Claims, 57 Drawing Sheets

FIG.3

| COMMUNICATION DATA NAME | | | COMMON COMMUNICATION LINE | | | | | | | |
|---|---|---|---|---|---|---|---|---|---|---|
| ID No | DATA NAME | SYMBOL | FIRST CONTROL UNIT | SECOND CONTROL UNIT | THIRD CONTROL UNIT | FOURTH CONTROL UNIT | FIRST MONITORING UNIT | SECOND MONITORING UNIT | DISPLAY UNIT | COMMUNICATION CYCLE |
| 101 | TARGET ENGINE REVOLUTION SPEED | Nr | ○ | ● | | | | | | 50mS |
| 102 | ENGINE REVOLUTION SPEED | Ne | ○ | ● | | | | ● | ● | 20mS |
| 103 | ENGINE HYDRAULIC PRESSURE | Poil | ○ | | | | | ● | ● | 1S |
| 104 | COOLING WATER TEMPERATURE | Tw | ○ | | | | | ● | ● | 1S |
| 201 | PUMP DELIVERY PRESSURE | Pd | | ○ | | | | ● | | 1S |
| 202 | PUMP TILTING ANGLE | θ | | ○ | | | | ● | | 1S |
| 203 | HYDRAULIC FLUID TEMPERATURE | To | | ○ | | | | ● | ● | 1S |
| 301 | OPERATING SIGNAL | X1 | | ● | ○ | ● | | | | 10mS |
| 302 | ″ | X2 | | ● | ○ | ● | | ● | | 10mS |
| 303 | ″ | X3 | | ● | ○ | ● | | | | 10mS |
| 304 | ″ | X4 | | ● | ○ | | | ● | | 10mS |
| 305 | ″ | X5 | | ● | ○ | | | ● | | 10mS |
| 306 | ″ | X6 | | ● | ○ | | | ● | | 10mS |
| 307 | ″ | X7 | | ● | ○ | | | ● | | 10mS |
| 701 | DRIVING SIGNAL | Yβ | | | ● | ○ | | | | 10mS |
| 702 | ″ | Yα | | | ● | ○ | | | | 10mS |
| 703 | ″ | Yγ | | | ● | ○ | | | | 10mS |
| 704 | BOOM ANGLE | β | | | | ○ | | | ● | 100mS |
| 705 | ARM ANGLE | α | | | | ○ | | | ● | 100mS |
| 706 | BUCKET ANGLE | γ | | | | ○ | | | ● | 100mS |
| 707 | BUCKET END DEPTH | hx | | | | ○ | | | ● | 100mS |
| 708 | BUCKET END REACH | hy | | | | ○ | | | ● | 100mS |
| 709 | BODY TILT ANGLE | ξ | | | | ○ | | | ● | 100mS |
| 401 | FILTER PRESSURE | Pflt | | | | | ○ | ● | ● | 1S |
| 402 | FUEL LEVEL | Fuel | | | | | ○ | ● | ● | 1S |
| 502 | TIME OF DAY | Time | | | | | | ○ | ● | UPON DISPLAY MANIPULATION |
| 504 | ABNORMALITY DETECTION HISTORY | HisW | | | | | | ○ | ● | UPON DISPLAY MANIPULATION |
| 506 | WORKING TIME (KEY ON) | TmwKey | | | | | | ○ | ● | UPON DISPLAY MANIPULATION |
| 507 | WORKING TIME (ENGINE ON) | TmwEng | | | | | | ○ | ● | UPON DISPLAY MANIPULATION |
| 508 | WORKING TIME (EXCAVATION) | TmwExc | | | | | | ○ | ● | UPON DISPLAY MANIPULATION |
| 509 | WORKING TIME (TRAVEL) | TmwRun | | | | | | ○ | ● | UPON DISPLAY MANIPULATION |
| 510 | WORKING TIME (SWING) | TmwRot | | | | | | ○ | ● | UPON DISPLAY MANIPULATION |
| 511 | WORKING TIME (ML) | TmwML | | | | | | ○ | ● | UPON DISPLAY MANIPULATION |
| 512 | WORKING TIME (ATT) | TmwATT | | | | | | ○ | ● | UPON DISPLAY MANIPULATION |
| 513 | ENGINE REVOLUTION SPEED DISTRIBUTION | HistEng | | | | | | ○ | ● | UPON DISPLAY MANIPULATION |
| 514 | COOLING WATER TEMPERATURE DISTRIBUTION | HistTw | | | | | | ○ | ● | UPON DISPLAY MANIPULATION |
| 515 | HYDRAULIC FLUID TEMPERATURE DISTRIBUTION | HistTo | | | | | | ○ | ● | UPON DISPLAY MANIPULATION |
| 516 | PUMP LOAD DISTRIBUTION | HistPld | | | | | | ○ | ● | UPON DISPLAY MANIPULATION |
| 517 | EXCAVATION LOAD DISTRIBUTION | HistEld | | | | | | ○ | ● | UPON DISPLAY MANIPULATION |
| 601 | TARGET LOCUS | hr | | | | ● | | | ○ | 100mS |
| 602 | AUTOMATIC OPERATION COMMAND | Cauto | | | | ● | | | ○ | 100mS |

TRANSMIT : ○  RECEIVE : ●

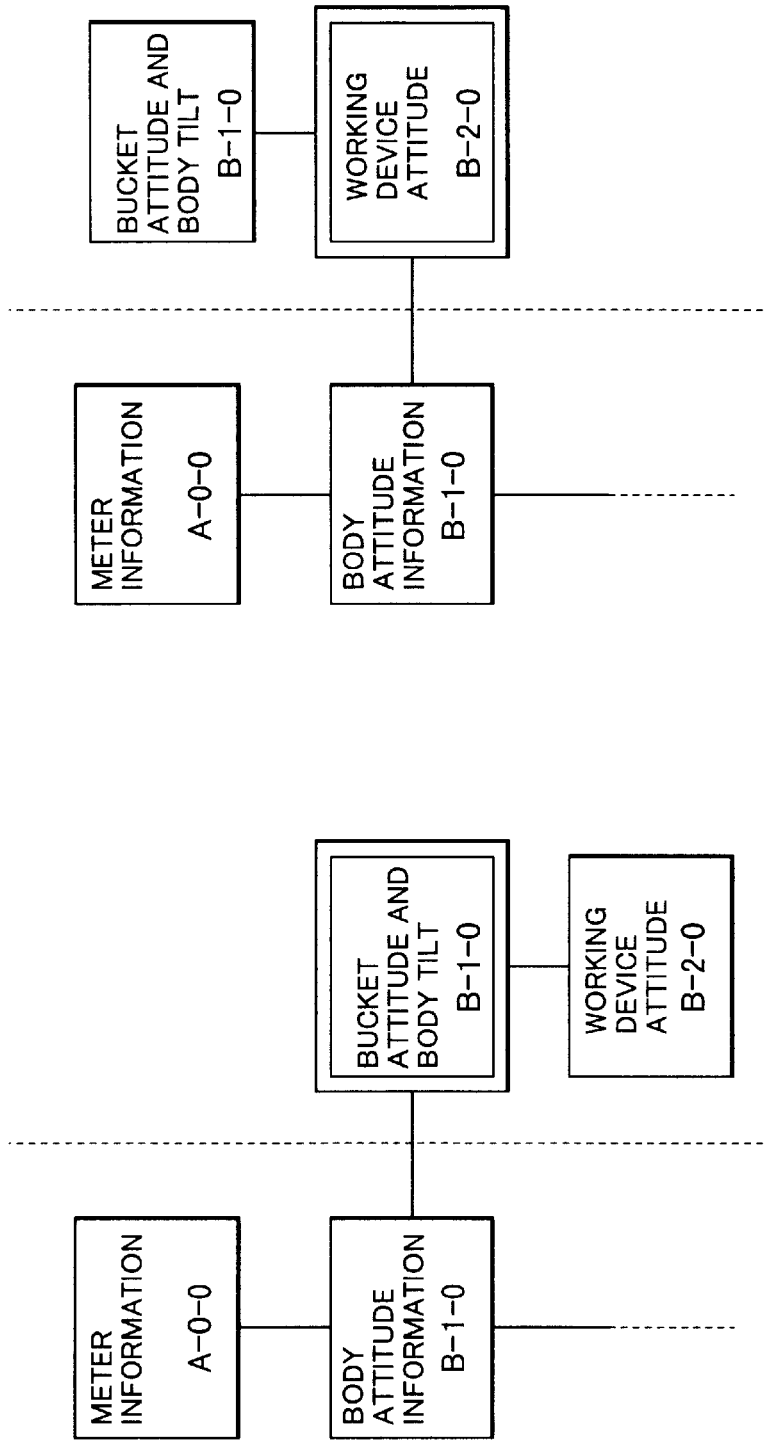

INFORMATION DISPLAY DEVICE AND DISPLAY CONTROL DEVICE FOR CONSTRUCTION MACHINE

TECHNICAL FIELD

The present invention relates to an information display unit for a construction machine and a display control unit. More particularly, the present invention relates to an information display unit for a construction machine, which is provided in a cab of the construction machine and is capable of displaying plural kinds of information such as body information and maintenance information, as well as to a display control unit for the information display unit.

BACKGROUND ART

Recently, construction machines including hydraulic excavators, cranes, tunnel excavators, crushers for wood, rocks, etc., or soil amending machines for amending the contaminated soil and the soil in sterile land have been practiced in the more advanced electronic form with further improvements of performance and an increase of functions. Also, for the purpose of facilitating management of body information, increasing the work efficiency, or improving maintenance, electronic control units have been developed and mounted for each of various functions. Those electronic control units have respective devices for providing information to an operator. In other words, the functions and number of information providing devices provided in a cab have been increased. This gives rise to problems in that a burden imposed on the operator is increased with an increase in the number of items of information and more complicated manipulation, that it becomes difficult to mount necessary electronic control units within a limited space in the cab with an increase in the number of the electronic control units, and that plural types of information providing devices independent for each function must be developed and mounted, thus resulting in an increased cost. To overcome those problems, a display unit is proposed which displays plural kinds of information on one display screen in a concentrated way.

For example, JP-A 5-288648 discloses a managing and monitoring unit which has a plurality of display modes for displaying body working information, maintenance information, etc., and which is capable of changing the contents to be displayed upon switch manipulation.

Also, JP-A 5-287782 discloses a multi-function display monitoring system in which a display panel comprises a display portion and a switch portion. The monitoring system monitors excavation situations of an excavator, such as a power shovel, and displays a symbolic illustration in imitation of the excavator along with numerical information. The contents of displayed information regarding the front attitude can be changed upon switch manipulation.

Further, JP-A 10-103925 discloses an excavation control method employing an excavation information monitoring unit for an excavator, in which the contents to be displayed are changed with a touch panel.

DISCLOSURE OF INVENTION

In construction machines, for the purpose of facilitating management of body information, increasing the work efficiency, or improving maintenance, the functions and number of information providing devices provided in a cab have been increased. To cope with such a tendency, a display unit for displaying plural kinds of information on one display screen in a concentrated way is proposed, but there are several problems with techniques so far proposed for displaying information.

With the monitoring unit disclosed in JP-A 5-288648, a plurality of display modes are selectively changed depending on a vehicle status or in response to an operation instruction, and an image having the contents corresponding to the selected display mode is displayed on one screen. However, because the contents displayed on the screen are completely altered with a display mode change, the operator cannot see plural kinds of information at the same time, for example, by additionally displaying maintenance information while working information is being displayed.

Also, the monitoring units disclosed in JP-A 10-103925 and JP-A 5-287782 similarly display information of one function only, such as body information of an excavator, on one screen, and alter the displayed contents by changing an entire image on the screen.

Further, because those monitoring units are mounted in the cab as equipment independent of an ordinary instrument panel, the operator must carefully look at both the ordinary instrument panel and the monitoring unit depending on situations. This point has invited problems in viewpoints of operability and safety.

It is an object of the present invention to provide an information display unit for a construction machine and a display control unit for the information display unit, which can display plural kinds of information in a combined and selective manner and enable an operator to confirm the information with higher efficiency.

(1) To achieve the above object, the present invention provides an information display unit for a construction machine, the information display unit being provided inside a cab of a construction machine and having a display portion capable of displaying plural kinds of information including body information and maintenance information, wherein a screen image displayed on the display portion comprises one main screen and a plurality of sub-screens; the main screen displays information regarding one of a plurality of information categories in detail; the plurality of sub-screens correspond to at least the information categories other than the information category, for which information is displayed on the main screen in detail, and display information regarding the corresponding information categories in the simplified form; and input means for selecting and changing the information category to be displayed on the main screen is provided, whereby with manipulation of the input means, information regarding the category displayed in one of the plurality of sub-screens is displayed on the main screen in detail and information regarding the category, which has been so far displayed on the main screen, is displayed in arbitrary one of the plurality of sub-screens in the simplified form.

Thus, by providing one main screen and a plurality of sub-screens, displaying a plurality of information categories in the detailed and simplified forms, and enabling plural items of displayed information to be changed from one to another, it is therefore possible to display plural kinds of information in a combined and selective manner, and to improve efficiency at which the operator confirms the information.

(2) In above (1), preferably, the main screen has a size occupying a substantial proportion of the display portion, and the plurality of sub-screens are smaller than the main screen.

With that feature, plural kinds of information can be efficiently displayed in one screen image.

(3) In above (1), preferably, the plurality of sub-screens display typical information contained in the corresponding information category.

With that feature, the information regarding the corresponding category can be displayed in the simplified form.

(4) In above (1), preferably, at least one of the plurality of information categories includes combination of plural items of sub-category information belonging to the relevant information category, the main screen selectively displays at least one of the plural items of sub-category information, and the sub-category information displayed on the main screen is selected and changed with manipulation of the input means.

With those features, it is possible to increase the number of kinds of information categories that can be displayed on the main screen, and to display plural kinds of information in a combined and selective manner.

(5) In above (1), preferably, a screen image displayed on the display portion has a main display area and a sub-display area that are located in preset positions, the main display area displaying the main screen, the sub-display area displaying the plurality of sub-screens, and the plurality of sub-screens are disposed respectively corresponding to the plurality of information categories.

With those features, the main screen and the sub-screens are displayed in respective constant positions so that the operator can see those screens with more ease.

(6) In above (5), preferably, one of the sub-screens in the sub-display area corresponding to one of the information categories, for which information is displayed on the main screen in the main display area in detail, displays symbolic illustrations for operation guide, which are in imitation of arrow keys and serve as aids for changing the information categories from one to another with manipulation of the input means.

With that feature, the information category displayed in the main display area can be easily changed with manipulation of the input means.

(7) In above (5), preferably, the plurality of sub-screens in the sub-display area serve as index tags for the information-categories displayed on the main screen in the main display area, and are designed with layout in imitation of index tags for the main display area.

With that feature, the information category displayed in the main display area can be easily selected by utilizing the sub-screens as guide tags.

(8) In above (5), preferably, at least one of the plurality of information categories includes combination of plural items of sub-category information belonging to the relevant information category, the main screen in the main display area selectively displays at least one of the plural items of sub-category information, and the sub-category information displayed on the main screen is selected and changed with manipulation of the input means.

With those features, it is possible to increase the number of kinds of information categories that can be displayed in the main display area, and to display plural kinds of information in a combined and selective manner.

(9) In above (8), preferably, when at least one of the plural items of sub-category information is displayed on the main screen in the main display area, one of the sub-screens in the sub-display area corresponding to the information category, to which the displayed sub-category information belongs, displays symbolic illustrations for operation guide, which are in imitation of arrow keys and serve as aids for changing the information category with manipulation of the input means, and that one sub-screen and the main display area display symbolic illustrations for operation guide, which are in imitation of arrow keys and serve as aids for changing the sub-category information with manipulation of the input means.

With those features, even with an increase in the number of kinds of information to be displayed, the information displayed in the main display area can be easily changed with manipulation of the input means.

(10) In above (1), preferably, the plurality of information categories include at least meter information and abnormality warning information.

With that feature, the operator is not required to carefully look at an instrument panel separately mounted inside the cab for confirming the meter information, or the instrument panel mounted inside the cab can be itself dispensed with. Therefore, the operator is free from the necessity of carefully looking at the instrument panel and the display unit, thus resulting in an improvement of operability and safety. Further, because the abnormality warning information is displayed, maintenance is facilitated.

(11) To achieve the above object, the present invention also provides a display control unit for an information display unit for a construction machine, the information display unit being provided inside a cab of a construction machine and having a display portion capable of displaying plural kinds of information including body information and maintenance information, the display control unit comprising processing control means for performing control such that a screen image displayed on the display portion of the information display unit comprises one main screen and a plurality of sub-screens, the main screen displays information regarding one of a plurality of information categories in detail, and the plurality of sub-screens correspond to at least the information categories other than the information category, for which information is displayed on the main screen in detail, and display information regarding the corresponding information categories in the simplified form; and changing means operating such that when input means for selecting the information category to be displayed on the main screen is manipulated, information regarding the category displayed in one of the plurality of sub-screens is displayed on the main screen in detail and information regarding the category, which has been so far displayed on the main screen, is displayed in arbitrary one of the plurality of sub-screens in the simplified form.

With those features, similarly to above (1), it is possible to display plural kinds of information in a combined and selective manner, and to improve efficiency at which the operator confirms the information.

BRIEF DESCRIPTION OF THE DRAWINGS

FIG. 3 shows, in the form of a table, details of communication data transmitted and received among control units and monitoring units via a common communication line.

FIGS. 31A, 31B, 31C and 31D show procedures of Image Transition Example 1 in the second embodiment.

BEST MODE FOR CARRYING OUT THE INVENTION

Embodiments of the present invention will be described below with reference to the drawings.
First Embodiment
A first embodiment of the present invention will be first described with reference to FIGS. 1 to 13.
Mechanism of Hydraulic Excavator•Hydraulic System•Electronic System•Operation FIG. 1 is a block diagram showing an electronic control system of a hydraulic excavator equipped with an information display unit according to a first embodiment of the present invention, along with the hydraulic excavator and a hydraulic system mounted therein.

Figure 1:
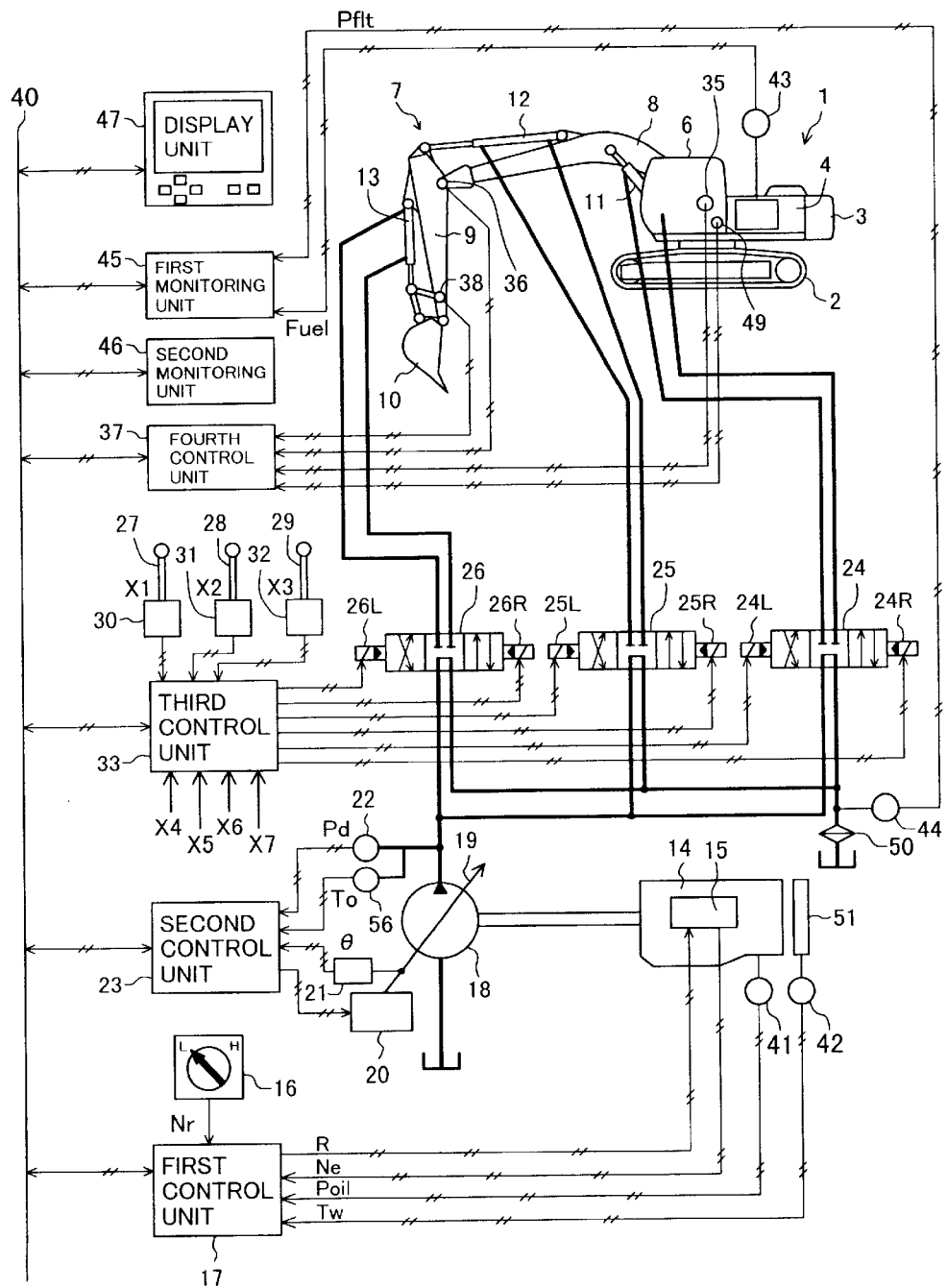
FIG. 1 is a block diagram showing an electronic control system of a hydraulic excavator equipped with an information display unit according to a first embodiment of the present invention, along with the hydraulic excavator and a hydraulic system mounted therein.

Referring to FIG. 1, a hydraulic excavator 1 comprises a track body 2, a swing body 3, an excavation working device (front working mechanism) 7. The excavation working device 7 is made up of a boom 8 vertically pivotably mounted to the swing body 3, an arm 9 rotatably mounted to a fore end of the boom 8, a bucket 10 rotatably mounted to a fore end of the arm 9, a boom operating hydraulic cylinder 11 for vertically pivoting the boom 8, an arm operating cylinder 12 for rotating the arm 9, and a bucket operating hydraulic cylinder 13 for rotating the bucket 10.

The swing body 3 has an accommodating room 4 for accommodating an engine 14 and hydraulic equipment such as a hydraulic pump 18. A cab 6 is provided on the front left side of the swing body 3.

The engine 14 is provided with an electronic governor 15 for maintaining the revolution speed of the engine 14 within a certain range. A target revolution speed Nr of the engine 14 set by a target revolution speed setting unit 16.

The hydraulic pump 18 is driven for rotation by the engine 14. Also, the hydraulic pump 18 is a variable displacement pump and is provided with a swash plate 19 for varying a pump delivery rate. A delivery rate adjusting device 20 is coupled to the swash plate 19. Further, there are provided a swash plate position sensor 21 for detecting a tilting position θ of the swash plate 19, and a pressure sensor 22 for detecting a delivery pressure Pd of the hydraulic pump 18.

The boom operating hydraulic cylinder 11, the arm operating cylinder 12, and the bucket operating hydraulic cylinder 13 are connected to the hydraulic pump 18 through control valves 24, 25, 26, respectively. Flow rates and directions of hydraulic fluids supplied from the hydraulic pump 18 to the respective cylinders 11, 12, 13 are adjusted by the control valves 24, 25, 26. Control levers 27, 28, 29 are provided in association with the control valves 24, 25, 26, and lever operating units 30, 31, 32 are coupled to the control levers 27, 28, 29, respectively. The lever operating units 30, 31, 32 output, as operating signals X1, X2, X3 for the control levers 27, 28, 29, electrical signals depending on shift amounts by which the respective control levers are operated.

The excavation working device 7 is provided with a boom rotational angle sensor 35 for detecting a rotational angle α of the boom 8, an arm rotational angle sensor 36 for detecting a rotational angle β of the arm 9, and a bucket rotational angle sensor 38 for detecting a rotational angle γ of the bucket 10.

Further, a first control unit 17, a second control unit 23, a third control unit 33 and a fourth control unit 37 are provided for controlling various components of the hydraulic excavator, and a first monitoring unit 45, a second monitoring unit 46 and an information display unit 47 are provided for giving an operator information regarding the inside and outside of a machine body. The first to fourth control units 17, 23, 33, 37, the first and second monitoring unit units 45, 46, and the information display unit 47 are interconnected via a communication line 46 for transmitting and receiving data among them.

The first control unit 17 controls the engine 14. More specifically, the first control unit 17 receives the target revolution speed Nr from the target revolution speed setting unit 16 and an actual revolution speed Ne detected by the governor 15, and then executes predetermined computations, thereby outputting a control signal R to the governor 15. As a result, the engine 14 is controlled such that the actual revolution speed Ne matches with the target revolution speed Nr from the target revolution speed setting unit 16.

The second control unit 23 controls the hydraulic pump 18. More specifically, the second control unit 23 receives the delivery pressure Pd of the hydraulic pump 18 detected by the pressure sensor 22, the tilting position θ of the swash plate 19 detected by the swash plate position sensor 21, and the operating signals X1 to X7 from the third control unit 33, and then executes predetermined computations, thereby outputting a control signal for the swash plate 19 to the delivery rate adjusting device 20 for the hydraulic pump 18. As a result, the delivery rate of the hydraulic pump 18 is adjusted with the operation of the delivery rate adjusting device 20.

The third control unit 33 controls the control valves 24, 25, 26. More specifically, the third control unit 33 receives electrical signals from the lever operating units 30, 31, 32 and then executes predetermined computations, thereby outputting control signals to operating sectors 24L, 24R, 25L, 25R, 26L, 26R of the control valves 24, 25, 26. As a result, respective shift positions of the control valves 24, 25, 26 are controlled in accordance with the operating signals X1, X2, X3 from the control levers 27, 28, 29, whereby the flow rates and flowing directions of the hydraulic fluids supplied to the cylinders 11, 12, 13 are controlled.

Further, through not shown, there are provided a swing control lever unit, a track control lever unit, and an attachment control lever unit. The third control unit 33 receives, from those control lever units, a swing operating signal X4, left and right track operating signals X5, X6, and an operating signal X7 for an attachment separate from the bucket 10 that is equipped as a standard option, and then executes predetermined computations, thereby outputting control signals to control valves (not shown). As a result, the flow rates and flowing directions of the hydraulic fluids supplied to respective actuators (not shown) are controlled.

The fourth control unit 37 controls the excavation working device 7. More specifically, the fourth control unit 37 receives respective signals for the rotational angles $\alpha$, $\beta$, $\gamma$ from the rotational angle sensors 35, 36, 38 and the operating signals X1, X2, X3 of the control lever units 27, 28, 29 from the third control unit 33, and then executes predetermined computations, thereby modifying the operating signals X1, X2, X3 and outputting control driving commands Y$\alpha$, Y$\beta$, Y$\gamma$ to the third control unit 33. As a result, the control valves 24, 25, 26 are controlled so as to control, for example, the locus of the excavation working device 7 in its operation.

Further, the engine 14 is provided with a hydraulic pressure sensor 41 for measuring a pressure Poil of a lubricant (engine oil), and a radiator 51 for cooling engine cooling water is provided with a water temperature sensor 42 for detecting a cooling water temperature Tw. Respective signals of the engine oil pressure Poil and the cooling water temperature Tw detected by the sensors 41, 42 are inputted to the first control unit 17.

In addition, as sensors for monitoring other various states in the body of the hydraulic excavator 1, there are provided a fuel level sensor 43 for measuring a fuel level (amount of fuel remaining) Fuel, a pressure sensor 44 for detecting a filter pressure Pflt of a filter 50 provided in a hydraulic system circuit to detect clogging of the filter 50, a hydraulic fluid temperature sensor for detecting a temperature $T_O$ of the hydraulic fluid in the hydraulic system, and a tilt sensor 49 for detecting a body tilt angle $\xi$. Respective signals of the fuel level Fuel and the filter pressure Pflt, detected by the sensors 43, 44 are inputted to the first monitoring unit 45. A signal of the hydraulic fluid temperature $T_O$ detected by the sensor is inputted to the second control unit 23, and a signal of the body tilt angle $\xi$ detected by the tilt sensor 49 is inputted to the fourth control unit 37.

The first monitoring unit 45 transmits information of the fuel level Fuel and the filter pressure Pflt, which are detected respectively by the sensors 43, 44, to the information display unit 47. When an instrument panel is provided in the cab 6, those items of information are displayed on the instrument panel.

The second monitoring unit 46 receives detection data (described later) from the first control unit 17, the second control unit 23 and the first monitoring unit 45 via the communication line 40, and then processes those data for time-serially or statistically measuring and the storing abnormality detection history, the machine working time, the working status, etc. Further, the second monitoring unit 46 transmits those items of information to the information display unit 47.

The information display unit 47 receives various kinds of information (described later) from the first to fourth control units 17, 23, 33, 37 and the first and second monitoring units 45, 46 via the communication line 40, and then displays the received information. Also, the information display unit 47 has the function of instructing, e.g., a target locus in works of the excavation working device 7 to the fourth control unit 37.

Information Display Unit

Figure 2:
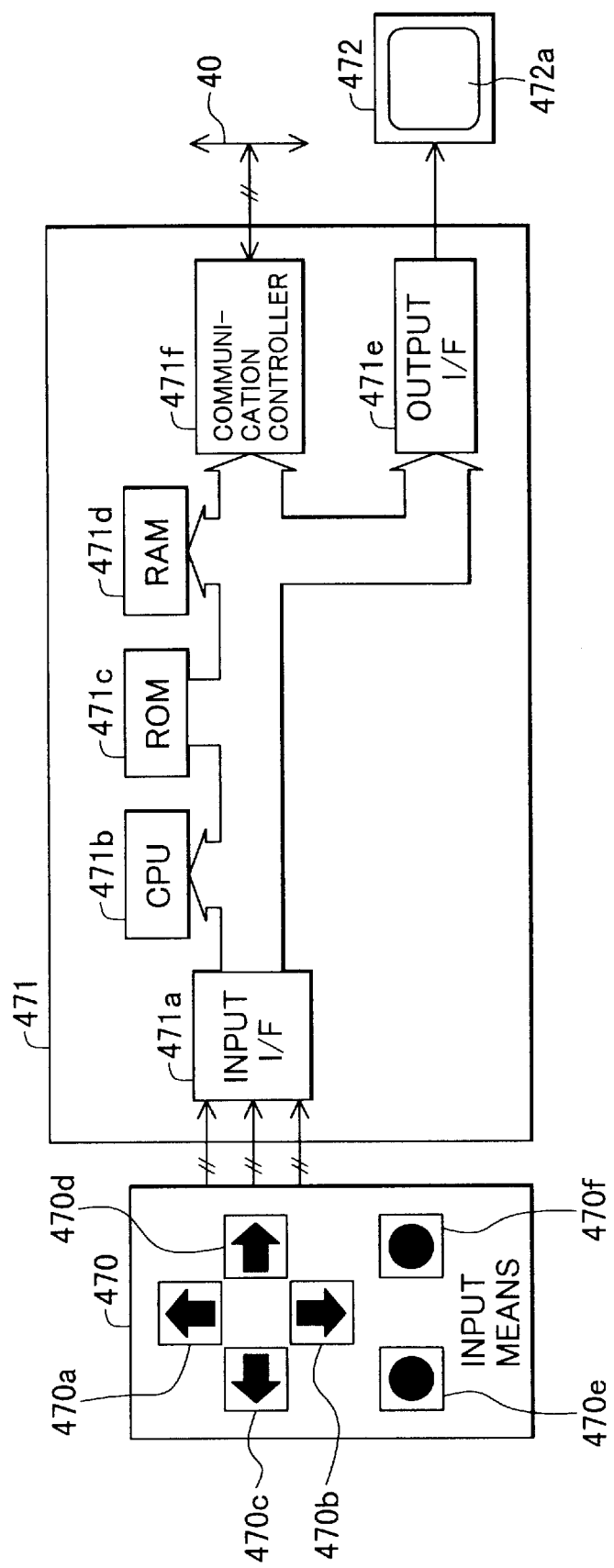
FIG. 2 is a block diagram showing a configuration of the information display unit.

FIG. 2 shows a configuration of the information display unit 47. The information display unit 47 comprises an operating portion 470 serving as input means, a display control portion 471, and a display portion 472 having a screen 472a, such as an LCD.

The operating portion 470 includes various switches such as upward and downward arrow keys 470a, 470b and leftward and rightward arrow keys 470c, 470d which are depressed, for example, when the operator wants to change a display image, numerical value increment and decrement entry keys 470e, 470f which are depressed, for example, when the operator enters a target value for control, and a mode switch (not shown).

The display control portion 471 comprises an interface 471a for receiving signals from the operating portion 470, a central processing unit (CPU) 471b, a read only memory (ROM) 471c for storing programs for control procedures and constants necessary for control, a random access memory (RAM) 471d for temporarily storing numerical values given as computed results or obtained in the course of computation, an output interface (I/F) 471e, and a communication controller 471f for controlling communication with the first to fourth control units 17, 23, 33, 37 and the first and second monitoring unit units 45, 46 which are all connected to the common communication line 40.

The information display unit 47 is disposed inside the cab 6. The operating portion 470, the display control portion 471, and the display portion 472 of the information display unit 47 are preferably constructed as separate units, and the display portion 472 is attached to such a position inside the cab 6 as allowing the operator to see it with ease, e.g., at a corner of the cab on the obliquely right-hand side looking from an operator's seat.

FIG. 3 shows, in the form of a table, details of communication data transmitted and received among the control units and the monitoring units via th common communication line 40. In FIG. 3, "ID No." represents an ID number assigned to individual data. A mark ○ represents data transmitted from the control unit or the monitoring unit. A mark ● represents data received by the control unit or the monitoring unit. "Communication Cycle" represents an interval at which the control unit transmitting data transmits that data, i.e., a time interval at which data is update . In the "Cycle" column, "upon display manipulation" indicates that a signal is transmitted from the information display unit 47 only when an instruction button (not shown) provided in the operating portion 470 of the information display unit 47 is manipulated.

Also, the second monitoring unit 46 receives data of the actual engine revolution speed Ne, the engine oil pressure Poil and the cooling water temperature Tw from the first control unit 17, data of the pump delivery pressure Pd, the pump tilting angle θ and the hydraulic fluid temperature $T_O$ from the second control unit 23, the arm operating signal X2, the swing operating signal X4, the left and right track operating signal X5, X6 and the attachment operating signal X7 from the third control unit 33, and data of the fuel level Fuel and the filter pressure Pflt from the first monitoring unit 45. Using those data, the second monitoring unit 46 prepares various data, i.e., abnormality detection history HisW, working time (key-on) TmwKey, working time (engine-on) TmwEng, working time (excavation) TmwExc, working time (travel) TmwRun, working time (swing) TmwRot, working time (ML) TmwML, working time (ATT) TmwATT engine revolution speed frequency distribution HistEng, cooling water temperature frequency distribution HistTw, hydraulic fluid temperature frequency distribution $HistT_O$, pump load frequency distribution HistPld, and excavation load frequency distribution HistEld. Those data are transmitted to the information display unit 47 along with information of time-of-day Time based on RTC (clock function) built in the second monitoring unit 46.

The data of the abnormality detection history HisW is prepared from data of the engine oil pressure Poil, the cooling water temperature Tw, the pump delivery pressure Pd, etc. The working time (key-on) TmwKey is calculated as a power-on time in the second monitoring unit 46. The working time (engine-on) TmwEng is calculated as an on-time of the engine revolution speed Ne. The working time (excavation) TmwExc is calculated as an on-time of the arm operating signal X2. The working time (travel) TmwRun is calculated as an on-time of the left and right track operating signals X5, X6. The working time (swing) TmwRot is calculated as an on-time of the swing operating signal X4. The working time (ML) TmwML is calculated as an on-time of a signal from an ML mode switch (not shown). The working time (ATT) TmwATT is calculated as an on-time of the attachment operating signal X7.

Further, the engine revolution speed frequency distribution HistEng is prepared by processing data of the engine revolution speed Ne so as to obtain a frequency distribution thereof. The cooling water temperature frequency distribution HistTw is prepared by processing data of the cooling water temperature Tw so as to obtain a frequency distribution thereof. The hydraulic fluid temperature frequency distribution $HistT_O$ is prepared by processing data of the hydraulic fluid temperature $T_O$ so as to obtain a frequency distribution thereof. The pump load frequency distribution HistPld is prepared by processing data of the pump delivery pressure Pd so as to obtain a frequency distribution thereof. The excavation load frequency distribution HistEld is prepared by processing data of the pump delivery pressure Pd, which is obtained when the arm operating signal X2 is turned on, so as to obtain frequency distribution thereof.

The information display unit 47 receives the data of the actual engine revolution speed Ne, th engine oil pressure Poil and the cooling water temperature Tw from the first control unit 17, the data of the hydraulic fluid temperature $T_O$ from the second control unit 23, the data of the control driving commands Yα, Yβ, Yγ, the rotational angles α, β, γ of the boom, the arm and the bucket, a depth (height) hx of the bucket fore end and a reach by of the bucket fore end from the fourth control unit 37, the data of the fuel level Fuel and the filter pressure Pflt from the first monitoring unit 45, and the above-mentioned various data from the second monitoring unit 46. Then, the information display unit 47 displays the received data while changing and combining them properly.

Examples of Displayed Screen Images

Display of images on the display portion 472 (FIG. 2) of the information display unit 47 will be described with reference to FIGS. 4 to 7.

In FIGS. 4 to 7, a screen image displayed on the screen 472a of the display portion 472 (hereinafter referred to as a displayed screen image) displays information regarding plural kinds of information categories at the same time. On that occasion, information of one category among the plural kinds of information categories is displayed in detail, and information of the other categories is displayed in the simplified form. Which one of the information categories is to be displayed in detail can be changed in turn upon key manipulation made on the operating portion 470 (FIG. 2) by the operator.

The displayed screen image has a main display area 1000 and a sub-display area 2000 that are located in preset positions. The main display area 1000 represents an area for detailed display, whereas the sub-display area 2000 represents an area for simplified display.

Figure 4:
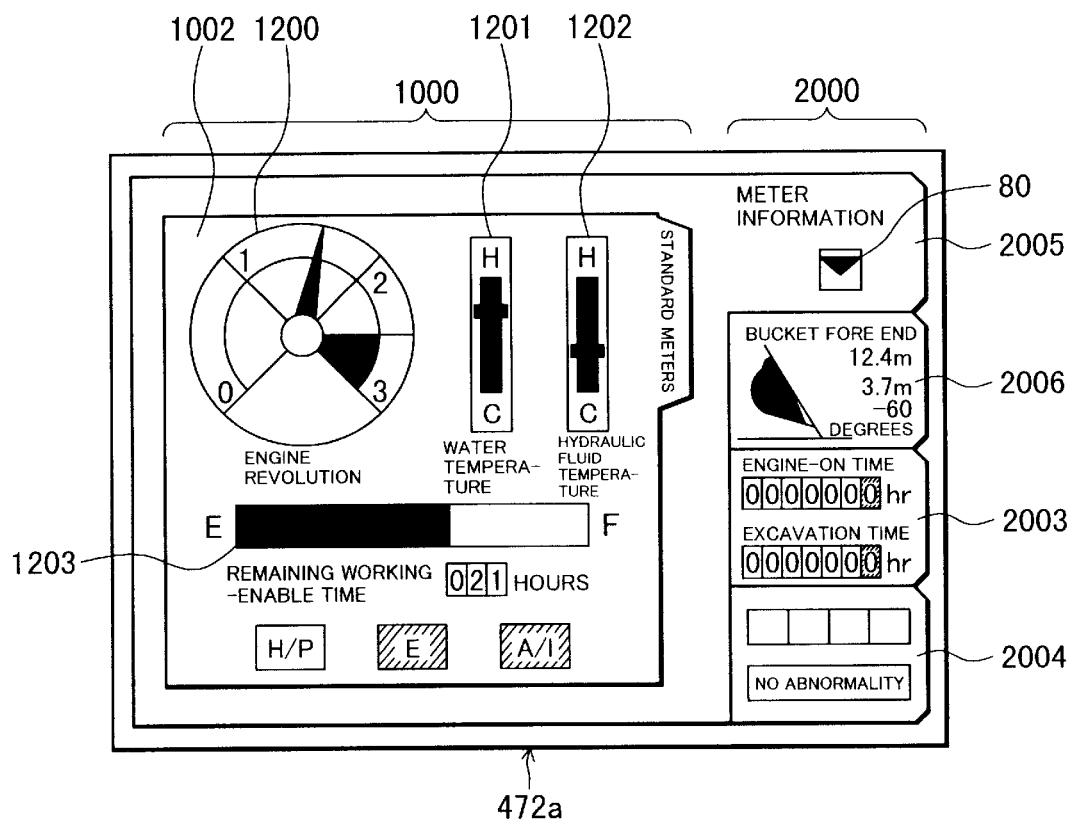
FIG. 4 shows one example of a screen image displayed on the information display unit when a main screen displaying meter information is selected.

In FIG. 4, the main display area 1000 displays one main screen 1002, and the sub-display area 2000 displays sub-screens 2005, 2006, 2003, 2004 in the same number as the number of the information categories. The sub-screens correspond to the information categories in a one-to-one relation.

Figure 5:
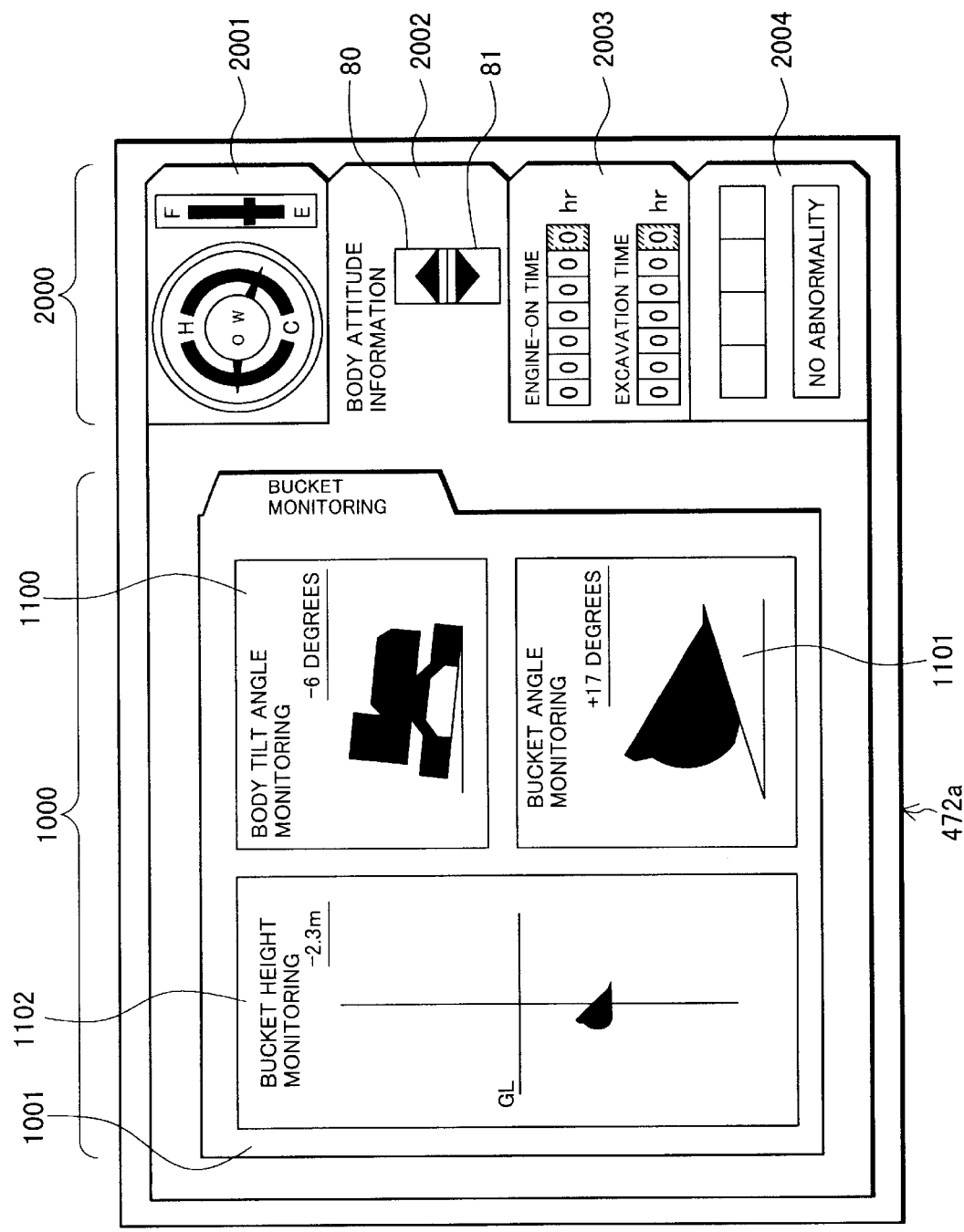
FIG. 5 shows another example of the screen image displayed on the information display unit when a main screen displaying body attitude information is selected.
Figure 6:
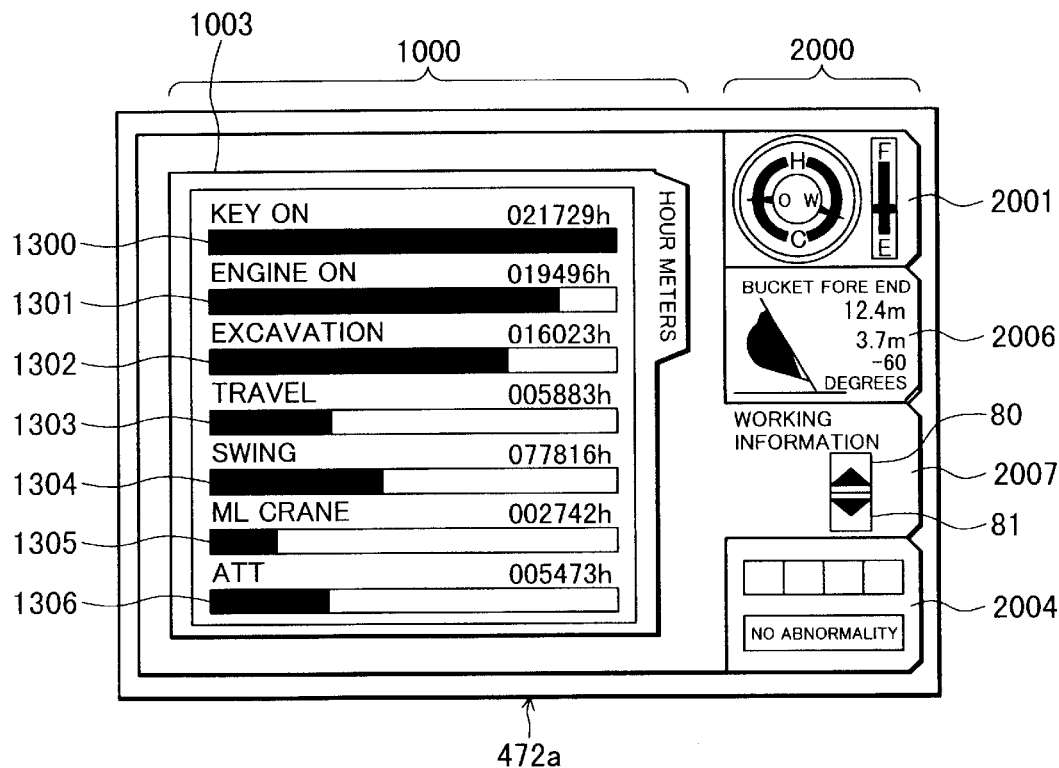
FIG. 6 shows still another example of the screen image displayed on the information display unit when a main screen displaying working time information is selected.
Figure 7:
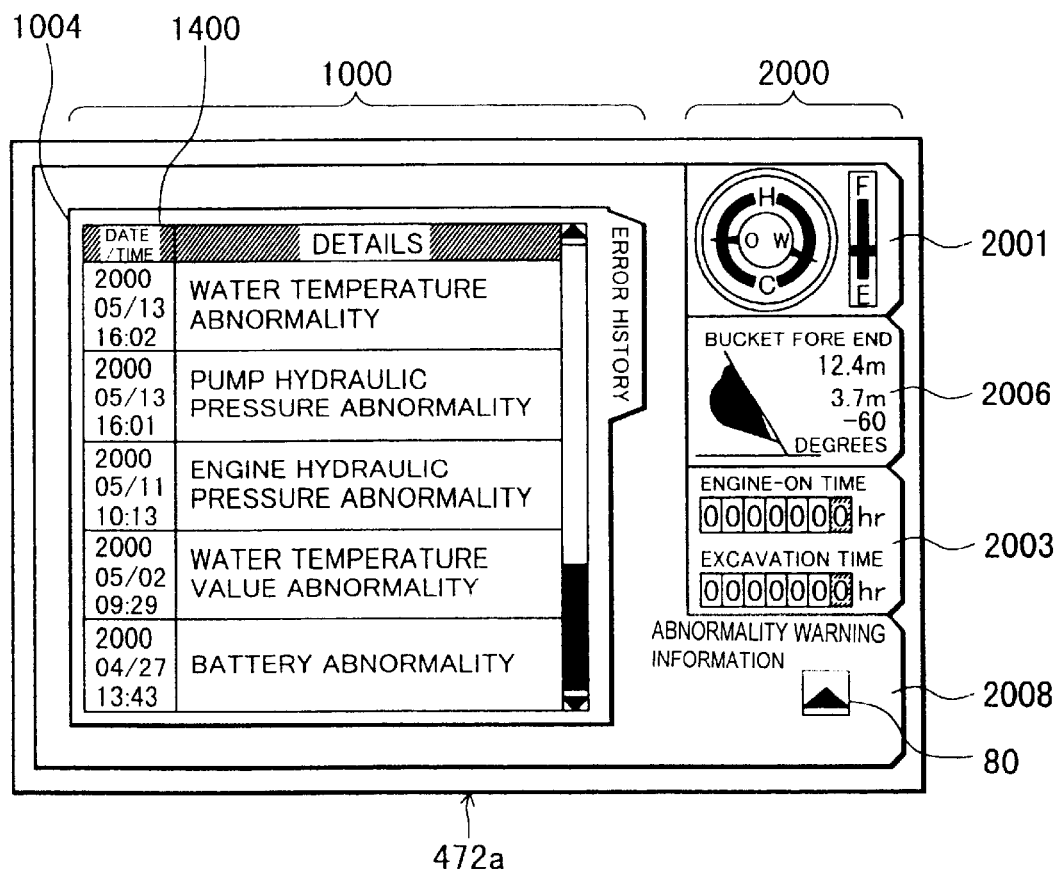
FIG. 7 shows still another example of the screen image displayed on the information display unit when a main screen displaying abnormality warning information is selected.

Similarly, in FIG. 5, the main display area 1000 displays one main screen 1001, and the sub-display area 2000 displays sub-screens 2001 to 2004 in the same number as the number of the information categories. In FIG. 6, the main display area 1000 displays one main screen 1003, and the sub-display area 2000 displays sub-screens 2001, 2006, 2007, 2004 in the same number as the number of the information categories. In FIG. 7, the main display area 1000 displays one main screen 1004, and the sub-display area 2000 displays sub-screens 2001, 2006, 2003, 2008 in the same number as the number of the information categories. The sub-screens correspond to the information categories in a one-to-one relation.

Each of the main screens 1001 to 1004 displays the information regarding the corresponding information category in detail.

Each sub-screen 2002, 2005, 2007, 2008 corresponding to the information category, for which information is displayed in corresponding one of the main screens 1001 to 1004 in detail, display the name of the information category and symbolic illustrations 80, 81 for operation guide to the operator. The symbolic illustrations 80, 81 for operation guide serve as aids for the operator to change the information category with key manipulation made on the operating portion 470, and are designed in imitation of the upward and downward arrow keys 470a, 470b (FIG. 2) on the operating portion 470. The other sub-screens 2006, 2003, 2004 (FIG. 4), 2001, 2003, 2004 (FIG. 5), 2001, 2006, 2004 (FIG. 6), and 2001, 2006, 2003 (FIG. 7) display information that belongs to the corresponding information categories in the simplified form. The simplified display is performed, for example, by displaying information regarding a typical one of the corresponding information categories.

The sub-screens 2005, 2006, 2003, 2004 (FIG. 4), 2001 to 2004 (FIG. 5), 2001, 2006, 2007, 2004 (FIG. 6), and 2001, 2006, 2003, 2008 (FIG. 7) are each arranged so as to serve also as an index (guide) tag for the corresponding information category, and are designed with layout so as to provide index tags for the main display area 1000.

The manipulation made by the operator for changing the information category to be displayed in the main display area 1000 and change of the screen image will be described in connection with, e.g., the case of changing one example of the displayed screen image shown in FIG. 5 to another shown in FIG. 4.

When the operator wants to change the information category displayed in the main display area 1000, the information category to be displayed in the main display area 1000 in detail can be changed by newly selecting the sub-screen 2001 corresponding to the desired information category instead of the sub-screen 2002 corresponding to the currently selected information category. That selection can be made by manipulating the upward arrow keys 470a (FIG. 2) with the aid of the symbolic illustration 80 for operation guide (as described later). Upon that manipulation, the information, which has been so far displayed in the sub-screen 2001 corresponding to the newly selected information category in the simplified form, is shifted to the main screen 1002 and is displayed in detail. In the sub-screen 2005, the name of the selected information category and the symbolic illustration 80 for operation guide are displayed instead. Also, the detailed information on the main screen 1001 corresponding to the information category, which has been so far selected, is shifted to be display on the sub-screen 2006 in the simplified form after change of the screen image.

Next, examples of the screen image displayed on the display portion 472 will be described.

In this embodiment, four kinds of information shown in FIGS. 4 to 7, i.e., meter information, body attitude information, working information, and abnormality warning information, are set as the information categories. A description is made of the contents of the displayed screen image in the state in which those information categories are selected one by one.

Category A

In FIG. 4, the main screen 1002 of the displayed screen image is a screen corresponding to an instrument panel, and displays an engine revolution speed 1200, a cooling water temperature 1201, a hydraulic fluid temperature 1202, and a fuel level 1203 using numerical values, a circle type meter and a bar type meter. The sub-screen 2005 displays the name of the selected information category and the symbolic illustration 80 for operation guide to the operator. The sub-screens 2006, 2003, 2004 correspond to the body attitude information, the working information and the abnormality warning information, respectively, and display the information (typical items) regarding the respective information categories in the simplified form. The sub-screen 2006 displays the attitude and fore end position of the bucket using numerical values and a symbolic illustration. The sub-screen 2003 displays the engine-on time and the accumulated excavation time using numerical values. The sub-screen 2004 displays an abnormality item in the event of an abnormality.

Category B

In FIG. 5, the main screen 1001 of the displayed screen image is a screen displaying the bucket attitude and the body attitude, and displays a body transverse tilt angle 1100, a bucket rotational angle 1101 and a bucket height 1102 using numerical values and a symbolic illustration in imitation of an entire image or each component of the actual machine. The sub-screen 2002 displays the name of the selected information category and the symbolic illustrations 80, 81 for operation guide to the operator. The sub-screens 2001, 2003, 2004 correspond to the meter information, the working information and the abnormality warning information, respectively, and display the information (typical items) regarding the respective information categories in the simplified form. The sub-screen 2001 displays the cooling water temperature, the hydraulic fluid temperature and the fuel level using needle type meters. The sub-screens 2003, 2004 display the same contents as those described above. That point is similarly applied to the following categories.

Category C

In FIG. 6, the main screen 1003 of the displayed screen image is a screen displaying information of the working time, and displays a key-on time 1300, an engine-on time 1301, an excavation time 1302, a travel time 1303, a swing time 1304, an ML crane operating time 1305 and an attachment operating time 1306 using numerical values and bar type meters. The sub-screen 2007 displays the name of the selected information category and the symbolic illustrations 80, 81 for operation guide to the operator. The sub-screens 2001, 2006, 2004 correspond to the meter information, the body attitude information and the abnormality warning information, respectively, and display the information (typical items) regarding the respective information categories in the simplified form.

Category D

In FIG. 7, the main screen 1004 of the displayed screen image is a screen displaying abnormality warning, and displays abnormality occurrence history and failure occurrence history along with the date/time of occurrence of each abnormality or failure. The sub-screen 2008 displays the name of the selected information category and the symbolic illustration 81 for operation guide to the operator. The sub-screens 2001, 2006, 2003 correspond to the meter information, the body attitude information and the working information, respectively, and display the information (typical items) regarding the respective information categories in the simplified form.

Description of Screen Displaying Process

Figure 8:
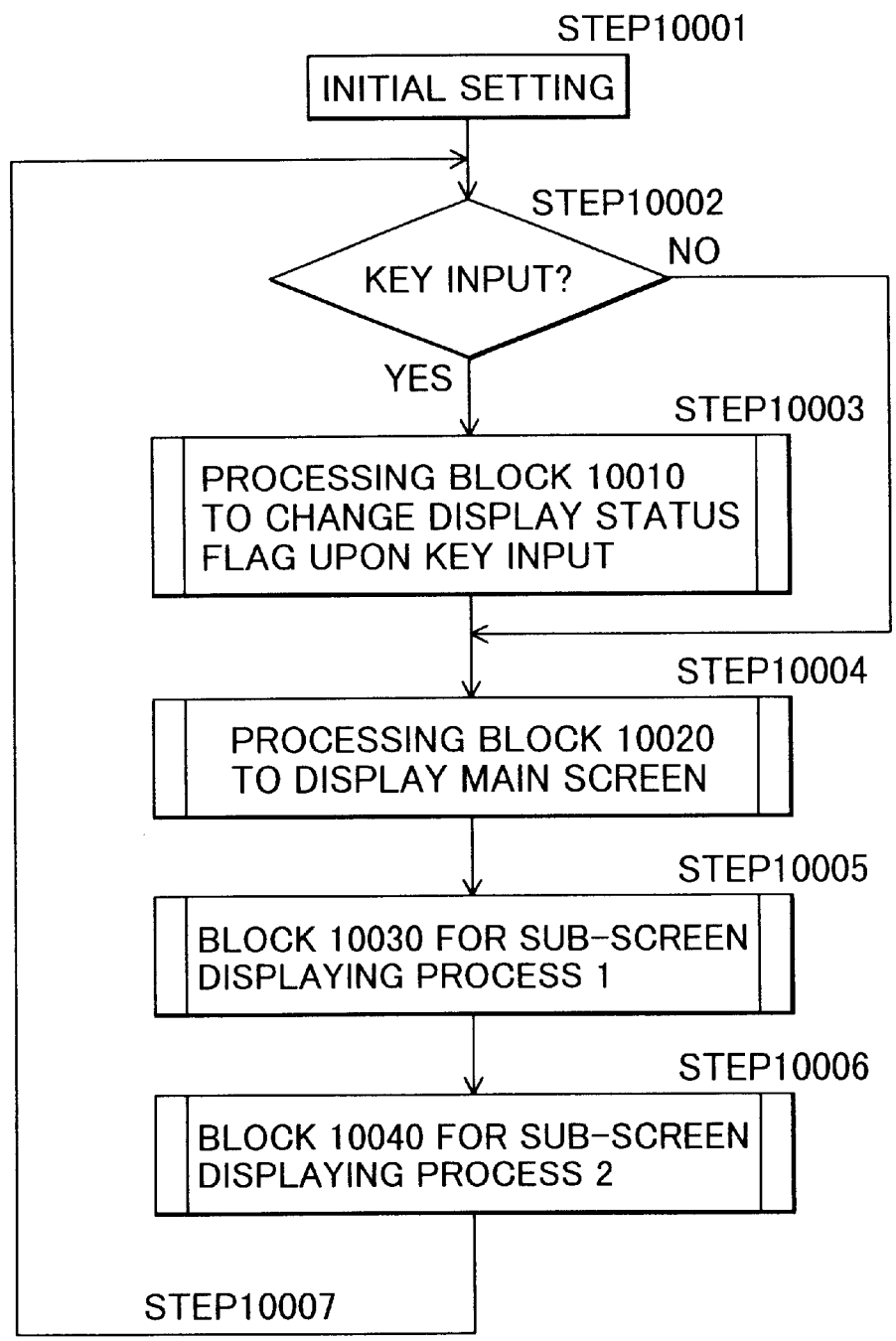
FIG. 8 is a flowchart showing processing steps of a screen displaying process in the information display unit.

Details of processing executed in the display control portion 471 (FIG. 2) of the information display unit 47 for providing the above-mentioned display of the screen images will be described using a display status flag. It is assumed that any of the information category names A, B, C, D is set to the display status flag. The processing flow is shown in FIG. 8.

(1) STEP 10001: First, upon start-up of the information display unit 47, the display status flag indicating which one of the information categories is selected at present is set to A, i.e., meter information. In other words, the initial state is set to the category A.

(2) STEP 10002: It is then determined whether any of the upward and downward arrow keys 470a, 470b (FIG. 2) on the operating portion 470 of the information display unit 47 is depressed. If depressed, the processing flow goes to STEP 10003, and if not depressed, the processing flow goes to STEP 10004.

(3) STEP 10003: This step executes a processing block 10010 for changing the display status flag depending on the arrow key depressed.

(4) STEP 10004: This step executes a processing block 10020 for carrying out a main screen displaying process.

(5) STEP 10005: This step executes a block 10030 for carrying out a sub-screen displaying process 1 (displaying process for the sub-screen corresponding to the information category selected by the display status flag).

(6) STEP 10006: This step executes a block 10040 for carrying out a sub-screen displaying process 2 (displaying process for the sub-screen corresponding to the information category not selected by the display status flag).

(7) STEP 10007: The processing flow returns to STEP 10002 for repeating the subsequent steps.

Description of Processing Block 10010

Figure 9:
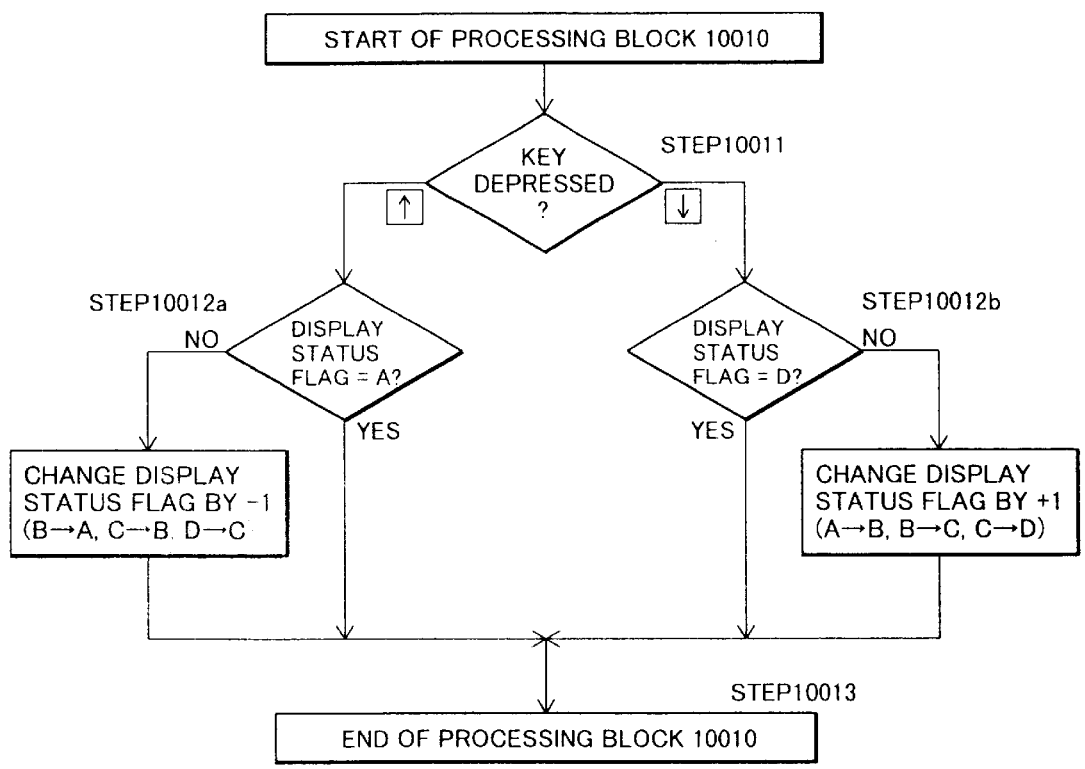
FIG. 9 is a flowchart showing detailed processing steps of a processing block 10010 shown in FIG. 8.

This block 10010 executes processing to change the display status flag depending on the arrow key depressed. The processing flow is shown in FIG. 9.

(1) STEP 10011: It is determine which one of the upward arrow key 470a (hereinafter indicated by "↑" for brevity) and the downward arrow key 470b (hereinafter indicated by "↓" for brevity) is depressed. If "↑" is depressed, the processing flow goes to STEP 10012a, and if "↓" is depressed, the processing flow goes to STEP 10012b.

(2) STEP 10012a: If the display status flag is set to A, nothing is changed and the current state is maintained. If the display status flag is set to B, C or D, it is changed to A, B, C, respectively. Then, the processing flow goes to STEP 10013.

(3) STEP 10012b: If the display status flag is set to D, nothing is changed and the current state is maintained. If the display status flag is set to A, B or C, it is changed to B, C, D, respectively. Then, the processing flow goes to STEP 10013.

(4) STEP 10013: The block 10010 is brought into an end.

Description of Processing Block 10020

Figure 10:
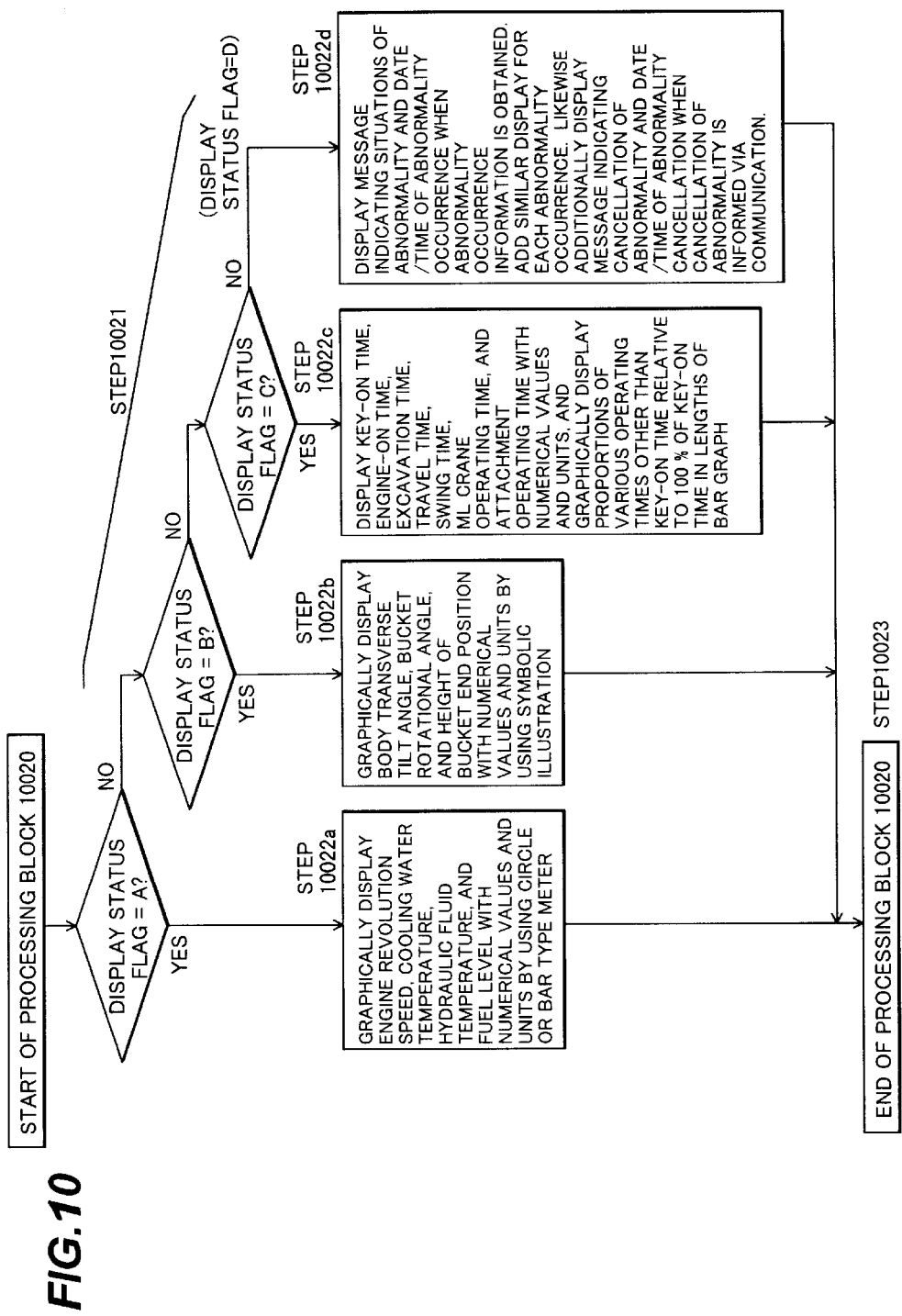
FIG. 10 is a flowchart showing detailed processing steps of a processing block 10020 shown in FIG. 8.

This block 10020 executes processing to display the main screen in accordance with the display status flag. The processing flow is shown in FIG. 10.

(1) STEP 10021: If the display status flag is set to A, processing of STEP 10022a is executed. If the display status flag is set to B, processing of STEP 10022b is executed. If the display status flag is set to C, processing of STEP 10022c is executed. If the display status flag is set to D, processing of STEP 10022d is executed.

(2) STEP 10022a: The engine revolution speed, the cooling water temperature, the hydraulic fluid temperature, and the fuel level, which are obtained via communication, are graphically displayed with numerical values and units by using circle or bar type meters. Then, the processing flow goes to STEP 10023.

(3) STEP 10022b: First, the body transverse tilt angle obtained via communication is displayed with a numerical value and a unit. At the same time, a symbolic illustration of the body looking from the rear side is displayed while it is rotated in match with the body transverse tilt angle obtained via communication. Next, the bucket rotational angle obtained via communication is displayed with a numerical value and a unit. At the same time, a symbolic illustration of the bucket looking from the lateral side is displayed while it is rotated in match with the bucket rotational angle obtained via communication. Subsequently, the height of the bucket end position obtained via communication is displayed with a numerical value and a unit. At the same time, a symbolic illustration of the bucket looking from the lateral side is graphically displayed in a superimposed relation to a horizontal line representing the height of a reference plane and a line vertical to the horizontal line so that the operator can visually confirm the bucket height with ease. Then, the processing flow goes to STEP 10023.

(4) STEP 10022c: This step displays the working information obtained via communication. The key-on time, the engine-on time, the excavation time, the travel time, the swing time, the ML crane operating time, and the attachment operating time, which are measured and managed by the second monitoring unit 46, with numerical values and units. Also, proportions of various operating times other than the key-on time relative to 100% of the key-on time are graphically displayed in respective lengths of bar graphs. Then, the processing flow goes to STEP 10023.

(5) STEP 10022d: When abnormality occurrence information is obtained via communication, a symbolic illustration previously related to the nature of abnormality, a message indicating the situations of abnormality, and the date/time of abnormality occurrence are displayed. Similar display is added for each abnormality occurrence. Likewise, when information representing cancellation of the abnormality is obtained via communication, a symbolic illustration of the corresponding abnormality, a message indicating cancellation of the abnormality and the date/time of the abnormality cancellation are additionally displayed. Then, the processing flow goes to STEP 10023.

(6) STEP 10023: The block 10020 is brought into an end.

Description of Processing Block 10030

Figure 11:
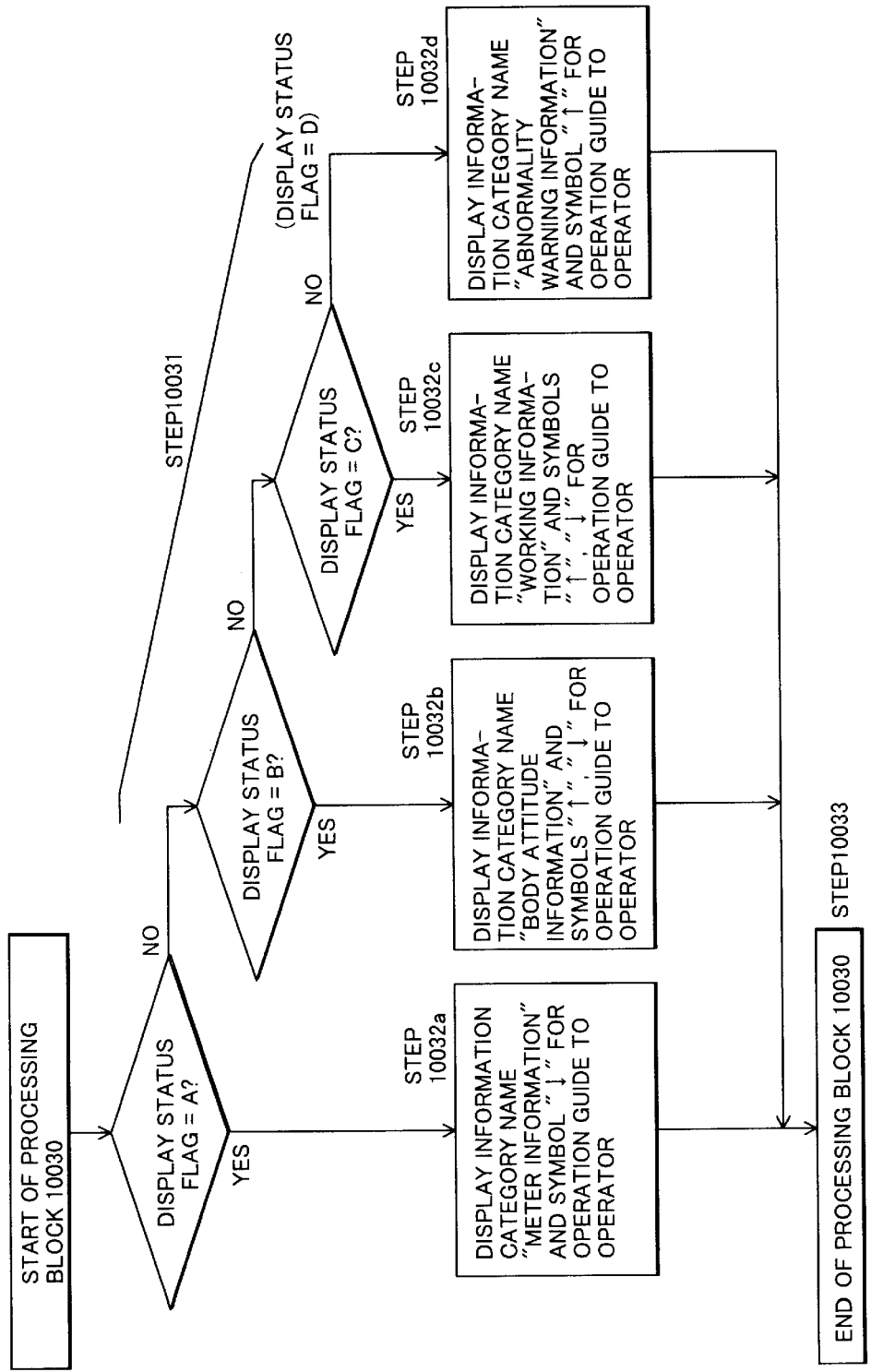
FIG. 11 is a flowchart showing detailed processing steps of a processing block 10030 shown in FIG. 8.

This block 10030 executes processing to display the sub-screen corresponding to the information category selected by the display status flag. The processing flow is shown in FIG. 11.

(1) STEP 10031: If the display status flag is set to A, processing of STEP 10032a is executed. If the display status flag is set to B, processing of STEP 10032b is executed. If the display status flag is set to C, processing of STEP 10032c is executed. If the display status flag is set to D, processing of STEP 10032d is executed.

(2) STEP 10032a: The information category name "Meter Information" is displayed. Also, "↓" in imitation of the downward arrow key 470b is displayed as the symbolic illustration 80 for operation guide to the operator. Then, the processing flow goes to STEP 10033.

(3) STEP 10032b: The information category name "Body Attitude Information" is displayed. Also, "↑" and "↓" in imitation of the upward and downward arrow keys 470a, 470b are displayed as the symbolic illustrations 80, 81 for operation guide to the operator. Then, the processing flow goes to STEP 10033.

(4) STEP 10032c: The information category name "Working Information" is displayed. Also, "↑" and "↓" in imitation of the upward and downward arrow keys 470a, 470b are displayed as the symbolic illustrations 80, 81 for operation guide to the operator. Then, the processing flow goes to STEP 10033.

(5) STEP 10032d: The information category name "Abnormality Warning Information" is displayed. Also, "↑" in imitation of the upward arrow key 470a is displayed as the symbolic illustration 80 for operation guide to the operator. Then, the processing flow goes to STEP 10033.

(6) STEP 10033: The block 10030 is brought into an end.

<Description of Processing Block 10040>

Figure 12:
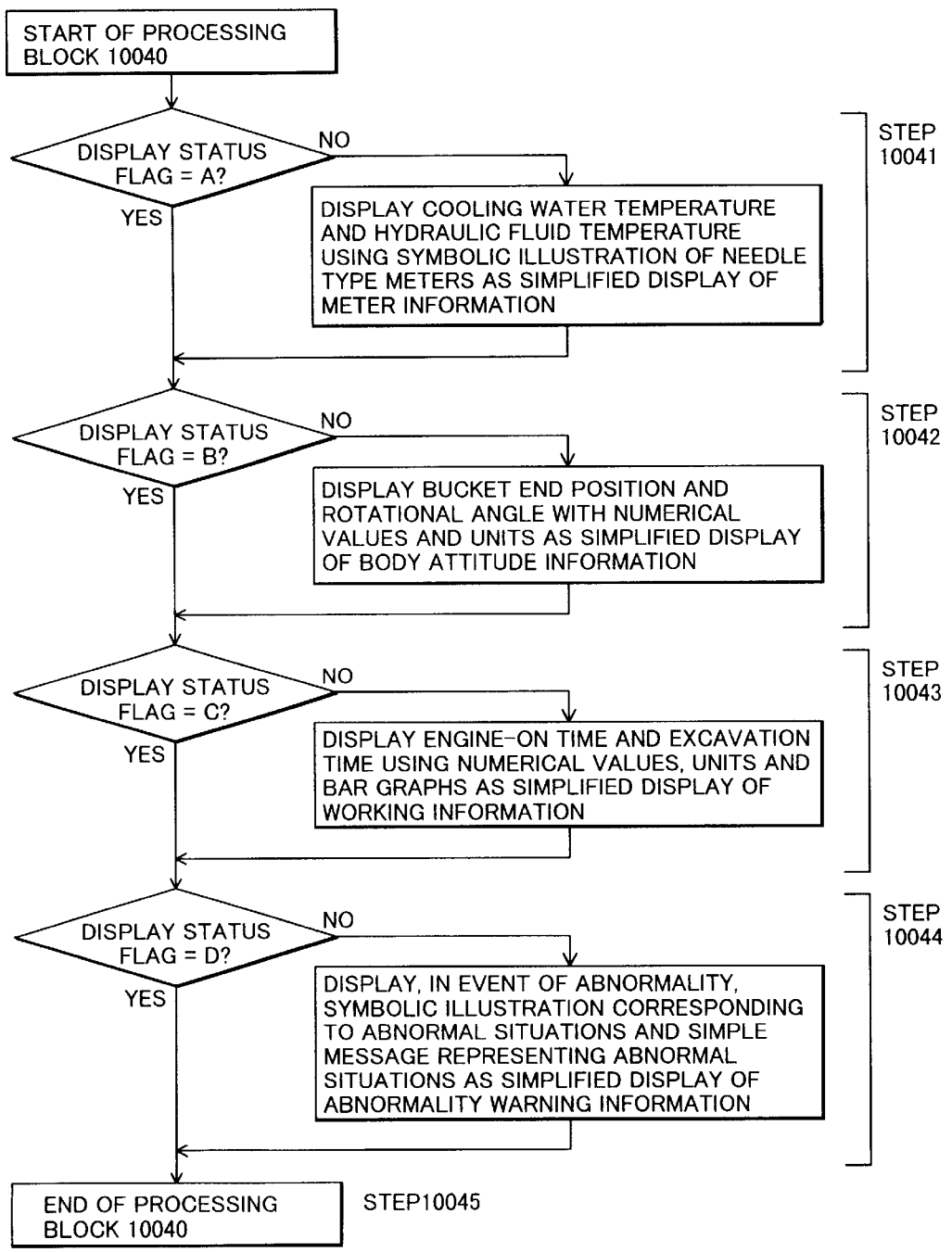
FIG. 12 is a flowchart showing detailed processing steps of a processing block 10040 shown in FIG. 8.

This block 10040 executes processing to display the sub-screen corresponding to the information category not selected by the display status flag. The processing flow is shown in FIG. 12.

(1) STEP 10041: If the display status flag is not set to A, the cooling water temperature and the hydraulic fluid temperature are displayed using symbolic illustrations of needle type meters as the simplified form of the meter information. The meters calculate the needle positions and update the drawn illustrations successively in accordance with information of the cooling water temperature and the hydraulic fluid temperature obtained via communication.

(2) STEP 10042: If the display status flag is not set to B, the bucket end position and rotational angle are displayed with numerical values and units as the simplified form of the body attitude information. Also, the symbolic illustration of the bucket looking from the lateral side is displayed while it is successively rotated in match with the bucket rotational angle.

(3) STEP 10043: If the display status flag is not set to C, the engine-on time and the excavation time both obtained via communication are displayed with numerical values, units and bar type graphs as the simplified form of the working information.

(4) STEP 10044: If the display status flag is not set to D, the symbolic illustration previously related to the nature of abnormality is displayed upon the occurrence of abnormality in accordance with abnormality warning information obtained via communication as the simplified form of the abnormality warning information so that the operator is notified of the abnormality occurrence. At the same time, a brief message indicating the situations of the abnormality is displayed. When information representing cancellation of the abnormality is obtained via communication, display of the symbolic illustration corresponding to the nature of abnormality and the message indicating the situations of abnormality are ceased.

(5) STEP 10045: The block 10040 is brought into an end.

Manipulation Example and Screen Transition Example in First Embodiment

Procedures for changing the main screen image from the screen of the meter information category A in the initial state to the screen of the working information category C will be described as a manipulation example in the first embodiment with reference to FIG. 13.

(1) The information category set to the display status flag in the initial state is A. The category A is therefore displayed in the main screen. In other words, the main screen 1002 is displayed.

(2) "↓" is entered with depression. The displayed screen is shifted downward as shown in FIG. 13. The information category set to the display status flag is changed to B. Therefore, the category B is displayed in the main screen, causing the main screen 1001 to be displayed.

(3) "↓" is entered with depression. The displayed screen is further shifted downward as shown in FIG. 13. The information category set to the display status flag is changed to C. Therefore, the category C is displayed in the main screen, causing the main screen 1003 to be displayed.

With the above-mentioned procedures, the main screen image can be changed from the screen of the meter information category A in the initial state to the screen of the working information category C.

Figure 13:
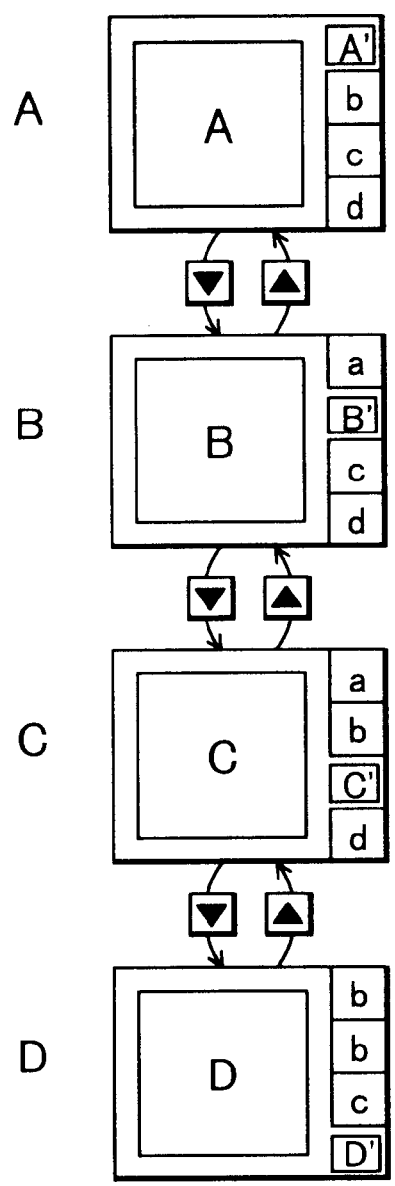
FIG. 13 shows an example of screen transition in the first embodiment.

Moreover, when changing the main screen image to the screen of the abnormality warning information category D, "↓" is entered with depression, whereupon the displayed screen is further shifted downward as shown in FIG. 13. The information category set to the display status flag is changed to D. Therefore, the category D is displayed in the main screen, causing the main screen 1004 to be displayed.

Advantages of First Embodiment

According to this embodiment having the construction described above, a screen image displayed on the display portion 472 of the information display unit 47 includes the main display area 1000 having one main screen and the sub-display area 2000 having a plurality of sub-screens so that a plurality of information categories can be displayed in both the detailed and simplified forms and the displayed information can be changed in turn. It is therefore possible to display plural kinds of information in a combined and selective manner, and to improve efficiency at which the operator confirms the information.

Also, the sub-screen in the sub-display area 2000 corresponding to the information category, for which information is displayed in detail on the main screen in the main display area 1000, displays the symbolic illustrations 80, 81 for operation guide, which are provided in imitation of arrow keys and serve as aids for the operator when changing the information category with key manipulation made on the operating portion 470. Therefore, the operator can easily change the information category displayed in the main display area 1000 with key manipulation made on the operating portion 470.

Further, the plurality of sub-screens in the sub-display area 2000 serve also as index tags for the information category displayed on the main screen in the main display area 1000, and are designed with layout in imitation of index tags for the main display area 1000. By using the index tags as guides, therefore, the operator can easily select the information category displayed in the main display area 1000.

Moreover, since the plurality of information categories displayed on the display screen includes the meter information and the abnormality warning information, the operator is not required to carefully look at an instrument panel separately mounted inside the cab for confirming the meter information, thus resulting in an improvement of operability and safety. Further, with this embodiment, since the instrument panel mounted inside the cab can be itself dispensed with, it is possible to realize effective utilization of a space within the cab. Additionally, because the abnormality warning information is displayed, maintenance is facilitated.

Second Embodiment

A second embodiment of the present invention will be described with reference to FIGS. 14 to 34.

The second embodiment differs in device configuration from the first embodiment in that the contents displayed on the information display unit 47 corresponding to some of the information categories are divided into sub-categories, and a means for selectively changing the sub-categories from one to another in the relevant information category is provided in addition to the means for selectively changing the information category from one to another, thus enabling the displayed contents to be changed in a finer divided manner.

Display information set as the displayed screen image for each information category will be first described with reference to FIG. 14.

Category A

The category A is the same as that in the first embodiment.

Category B

Figure 14:
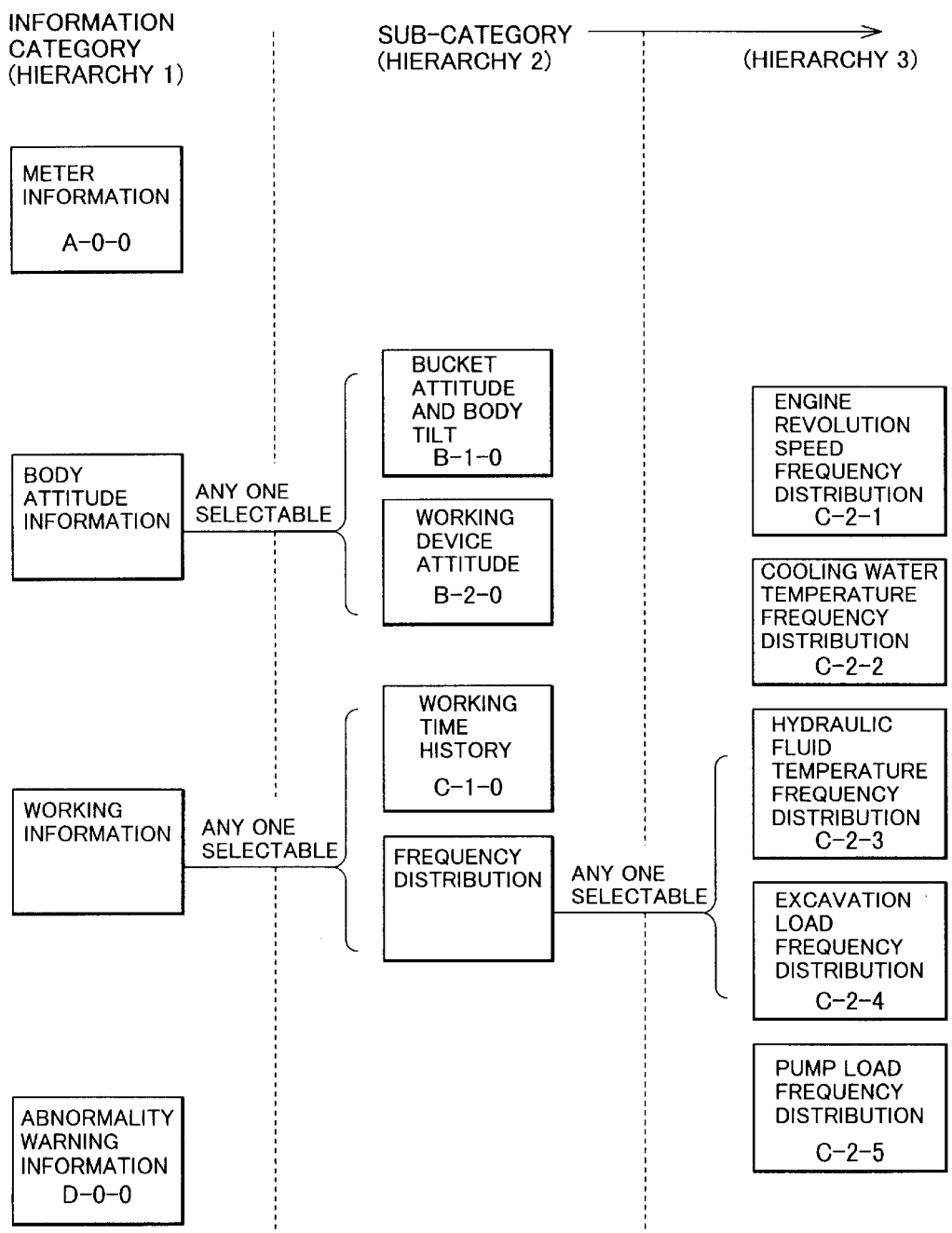
FIG. 14 shows, in the form of a hierarchy, a list of screen images displayed on an information display unit according to the second embodiment.
Figure 15:
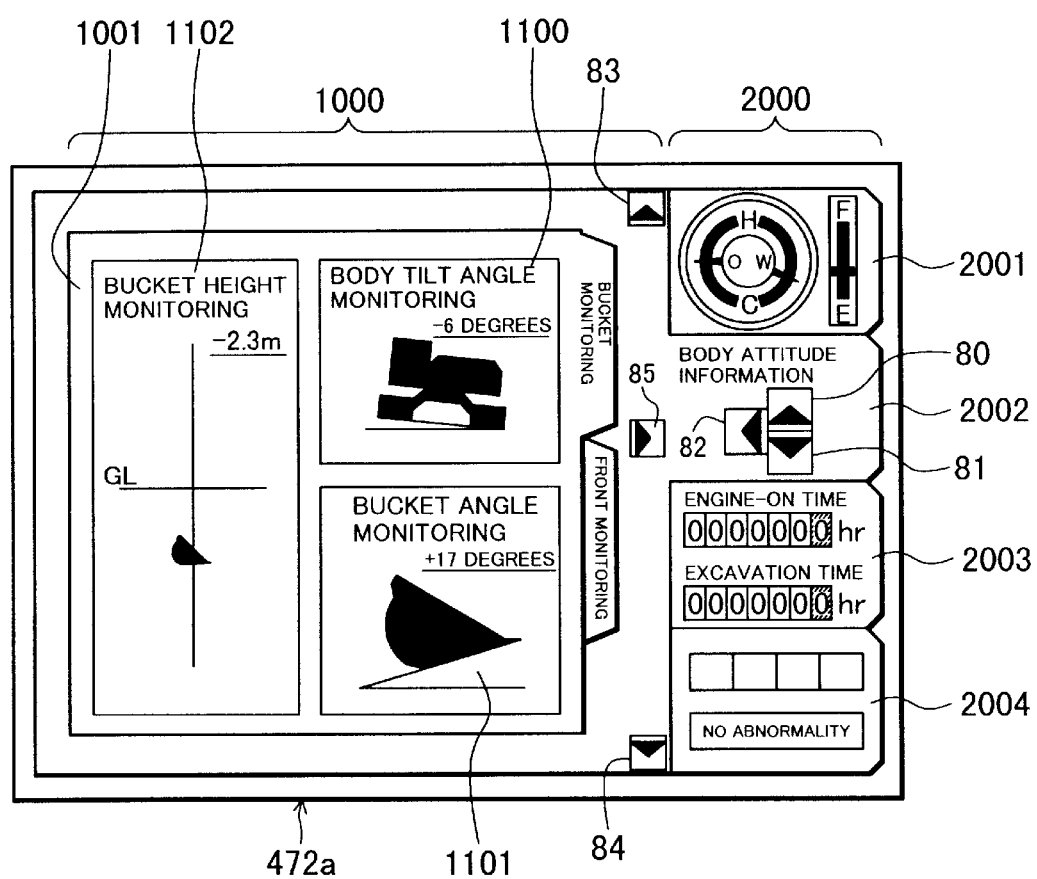
FIG. 15 shows one example of a screen image displayed on the information display unit when a main screen displaying, as body attitude information, bucket attitude and body attitude information is selected.
Figure 16:
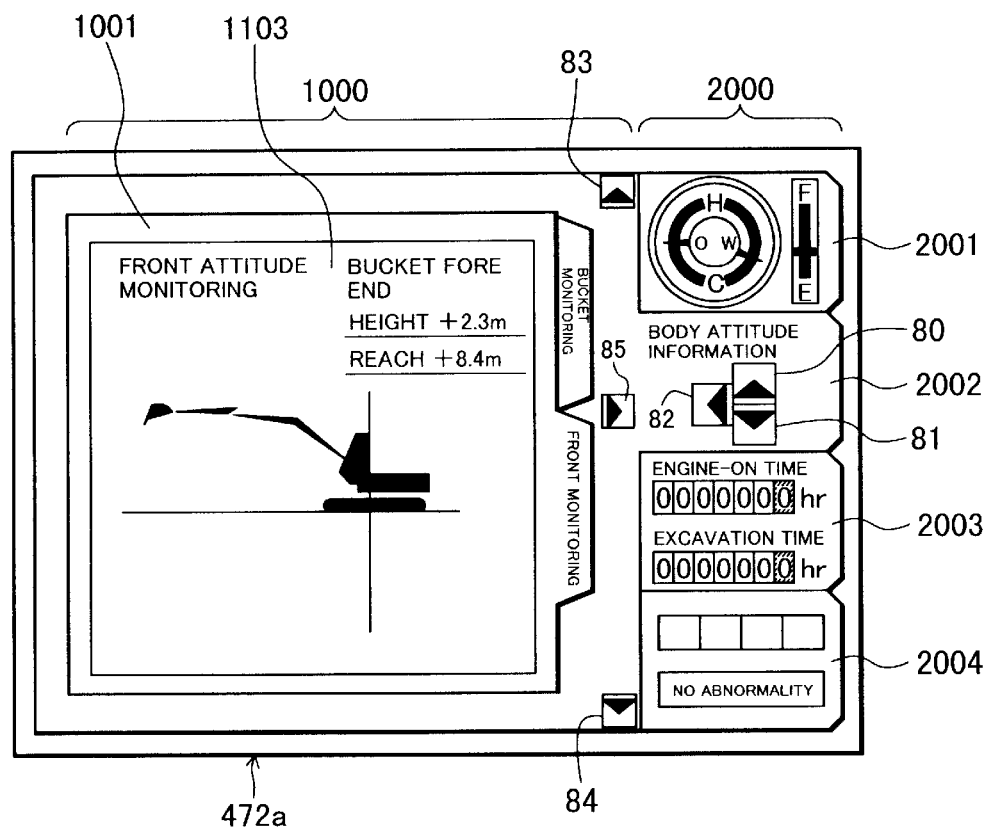
FIG. 16 shows another example of the screen image displayed on the information display unit when a main screen displaying, as body attitude information, working device attitude information is selected.

As shown in FIG. 14, the category B has two sub-categories (hierarchy 2). The main screen 1001 of the displayed screen image selectively displays one of the screen displaying the bucket attitude and the body attitude, which has been described above in connection with the first embodiment, and a screen displaying the working device attitude, which is newly added in this embodiment. As shown in FIG. 15, the screen displaying the bucket attitude and the body attitude is the same as that shown in FIG. 5. As shown in FIG. 16, the screen displaying the working device attitude displays change in the attitude attributable to changes in respective articulation angles of the boom, the arm and the bucket by using a side view 1103 including an overall image of the actual machine. In addition, the bucket end position is displayed with a numerical value. The sub-screen 2002 corresponding to the selected information category and the other sub-screens 2001, 2003, 2004 are the same as those in the first embodiment except that a symbolic illustration 82 for operation guide is additionally d splayed in the sub-screen 2002. The symbolic illustration 82 for operation guide serves as an aid for shift from the main category (hierarchy 1) to the sub-category with key manipulation made on the operating portion 470, and is designed in imitation of the leftward arrow key 470c on the operating portion 470. Further, the main display area 1000 additionally displays symbolic illustrations 83, 84 for operation guide, which are in imitation of the upward and downward arrow keys 470a, 470b on the operating portion 470, as aids for changing the sub-category with key manipulation made on the operating portion 470, and a symbolic illustration 85 for operation guide, which is in imitation of the rightward arrow key 470d on the operating portion 470, as an aid for shift from the sub-category to the main category.

Category C

Figure 17:
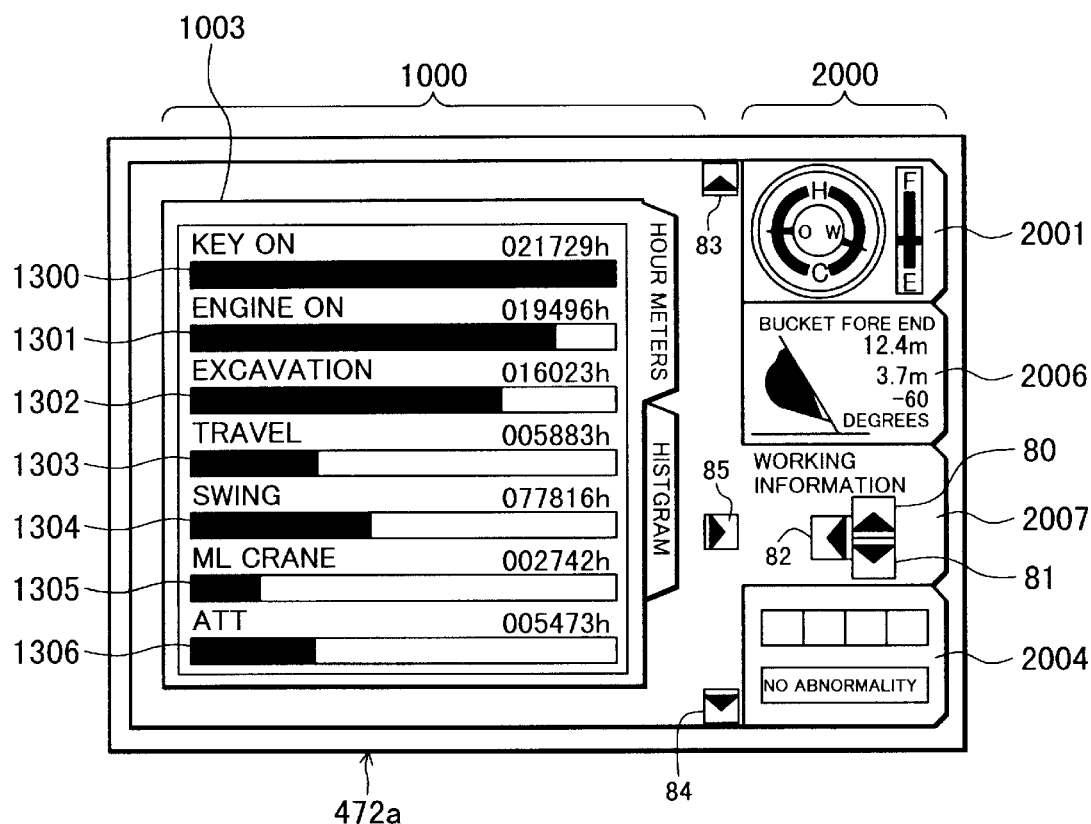
FIG. 17 shows still another example of the screen image displayed on the information display unit when a main screen displaying, as working information, working time information is selected.
Figure 18:
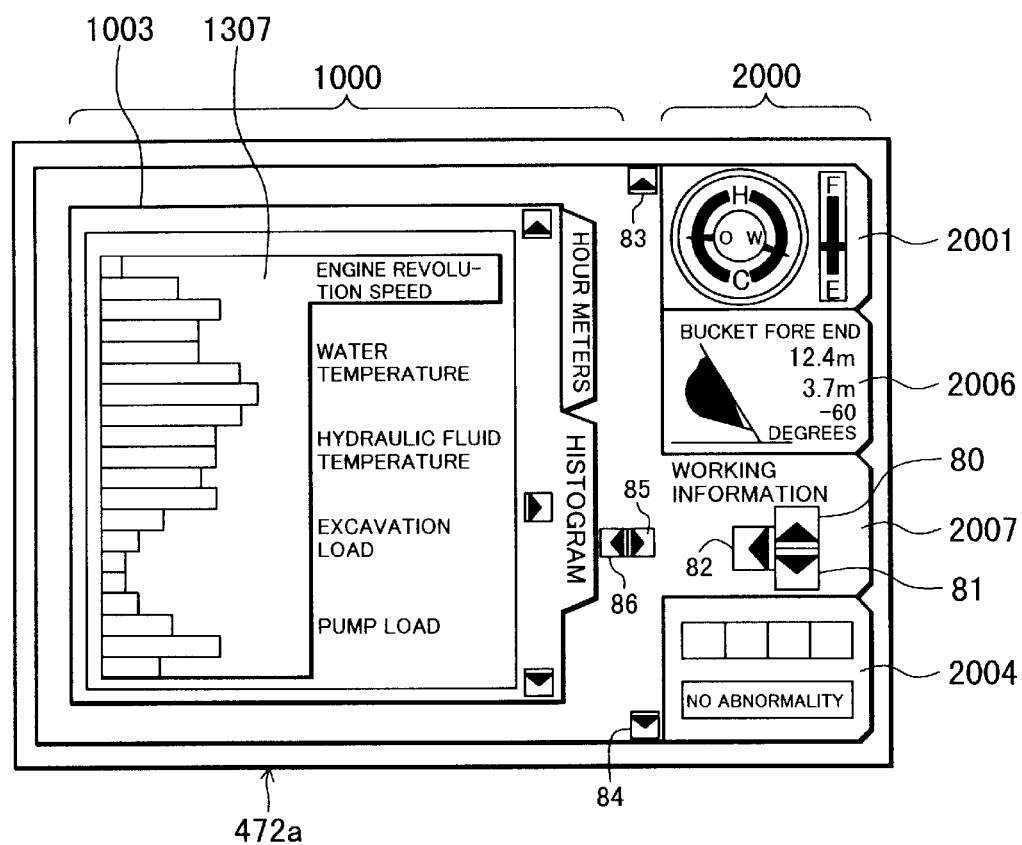
FIG. 18 shows still another example of the screen image displayed on the information display unit when a main screen displaying, as working information, an engine revolution speed frequency distribution is selected.
Figure 19:
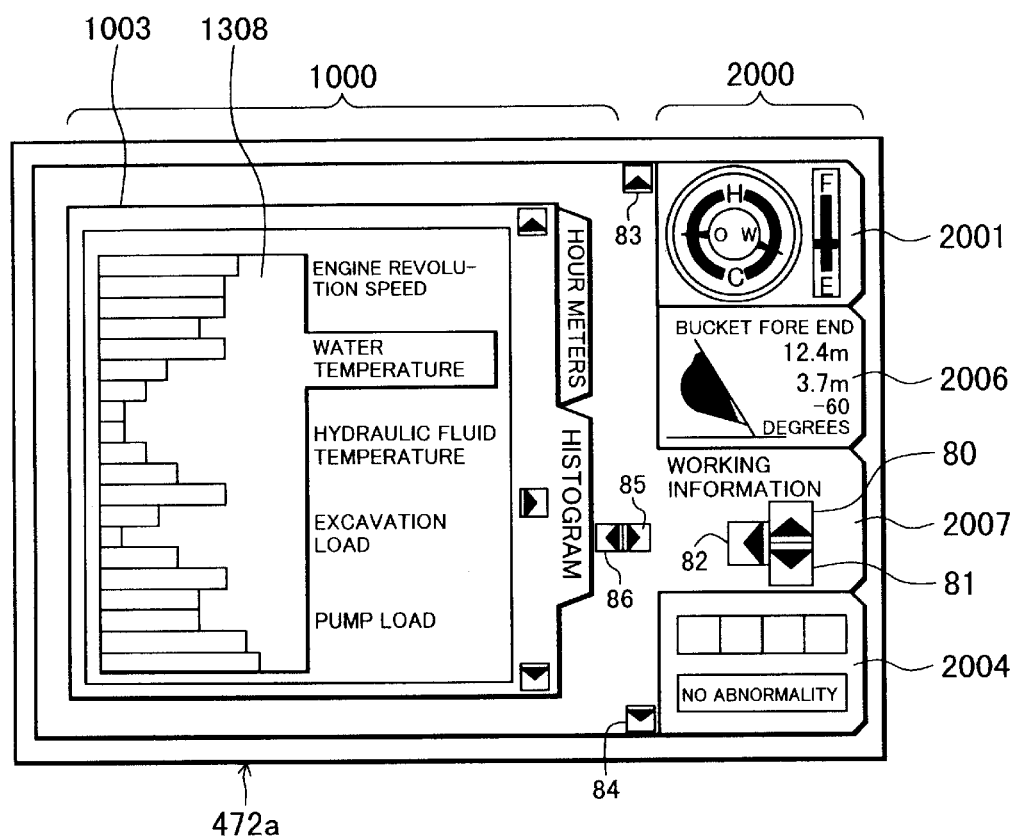
FIG. 19 shows still another example of the screen image displayed on the information display unit when a main screen displaying, as working information, a cooling water temperature frequency distribution is selected.
Figure 20:
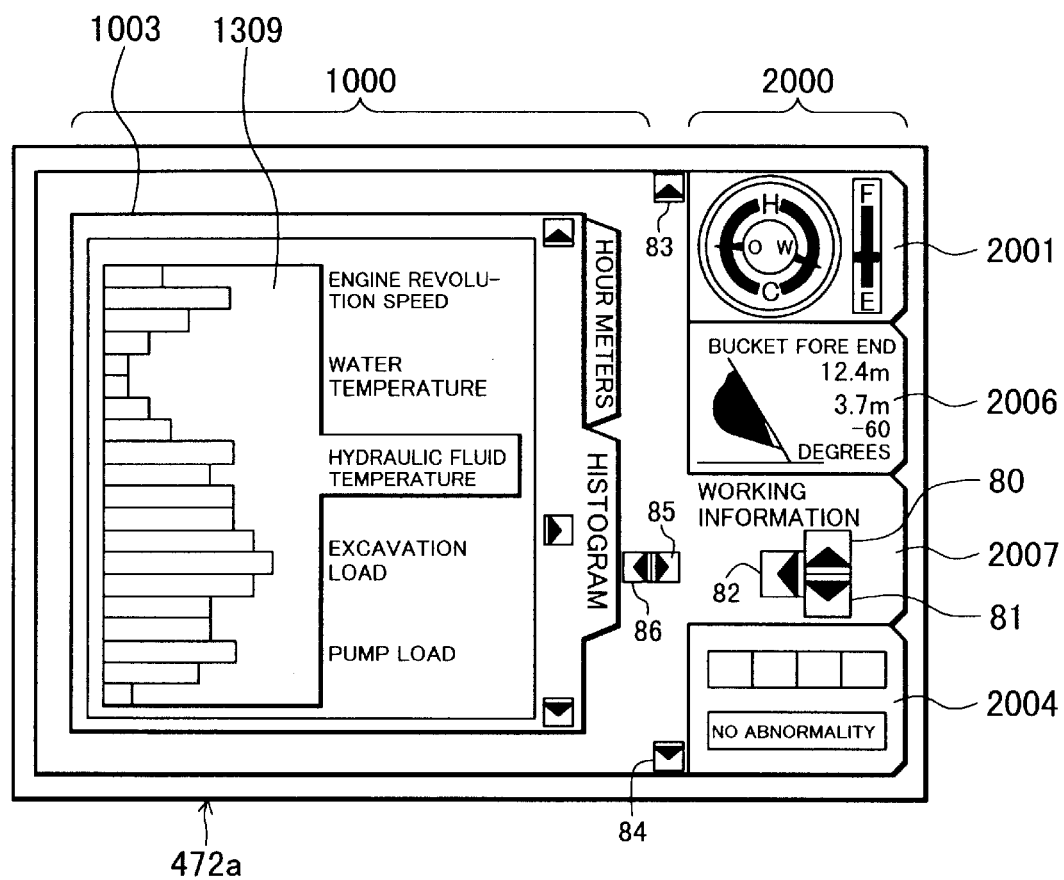
FIG. 20 shows still another example of the screen image displayed on the information display unit when a main screen displaying, as working information, a hydraulic fluid temperature frequency distribution is selected.
Figure 21:
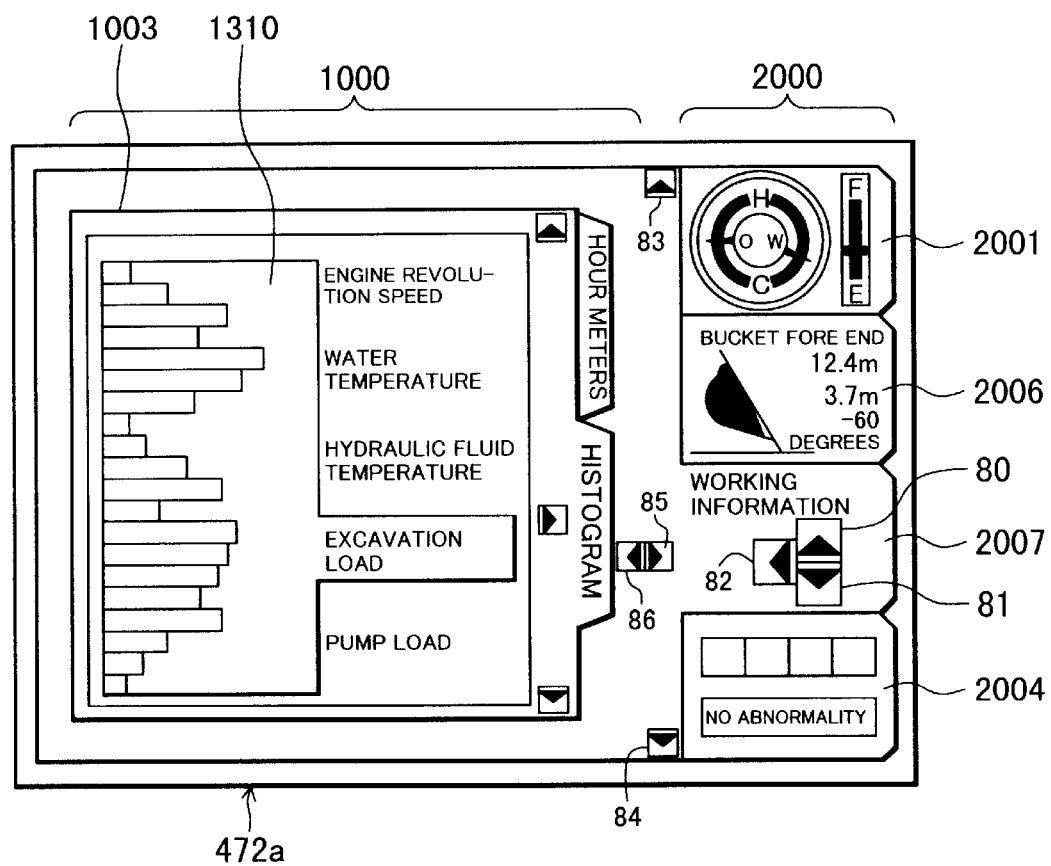
FIG. 21 shows still another example of the screen image displayed on the information display unit when a main screen displaying, as working information, an excavation load frequency distribution is selected.
Figure 22:
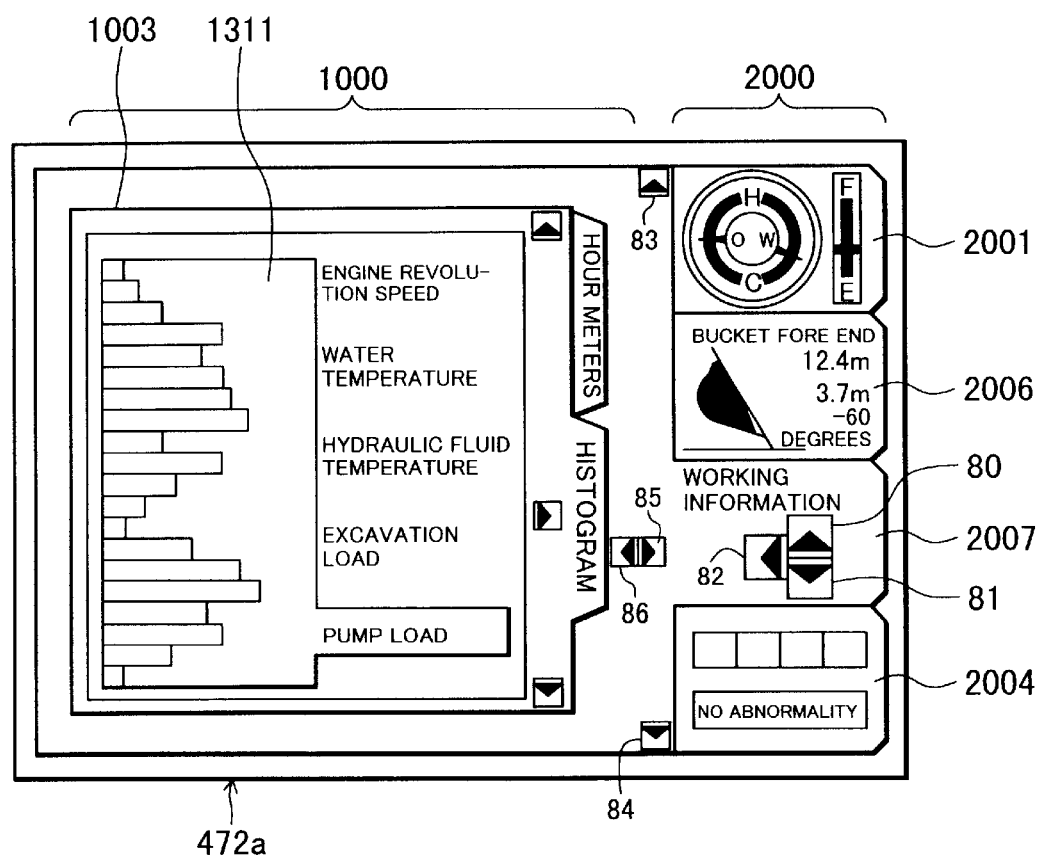
FIG. 22 shows still another example of the screen image displayed on the information display unit when a main screen displaying, as working information, a pump load frequency distribution is selected.

As shown in FIG. 14, the category C has two sub-categories (hierarchy 2). The main screen 1003 of the displayed screen image selectively displays, as shown in FIG. 14, one of the screen displaying information of the working time, which has been described above in connection with the first embodiment, and a screen displaying a frequency distribution of the body information in the form of a graph, which is newly added in this embodiment. Also, a sub-category level of the frequency distribution is divided into five sub-categories (hierarchy 3), i.e., the engine revolution speed frequency distribution, the cooling water temperature frequency distribution, the hydraulic fluid temperature frequency distribution, the excavation load frequency distribution, and the pump load frequency distribution. Any of those frequency distributions is selected and displayed. As shown in FIG. 17, the screen displaying information of the working time is the same as that shown in FIG. 6. The screen displaying the engine revolution speed frequency distribution displays a distribution 1307 of the working time with respect to the engine revolution speed, as shown in FIG. 18. The screen displaying the cooling water temperature frequency distribution displays a distribution 1308 of the working time (engine running time) with respect to the cooling water temperature, as shown in FIG. 19. The screen displaying the hydraulic fluid temperature frequency distribution displays a distribution 1309 of the working time (engine running time) with respect to the hydraulic fluid temperature, as shown in FIG. 20. The screen displaying the excavation load frequency distribution displays a distribution 1310 of the excavation operating time with respect to the excavation load, as shown in FIG. 21. The screen displaying the pump load frequency distribution displays a distribution 1311 of the pump operating time (engine running time) with respect to the pump load, as shown in FIG. 22. As with the category B, the sub-screen 2007 corresponding to the selected information category and the other sub-screens 2001, 2006, 2004 are the same as those in the first embodiment except that the symbolic illustration 82 for operation guide is additionally displayed in the sub-screen 2007. Further, when the information of the working time is displayed on the main screen 1003, the symbolic illustrations 83, 84, 85 for operation guide are displayed in the main display area 1000 as with the information category B. When the frequency distribution is displayed on the main screen 1003, a symbolic illustration 86 for operation guide is further displayed in the main display area 1000, as shown in FIGS. 18 to 22. The symbolic illustration 86 for operation guide serves as an aid for shift from the sub-category (hierarchy 2) to the lower sub-category (hierarchy 3) with key manipulation made on the operating portion 470, and is designed in imitation of the leftward arrow key 470c on the operating portion 470.

Category D

The category D is the same as that in the first embodiment.

The screens displayed as described above are given with respective label names as shown in FIG. 14. The meter information screen of the category A is named A-0-0. The body attitude information screen of the category B is named B-1-0, and the working device attitude information screen of the category B is named B-2-0. The working information screen of the category C is named C-1-0, the engine revolution speed frequency distribution screen of the category C is named C-2-1, the cooling water temperature frequency distribution screen of the category C is named C-2-2, the hydraulic fluid temperature frequency distribution screen of the category C is named C-2-3, the excavation load frequency distribution screen of the category C is named C-2-4, and the pump load frequency distribution screen of the category C is named C-2-5. The abnormality warning information screen of the category D is named D-0-0.

Herein, the first character of the label represents the type of category. The second character of the label represents the type of sub-category (hierarchy 2) if it exists. The third character of the label represents the type of lower sub-category (hierarchy 3) if it exists. For the category A that has no sub-category, the second and third characters are set to 0. Similarly, for the category D that has no sub-category, the second and third characters are set to 0. Since the category B has two sub-categories at the hierarchy 2, those sub-categories are named B-1 and B-2. Since each of B-1 and B-2 has no hierarchy 3, the third character of the label for the category B is set to 0. Thus, the labels of the screens belonging to the category B are given as B-1-0 and B-2-0. Since the category C has two sub-categories at the hierarchy 2, those sub-categories are named C-1 and C-2. Since C-1 has no hierarchy 3, the label of the screen belonging to the category C-1 is given as C-1-0. Since C-2 has five sub-categories at the hierarchy 3, the labels of the screens belonging to the category C-2 are given as C-2-1, C-2-2, C-2-3, C-2-4, and C-2-5 in order.

Accordingly, when A is selected upon category change, the screen A-0-0 is displayed. When B is selected upon category change, the screen B-1-0 or the screen B-2-0 is displayed. When C is selected upon category change, the screen C-1-0, the screen C-2-1, the screen C-2-2, the screen C-2-3, the screen C-2-4, or the screen C-2-5 is displayed. When D is selected upon category change, the screen D-0-0 is displayed.

Figure 23:
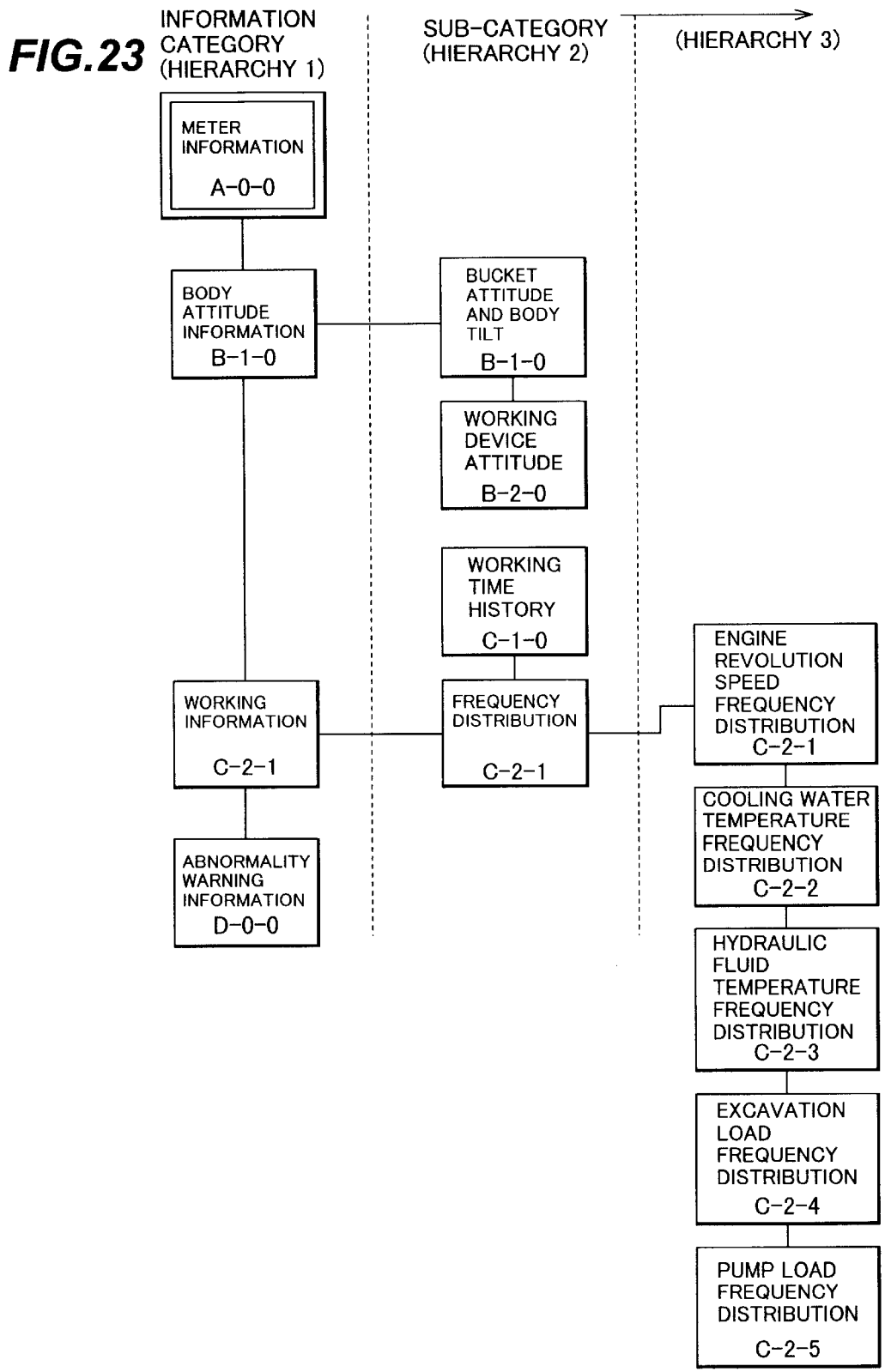
FIG. 23 is a block diagram showing screen transition in an initial state in the information display unit.

FIG. 23 is a block diagram showing screen transition in an initial state. In the initial state, as shown in FIG. 23, the engine revolution speed frequency distribution screen C-2-1 is selected as the frequency distribution from among ones from the engine revolution speed frequency distribution C-2-1 to the pump load frequency distribution C-2-5. Also, of the working time history C-1-0 and the frequency distribution C-2-1, the frequency distribution C-2-1 is selected as the working information and set as the initial state. Further, of the bucket attitude and body tilt B-1-0 and the working device attitude B-2-0, the bucket attitude and body tilt B-1-0 is selected as the body attitude information and set as the initial state. For the category A and the category D, since there are no sub-category options, the screen A-0-0 and the screen D-0-0 are set as the initial state. In addition, the initial screen is set so as to display the category A. Accordingly, the screen A-0-0 is displayed as the initial screen at the start-up of the information display unit 47.

Screen Displaying Process

Figure 24:
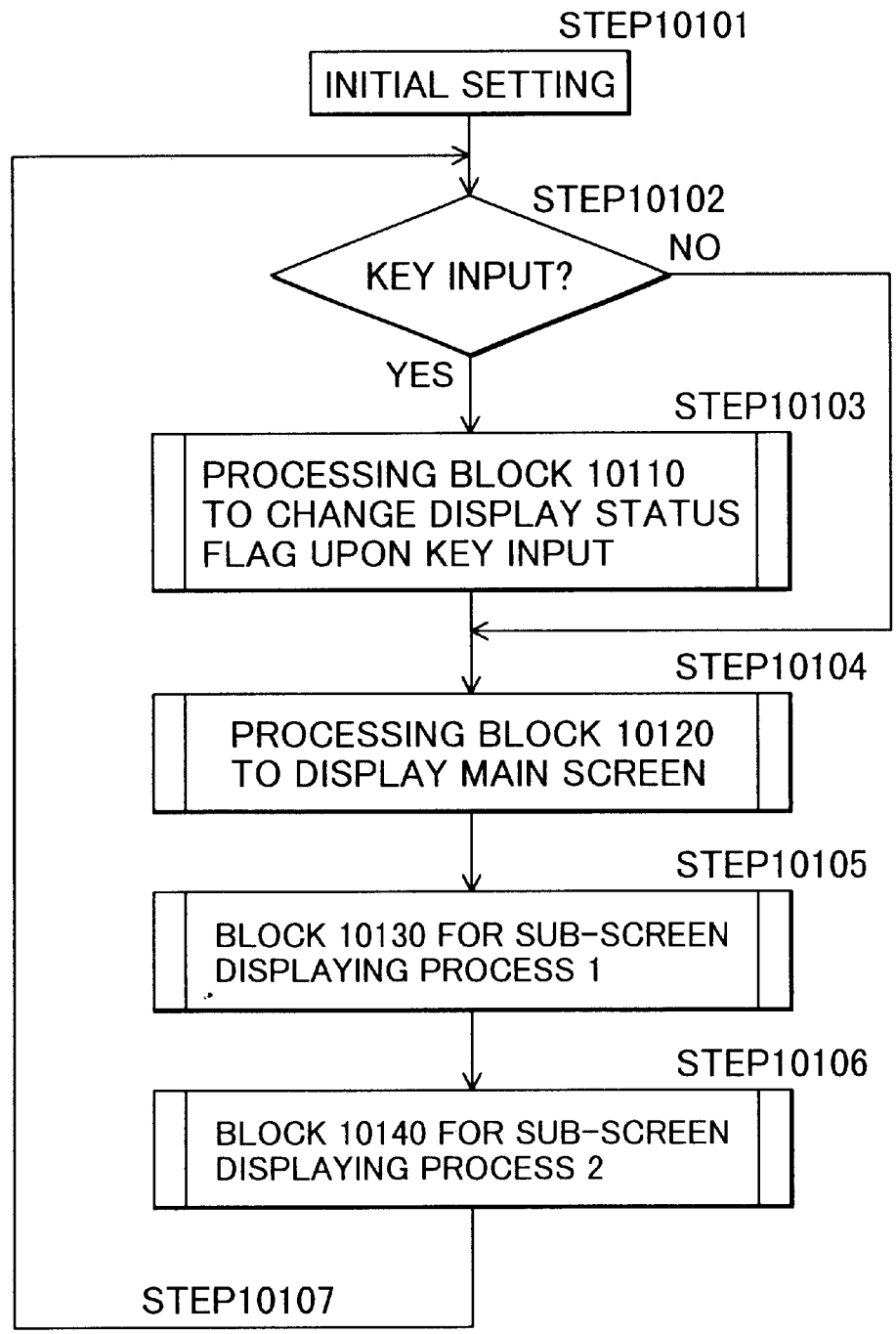
FIG. 24 is a flowchart showing processing steps of a screen displaying process in the information display unit.

The screen displaying process will be described below using a display status flag indicating the current display status. It is assumed that any of the label names assigned to the respective displayed screen images is set to the display status flag in accordance with transition of the display status. The processing flow is shown in FIG. 24.

(1) STEP 10101: First, the initial state is set as shown in the transition block diagram of FIG. 23, and the display status flag is set to A-0-0. In other words, the initial screen is set to the meter information screen.

(2) STEP 10102: It is then determined whether any of the arrow keys on the operating portion 470 of the information display unit 47 is depressed. If depressed, the processing flow goes to STEP 10103, and if not depressed, the processing flow goes to STEP 10104.

(3) STEP 10103: This step executes a processing block 10110 for changing the display status flag depending on the arrow key depressed.

(4) STEP 10104: This step executes a processing block 10120 for carrying out a main screen displaying process.

(5) STEP 10105: This step executes a block 10130 for carrying out a sub-screen displaying process 1 (displaying process for the sub-screen corresponding to the information category selected by the display status flag).

(6) STEP 10106: This step executes a block 10140 for carrying out a sub-screen displaying process 2 (displaying process for the sub-screen corresponding to the information category not selected by the display status flag).

(7) STEP 10107: The processing flow returns to STEP 10102 for repeating the subsequent steps.

Description of Processing Block 10110

Figure 25:
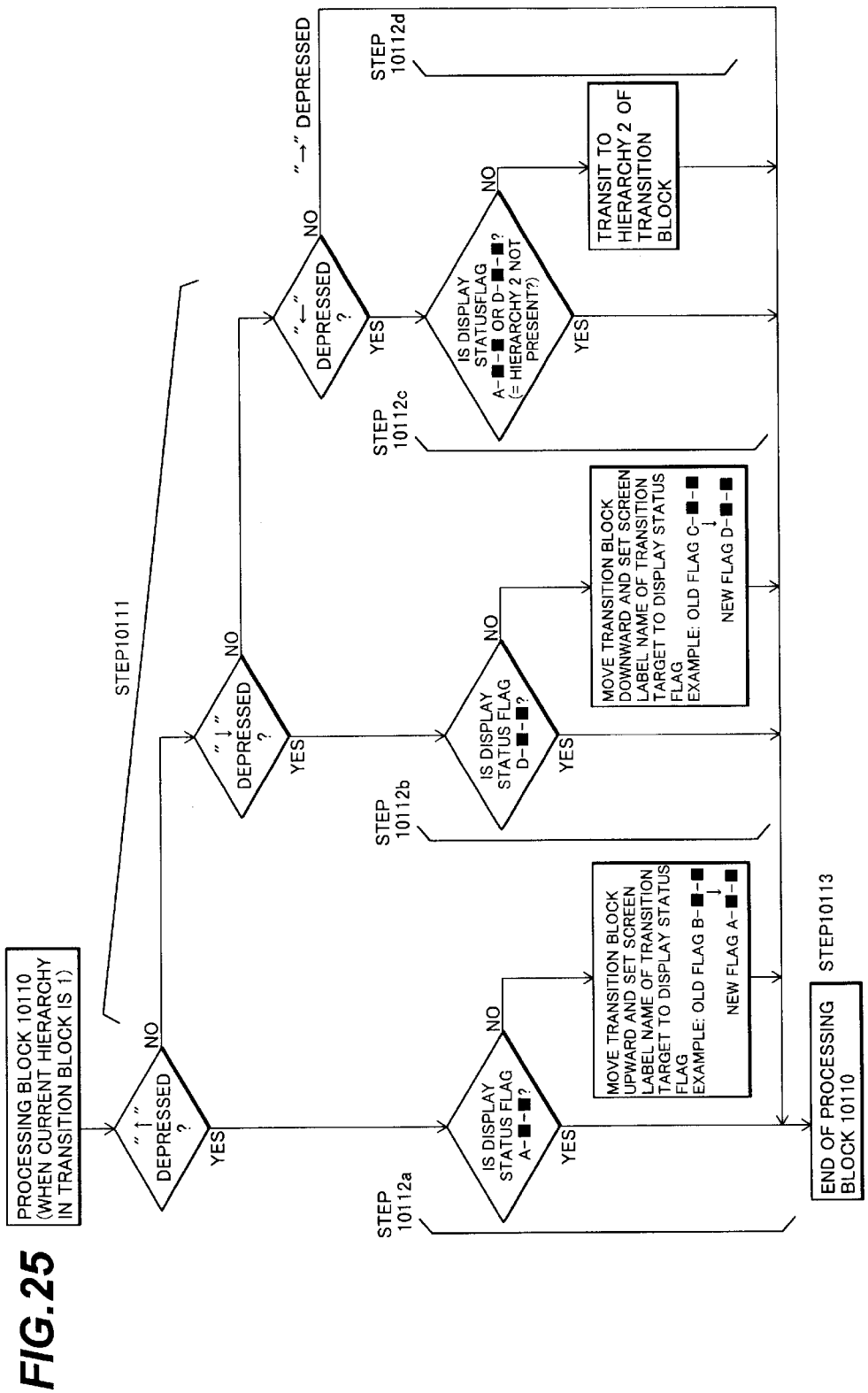
FIG. 25 is a flowchart showing detailed processing steps of a processing block 10110 shown in FIG. 24.
Figure 26:
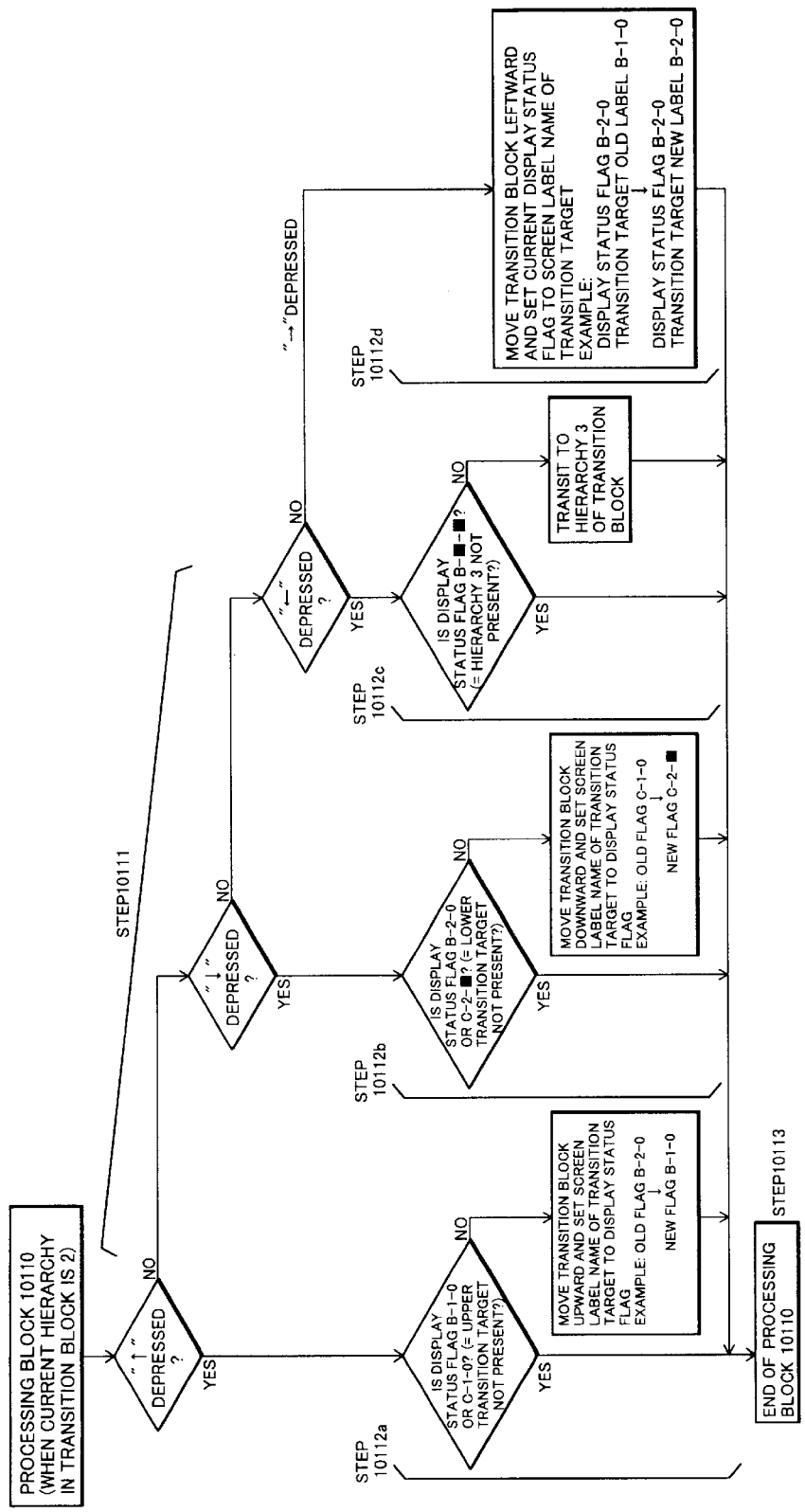
FIG. 26 is a flowchart showing detailed processing steps of the processing block 10110 shown in FIG. 24.
Figure 27:
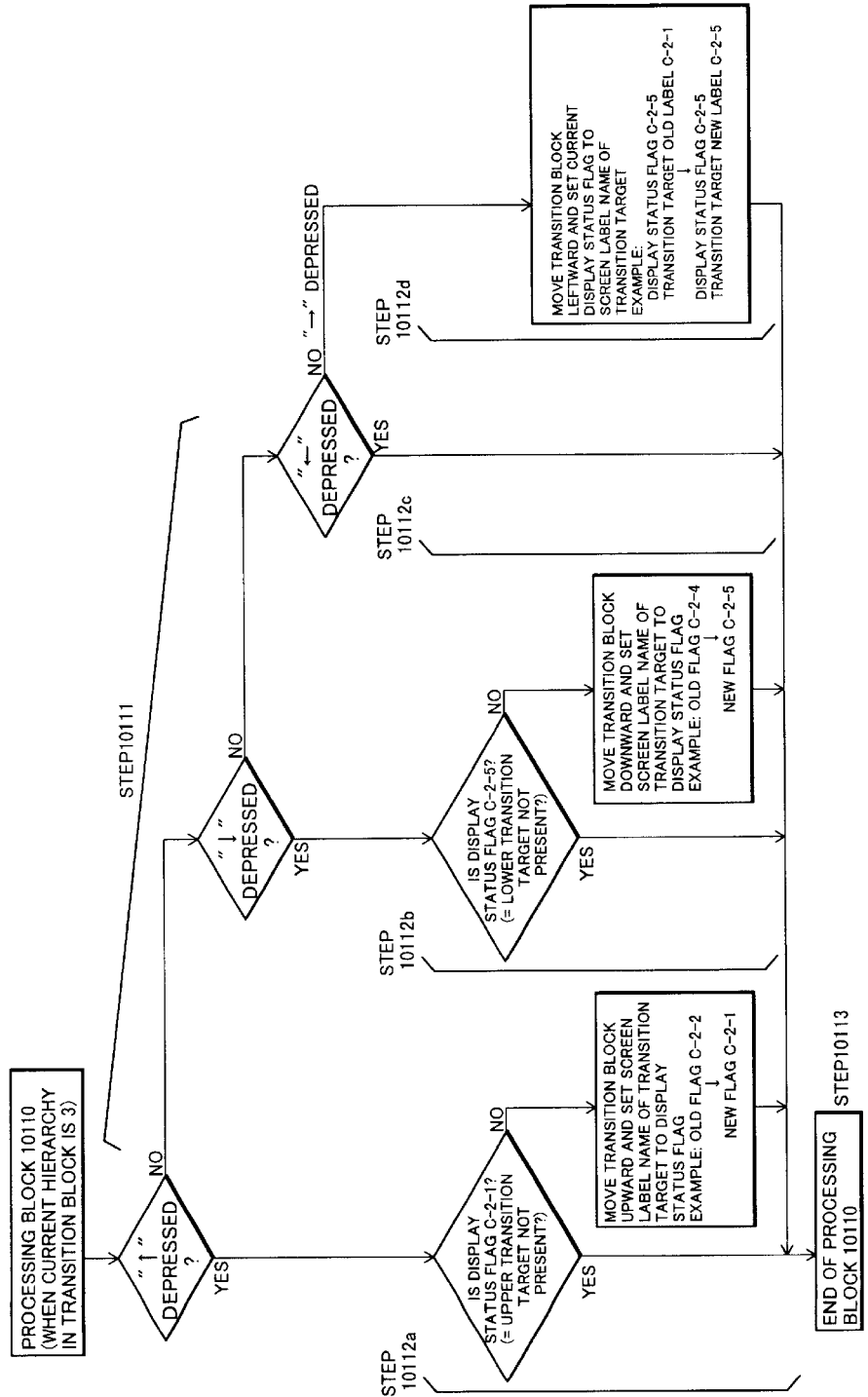
FIG. 27 is a flowchart showing detailed processing steps of the processing block 10110 shown in FIG. 24.

This block 10110 executes processing to change the display status flag depending on the arrow key depressed. Note that, in the screen transition block diagram of FIG. 23, the rightward direction in FIG. 23 represents a lower level of the sub-category hierarchy, but the leftward arrow key 470*c* (hereinafter indicated as "←" for brevity) is assigned to instruct a transition to the lower hierarchy level and the rightward arrow key 470*d* (hereinafter indicated as "→" for brevity) is assigned to instruct a transition to a higher hierarchy level in the following manipulation example in match with the display screen layout. The processing flows are shown in FIGS. 25 to 27.

(1) STEP 10111: As shown in FIGS. 25, 26 and 27, it is determined which one of the arrow keys "↑", "↓" "←" and "→" is depressed, taking into account at which one of the hierarchy levels the current state is present. If "↑" is depressed, the processing flow goes to STEP 10112*a*, and if "↓" is depressed, the processing flow goes to STEP 10112*b*. If "←" is depressed, the processing flow goes to STEP 10112*c*, and if "→" is depressed, the processing flow goes to STEP 10112*d*.

(2) STEP 10112*a*: As shown in FIGS. 25, 26 and 27, if there is a transition-enable screen adjacently positioned above the currently selected and displayed screen in the transition block diagram, the screen image is shifted to that screen and the label name of the screen as the transition target is set to the display status flag. If the current hierarchy is 2 or 3, the link from the adjacent left-hand hierarchy is rearranged for link to the screen of the transition target. If there is no transition-enable screen, the currently displayed screen is maintained. Then, the processing flow goes to STEP 10113.

(3) STEP 10112*b*: As shown in FIGS. 25, 26 and 27, if there is a transition-enable screen adjacently positioned under the currently selected and displayed screen in the transition block diagram, the screen image is shifted to that screen and the label name of the screen as the transition target is set to the display status flag. If the current hierarchy is 2 or 3, the link from the adjacent left-hand hierarchy is rearranged for link to the screen of the transition target. If there is no transition-enable screen, the currently displayed screen is maintained. Then, the processing flow goes to STEP 10113.

(4) STEP 10112*c*: As shown in FIGS. 25 and 26, if the current hierarchy is 1 or 2 and there is an adjacent right-hand hierarchy, a transition occurs to the right-hand hierarchy. On that occasion, the label name set to the display status flag is given by the label name of the screen as the transition target (namely, the display status flag is not changed). If there is no adjacent right-hand hierarchy or if the current hierarchy is 3 (FIG. 27), the currently displayed screen is maintained. Then, the processing flow goes to STEP 10113.

(5) STEP 10112*d*: As shown in FIGS. 26 and 27, if the current hierarchy is 2 or 3, a transition occurs to the left-hand hierarchy such that the currently displayed screen is selected as a displayed screen belonging to the adjacent left-hand hierarchy. On that occasion, the label name set to the display status flag is given by the label name of the screen as the transition target (namely, the display status flag is not changed). If the current hierarchy is 1 (FIG. 25), the currently displayed screen is maintained. Then, the processing flow goes to STEP 10113.

(6) STEP 10113: The block 10110 is brought into an end.

Description of Processing Block 10120

Figure 28:
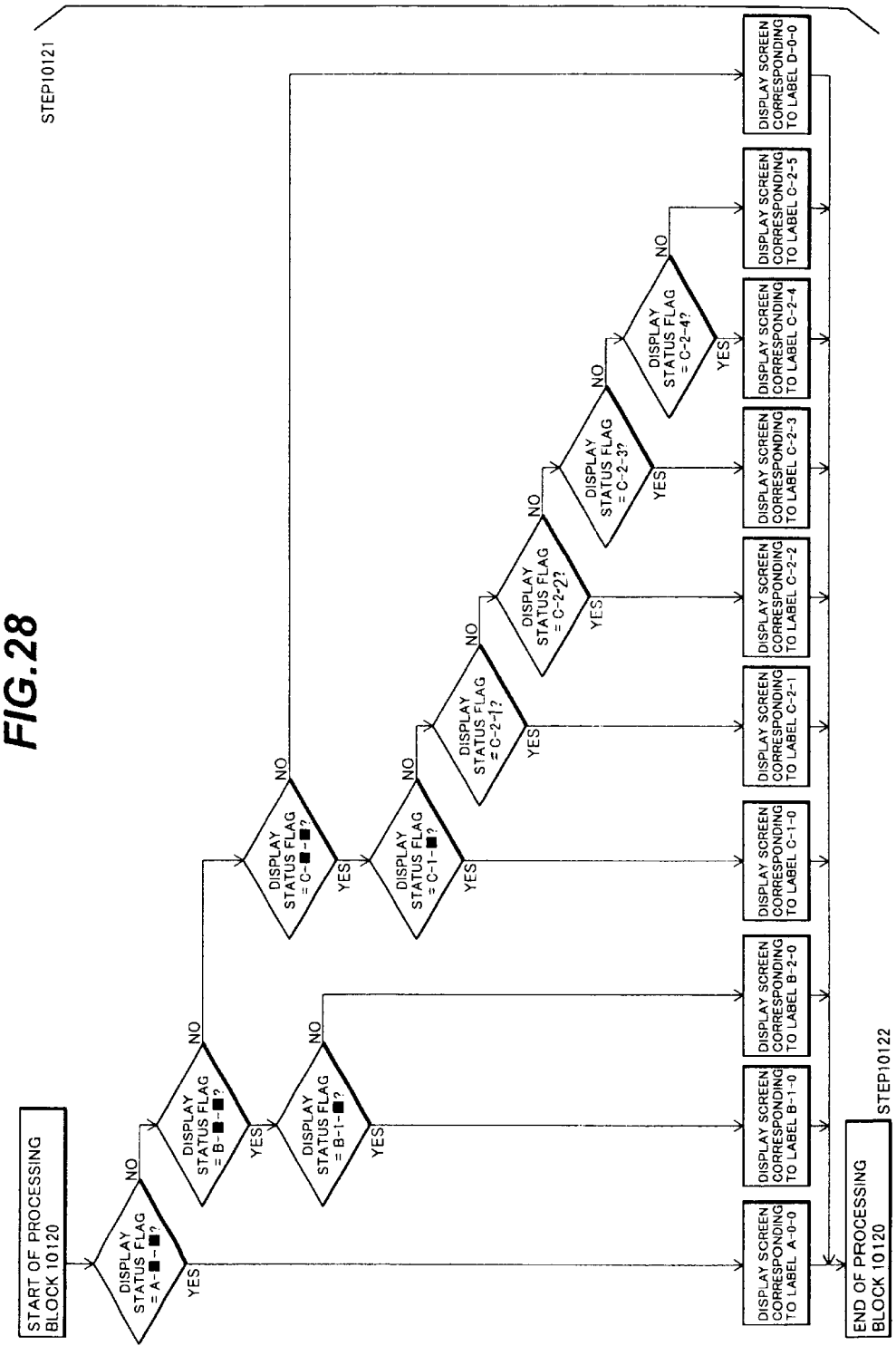
FIG. 28 is a flowchart showing detailed processing steps of a processing block 10120 shown in FIG. 24.

This block 10120 executes processing to draw the main screen corresponding to the label name set to the display status flag. The detailed drawing process for each main screen has been described above, and hence a repeated description thereof is omitted here. The processing flow is shown in FIG. 28.

(1) STEP 10121: The screen corresponding to the label name of the display status flag is drawn.

(2) STEP 10122: The block 10120 is brought into an end.

Description of Processing Block 10130

Figure 29:
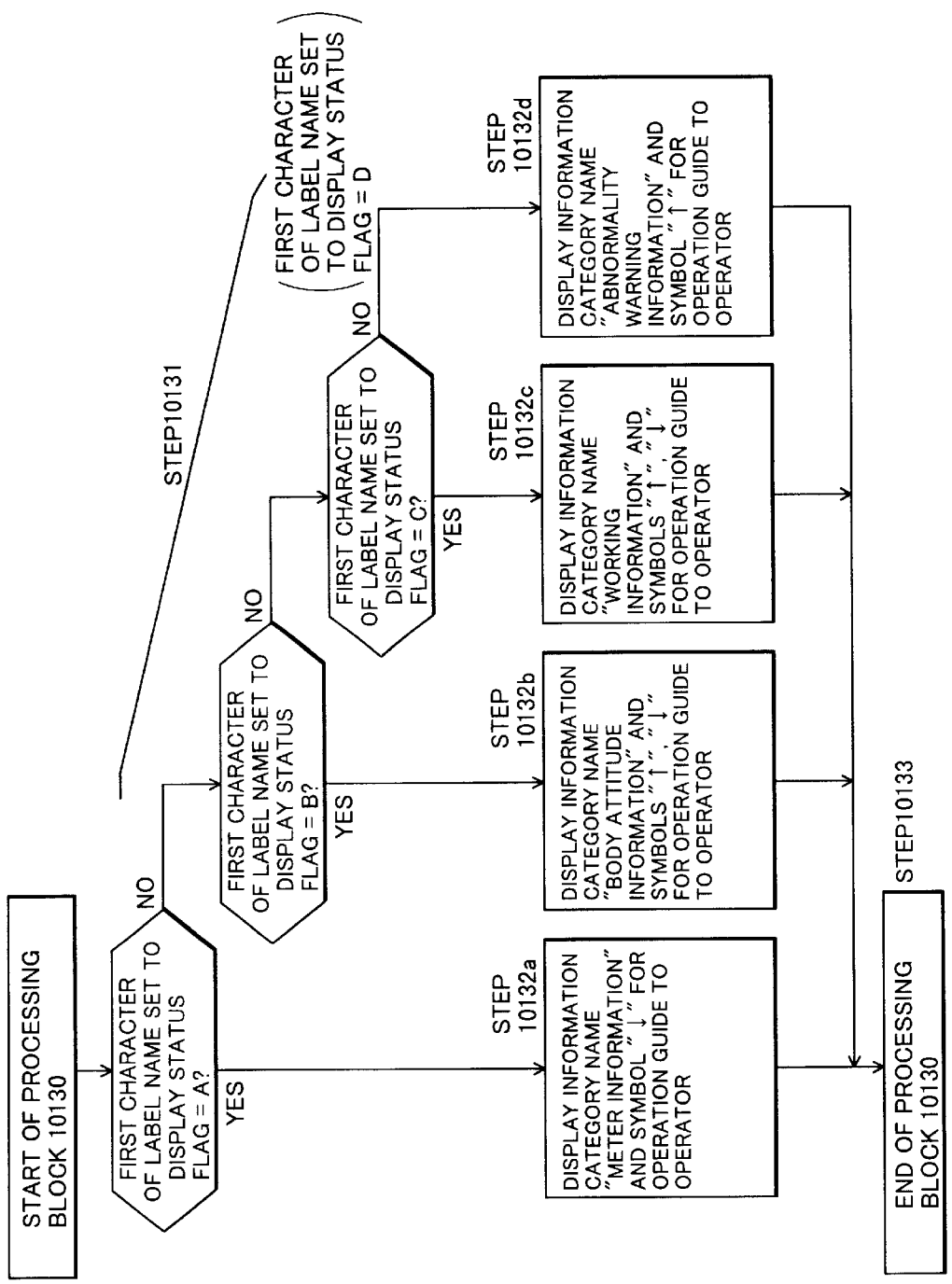
FIG. 29 is a flowchart showing detailed processing steps of a processing block 10130 shown in FIG. 24.

This block 10130 executes processing to display the sub-screen corresponding to the information category that corresponds to the first character of the label name set to the display status flag, i.e., the information category that is currently selected. The processing flow is shown in FIG. 29.

(1) STEP 10131: If the first character of the label name set to the display status flag is A, processing of STEP 10132*a* is executed. If it is B, processing of STEP 10132*b* is executed. If it is C, processing of STEP 10132*c* is executed. If it is D, processing of STEP 10132*d* is executed.

(2) STEP 10132*a*: The information category name "Meter Information" is displayed. Also, "↓" in imitation of the downward arrow key 470*d* is displayed as the symbolic illustration 80 for operation guide to the operator. Then, the processing flow goes to STEP 10133.

(3) STEP 10132b: The information category name "Body Attitude Information" is displayed. Also, "↑" and "↓" in imitation of the upward and downward arrow keys 470a, 470b are displayed as the symbolic illustrations 80, 81 for operation guide to the operator. Then, the processing flow goes to STEP 10133.

(4) STEP 10132c: The information category name "Working Information" is displayed. Also, "↑" and "↓" in imitation of the upward and downward arrow keys 470a, 470b are displayed as the symbolic illustrations for operation guide to the operator. Then, the processing flow goes to STEP 10133.

(5) STEP 10132d: The information category name "Abnormality Warning Information" is displayed. Also, "↑" in imitation of the upward arrow key 470a is displayed as the symbolic illustration 81 for operation guide to the operator. Then, the processing flow goes to STE 10133.

(6) STEP 10133: The block 10130 is brought into an end.

Description of Processing Block 10140

Figure 30:
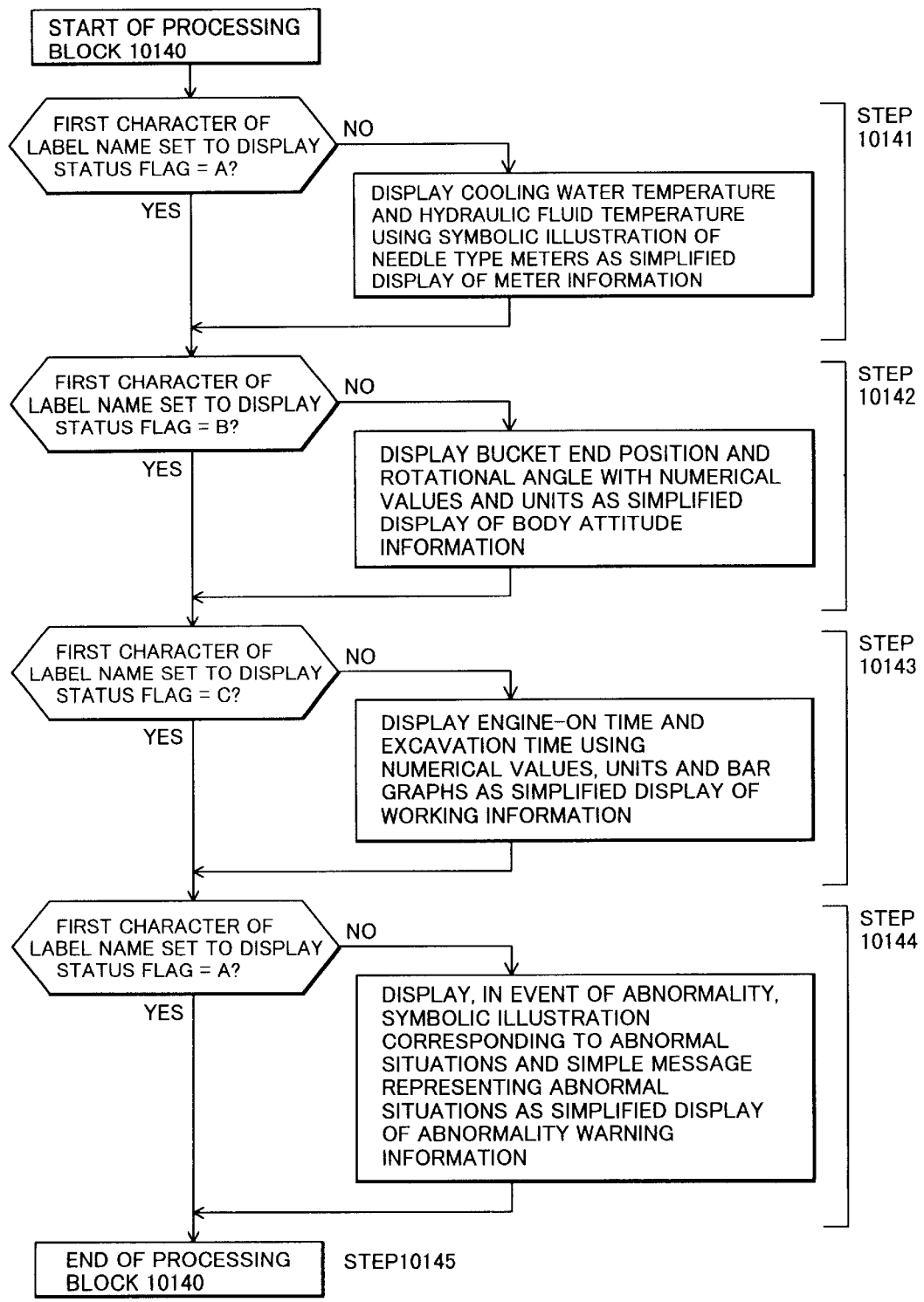
FIG. 30 is a flowchart showing detailed processing steps of a processing block 10140 shown in FIG. 24.
Figure 31B:
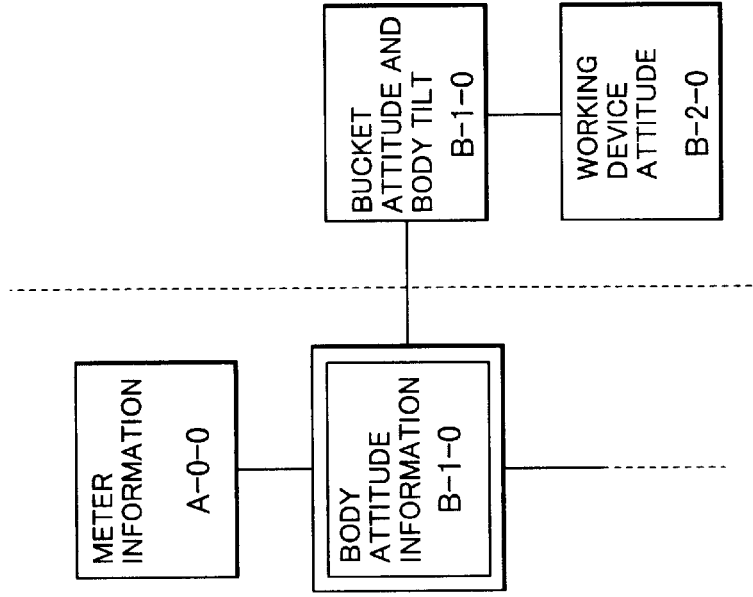
Figure 31A:
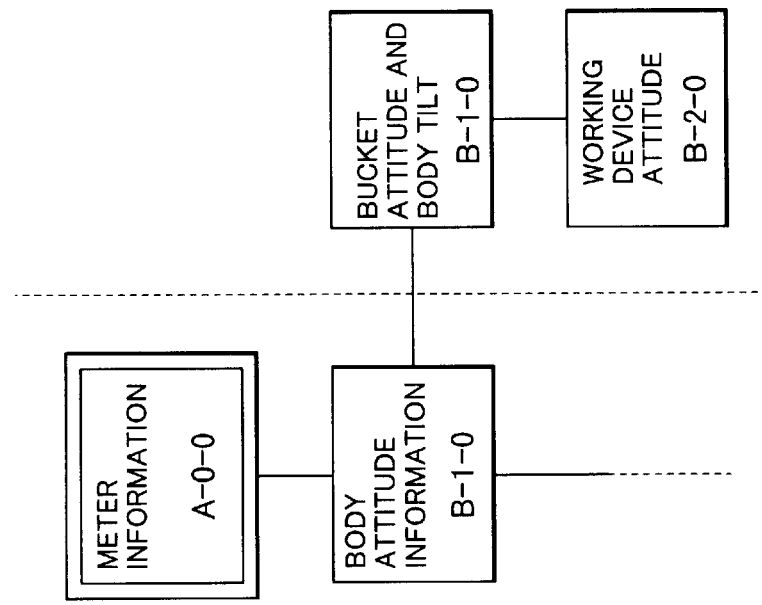
Figure 32:
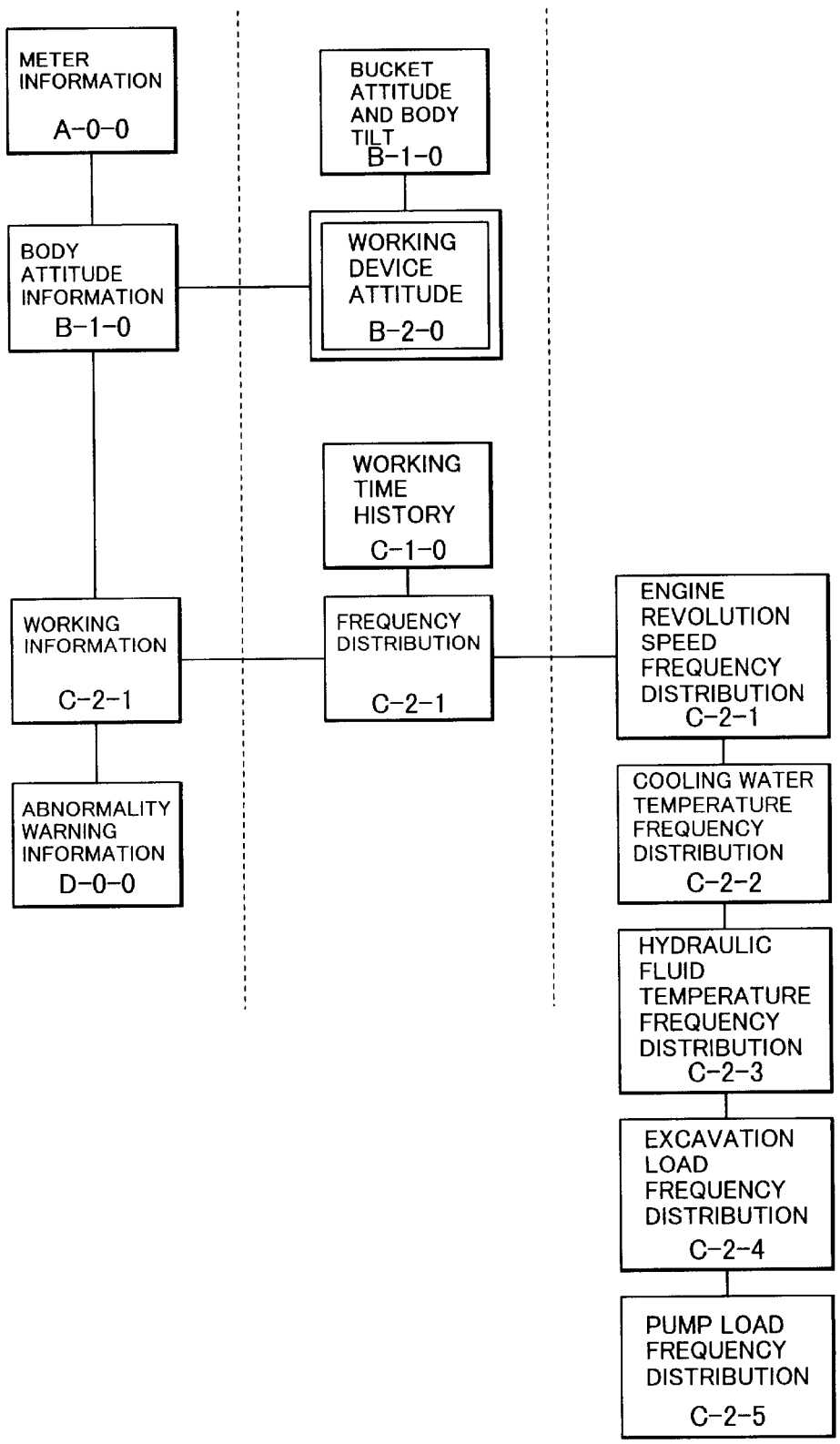
FIG. 32 shows a part of procedures of Image Transition Example 2 in the second embodiment.
Figure 33:
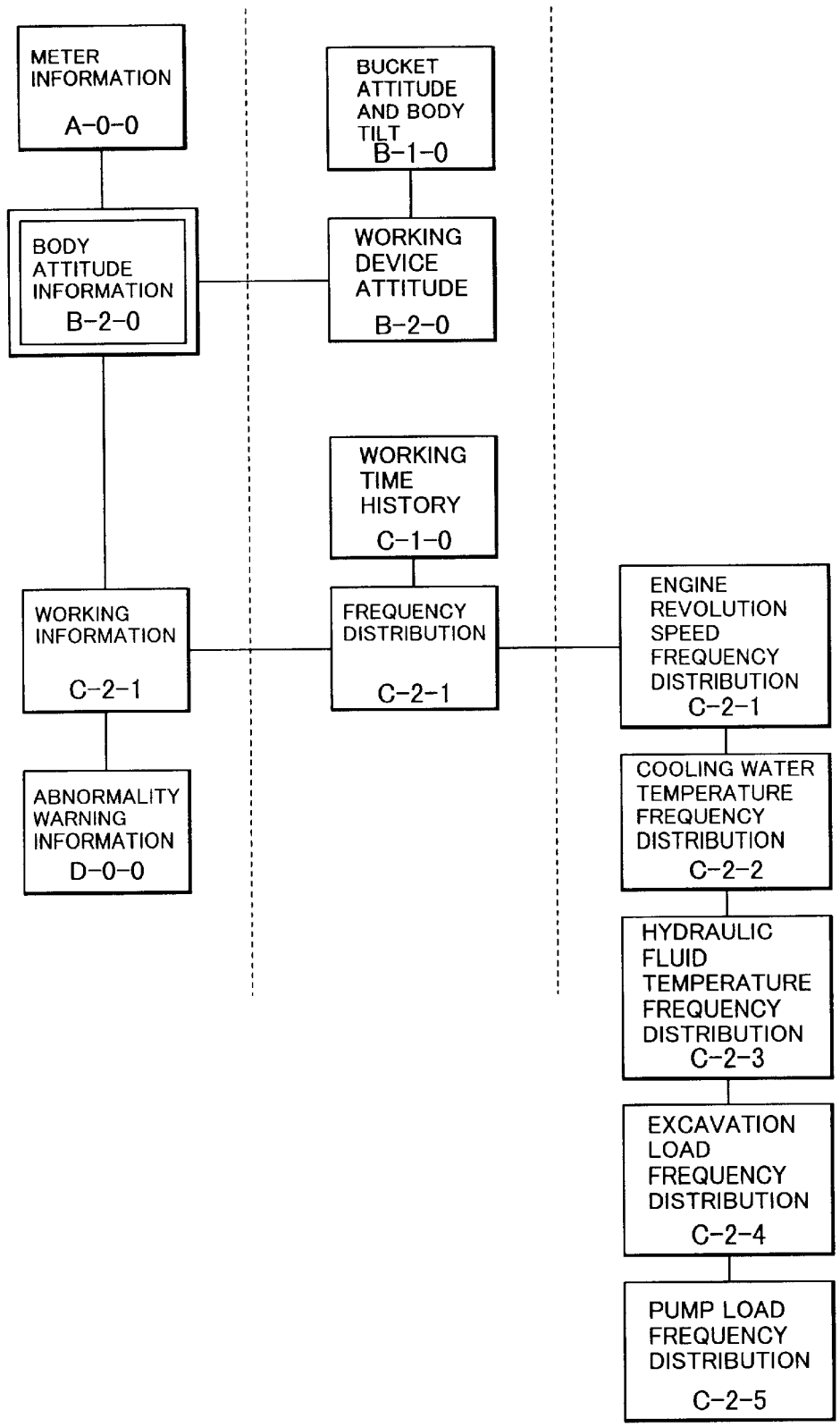
FIG. 33 shows a part of the procedures of Image Transition Example 2 in the second embodiment.
Figure 34:
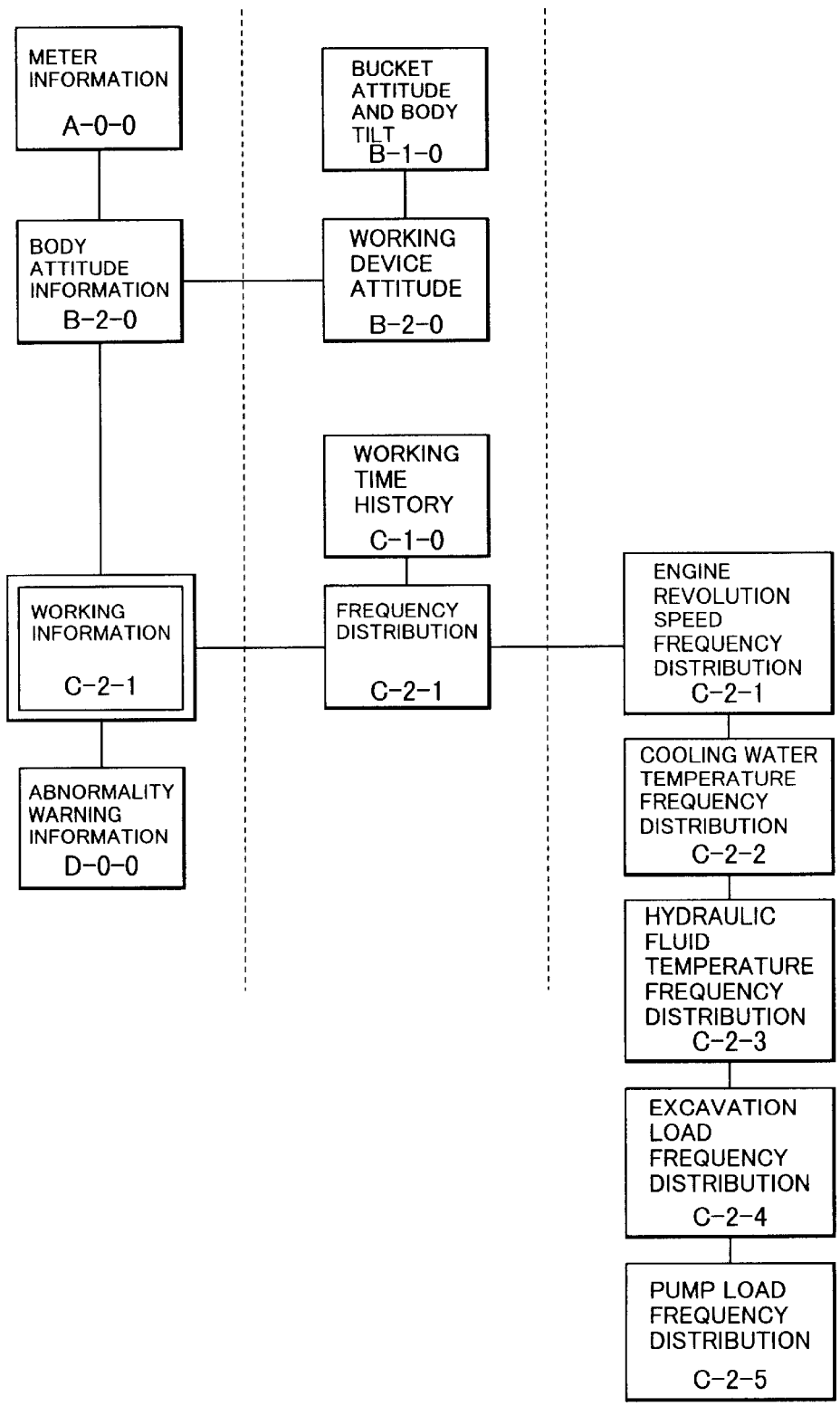
FIG. 34 shows a part of the procedures of Image Transition Example 2 in the second embodiment.
Figure 35:
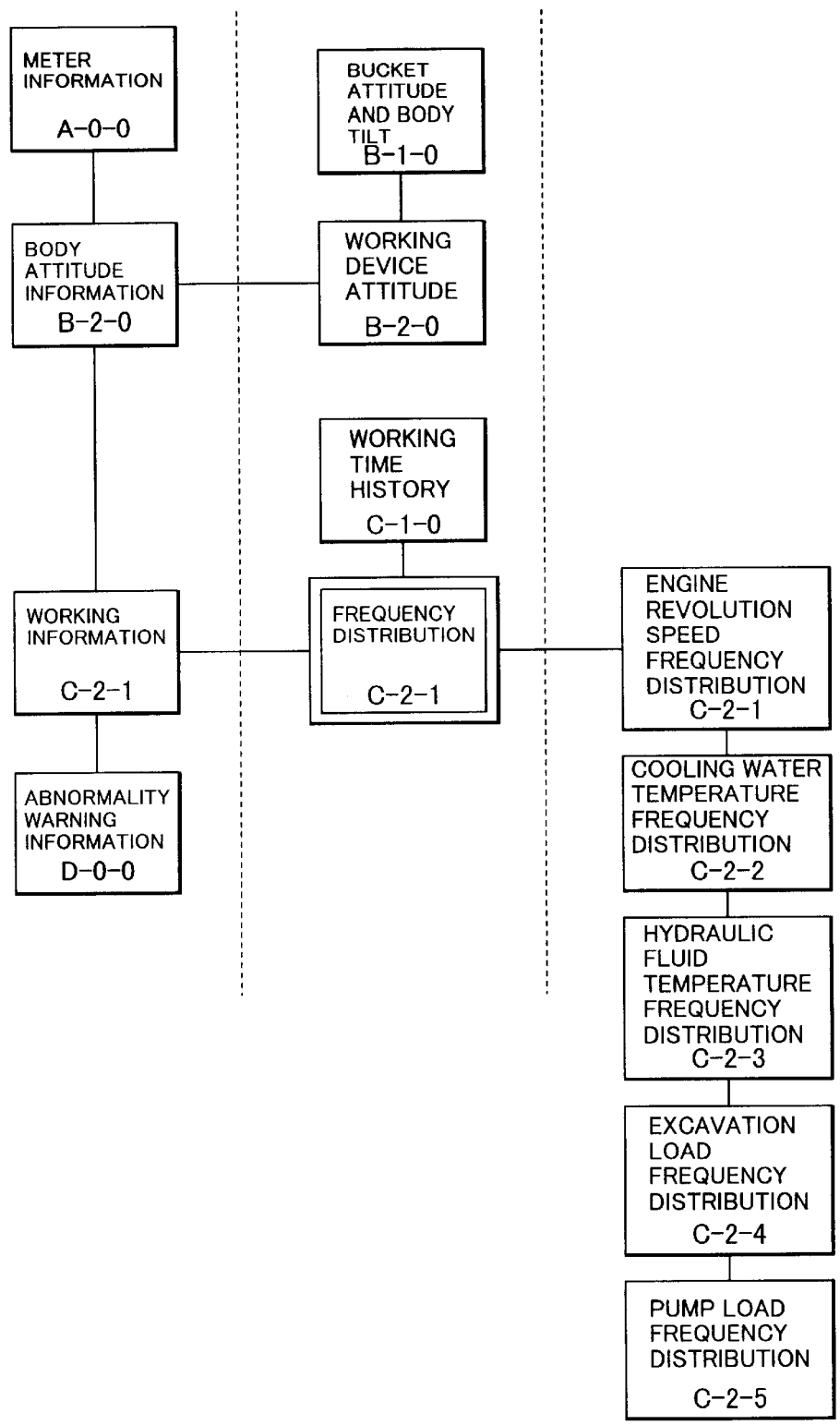
FIG. 35 shows a part of the procedures of Image Transition Example 2 in the second embodiment.
Figure 36:
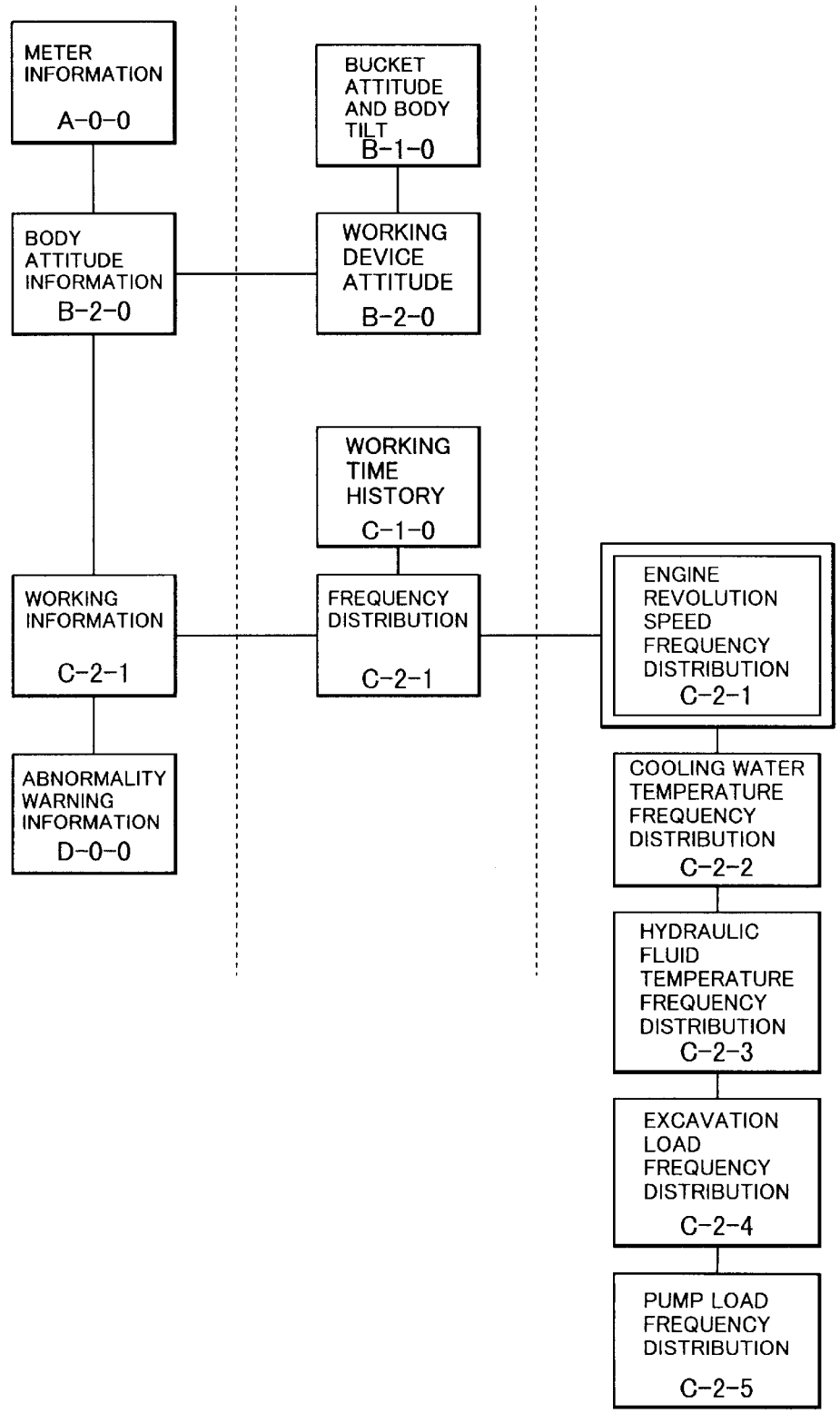
FIG. 36 shows a part of the procedures of Image Transition Example 2 in the second embodiment.
Figure 37:
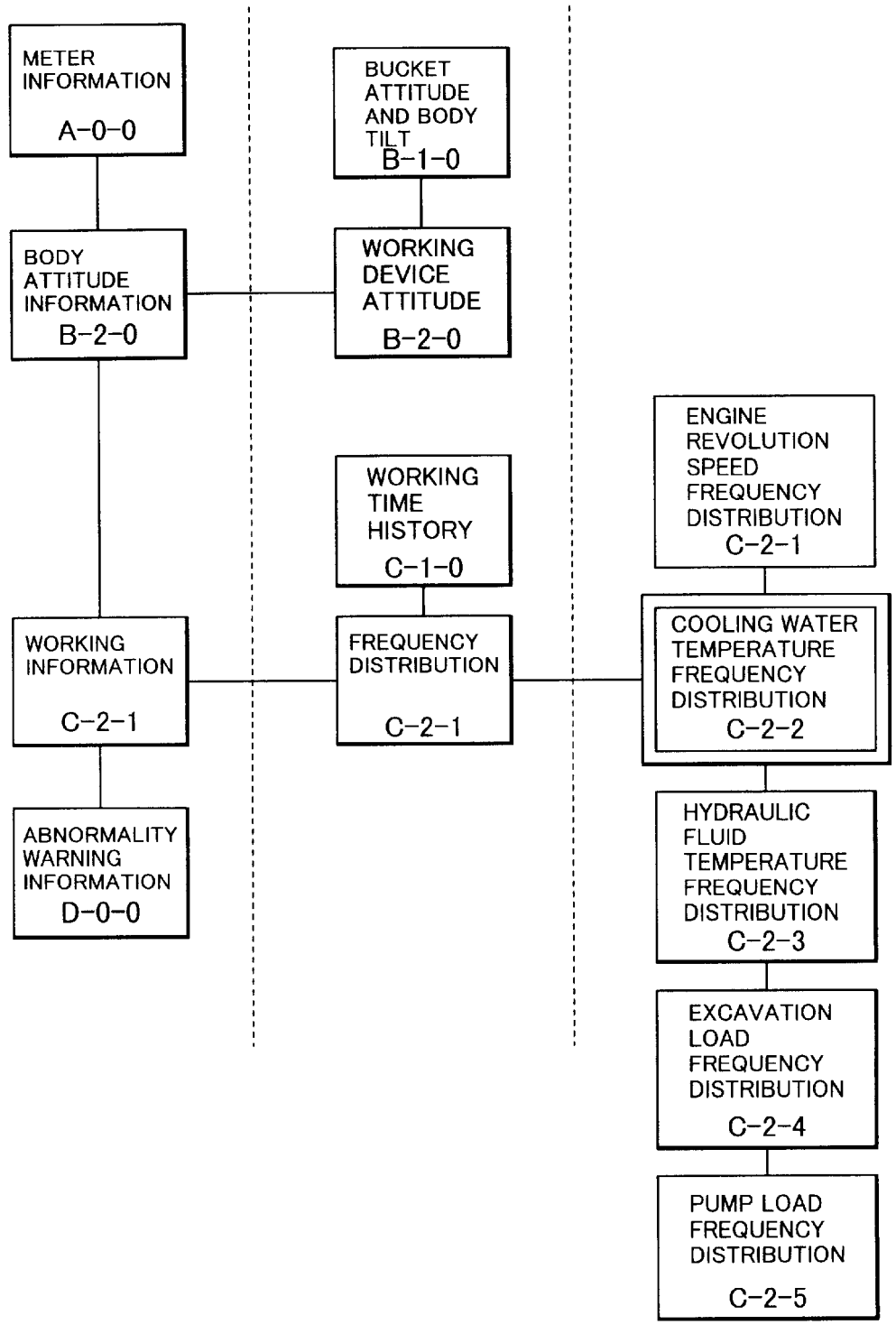
FIG. 37 shows a part of the procedures of Image Transition Example 2 in the second embodiment.
Figure 38:
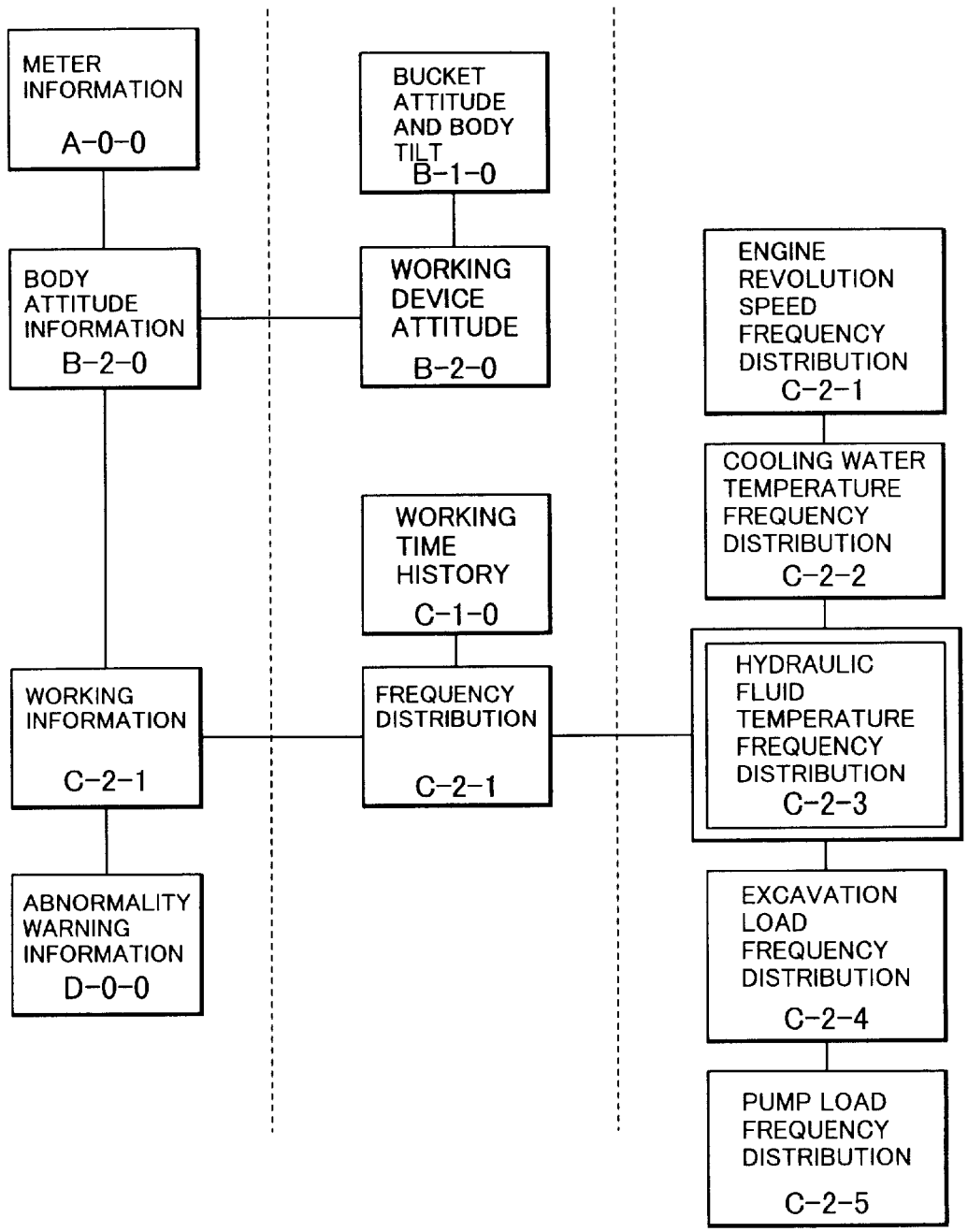
FIG. 38 shows a part of the procedures of Image Transition Example 2 in the second embodiment.

This block 10140 executes processing to display the sub-screen corresponding to the information category not selected by the first character of the label name set to the display status flag. The processing flow is shown in FIG. 30.

(1) STEP 10141: If the first character of the label name set to the display status flag is not A, the cooling water temperature and the hydraulic fluid temperature are displayed using symbolic illustrations of needle type meters as the simplified form of the meter information. The meters calculate the needle positions and update the drawn illustrations successively in accordance with information of the cooling water temperature and the hydraulic fluid temperature obtained via communication.

(2) STEP 10142: If the first character of the label name set to the display status flag is not B, the bucket end position and rotational angle are displayed with numerical values and units as the simplified form of the body attitude information. Also, the symbolic illustration of the bucket looking from the lateral side is displayed while it is successively rotated in match with the bucket rotational angle.

(3) STEP 10143: If the first character of the label name set to the display status flag is not C, the engine-on time and the excavation time both obtained via communication are displayed with numerical values, units and bar type graphs as the simplified form of the working information.

(4) STEP 10144: If the first character of the label name set to the display status flag is not D, the symbolic illustration previously related to the nature of abnormality is displayed upon the occurrence of abnormality in accordance with abnormality warning information obtained via communication as the simplified form of the abnormality warning information so that the operator is notified of the abnormality occurrence. At the same time, a brief message indicating the situations of the abnormality is displayed. When information representing cancellation of the abnormality is obtained via communication, display of the symbolic illustration corresponding to the nature of abnormality and the message indicating the details of abnormality are ceased.

(5) STEP 10145: The block 10140 is brought into an end.

Practical Manipulation and Screen Transition Example 1 in Second Embodiment

Procedures for changing the main screen image from the meter information screen A-0-0 in the initial state to the working device attitude B-2-0 will be described as a first manipulation example in the second embodiment with reference to screen transition block diagrams of FIGS. 31A to 31D.

(1) The label name set to the display status flag in the initial state is A-0-0. The display status is shown in the screen transition block diagram of FIG. 31A.

(2) "↓" is entered with depression. The displayed screen is shifted downward as shown in the screen transition block diagram of FIG. 31B. The label name set to the display status flag is changed to B-1-0.

(3) "→" is entered with depression. The displayed screen is shifted to the right as shown in the screen transition block diagram of FIG. 31C. The label name set to the display status flag remains B-1-0.

(4) "↓" is entered with depression. The displayed screen is shifted downward as shown in the screen transition block diagram of FIG. 31D, and the link from the adjacent left-hand hierarchy is rearranged for link to the screen of the transition target. The label name set to the display status flag is changed to B-2-0.

With the above-mentioned procedures, the main screen image can be changed from the meter information screen A-0-0 in the initial state to the working device attitude B-2-0.

Practical Manipulation and Screen Transition Example 2 in Second Embodiment

Procedures for changing the main screen image from the working device attitude B-2-0 to the hydraulic fluid temperature frequency distribution C-2-3 will be described as a second manipulation example in the second embodiment with reference to screen transition block diagrams of FIGS. 32 to 38.

(1) The label name set to the display status flag is assumed to be B-2-0. The display status is shown in the screen transition block diagram of FIG. 32.

(2) "←" is entered with depression. The displayed screen is shifted to the left as shown in th screen transition block diagram of FIG. 33. The label name s t to the display status flag remains B-2-0.

(3) "↓" is entered with depression. The displayed screen is shifted downward as shown in the screen transition block diagram of FIG. 34. The label name set to the display status flag is changed to C-2-1.

(4) "→" is entered with depression. The displayed screen is shifted to the right as shown in t e screen transition block diagram of FIG. 35. The label name set to the display status flag remains C-2-1.

(5) "→" is entered with depression. The displayed screen is shifted to the right as shown in the screen transition block diagram of FIG. 36. The label name set to the display status flag remains C-2-1.

(6) "↓" is entered with depression. The displayed screen is shifted downward as shown in the screen transition block diagram of FIG. 37, and the link from the adjacent left-hand hierarchy is rearranged for link to the screen of the transition target. The label name set to the display status flag is changed to C-2-2.

(7) "↓" is entered with depression. The displayed screen is further shifted downward as shown in the screen transition block diagram of FIG. 38, and the link from the adjacent left-hand hierarchy is rearranged for link to the screen of the transition target. The label name set to the display status flag is changed to C-2-3.

With the above-mentioned procedures, the main screen image can be changed from the working device attitude B-2-0 to the hydraulic fluid temperature frequency distribution C-2-3.

Advantages of Second Embodiment

This second embodiment can provide the following advantages in addition to the above-described advantages obtainable with the first embodiment.

Of the plurality of information categories, the categories B, C each include a combination of plural items of sub-category information. The main screen in the main display area 1000 selectively displays one of the plural items of sub-category information, and the sub-category information displayed on the main screen can be selected and changed with key manipulation made on the operating portion 470. It is therefore possible to increase the number of kinds of information categories capable of being displayed in the main display area 1000, and to display plural kinds of information in a combined and selective manner.

Also, when the selected sub-category information is displayed on the main screen in the main display area 1000, the sub-screen in the sub-display area 2000 corresponding to the information category, to which the selected sub-category information belongs, displays not only the symbolic illustrations 80, 81 for operation guide, which are in imitation of arrow keys and serve as aids for the operator when changing the information category with key manipulation made on the operating portion 470, but also the symbolic illustrations 82 to 86 for operation guide, which are provided in imitation of arrow keys and serve as aids for the operator when changing the sub-category information with key manipulation made on the operating portion 470. Even with an increase in the number of kinds of information to be displayed, therefore, the operator can easily change the information displayed in the main display area 1000 with key manipulation made on the operating portion 470.

Third Embodiment

A third embodiment of the present invention will be described with reference to FIG. 39.

While the control units and the monitoring units are connected to the information display unit via one common communication line in the first and second embodiments, the control units and the monitoring units are connected to the information display unit via respective independent communication lines in this embodiment.

Figure 39:
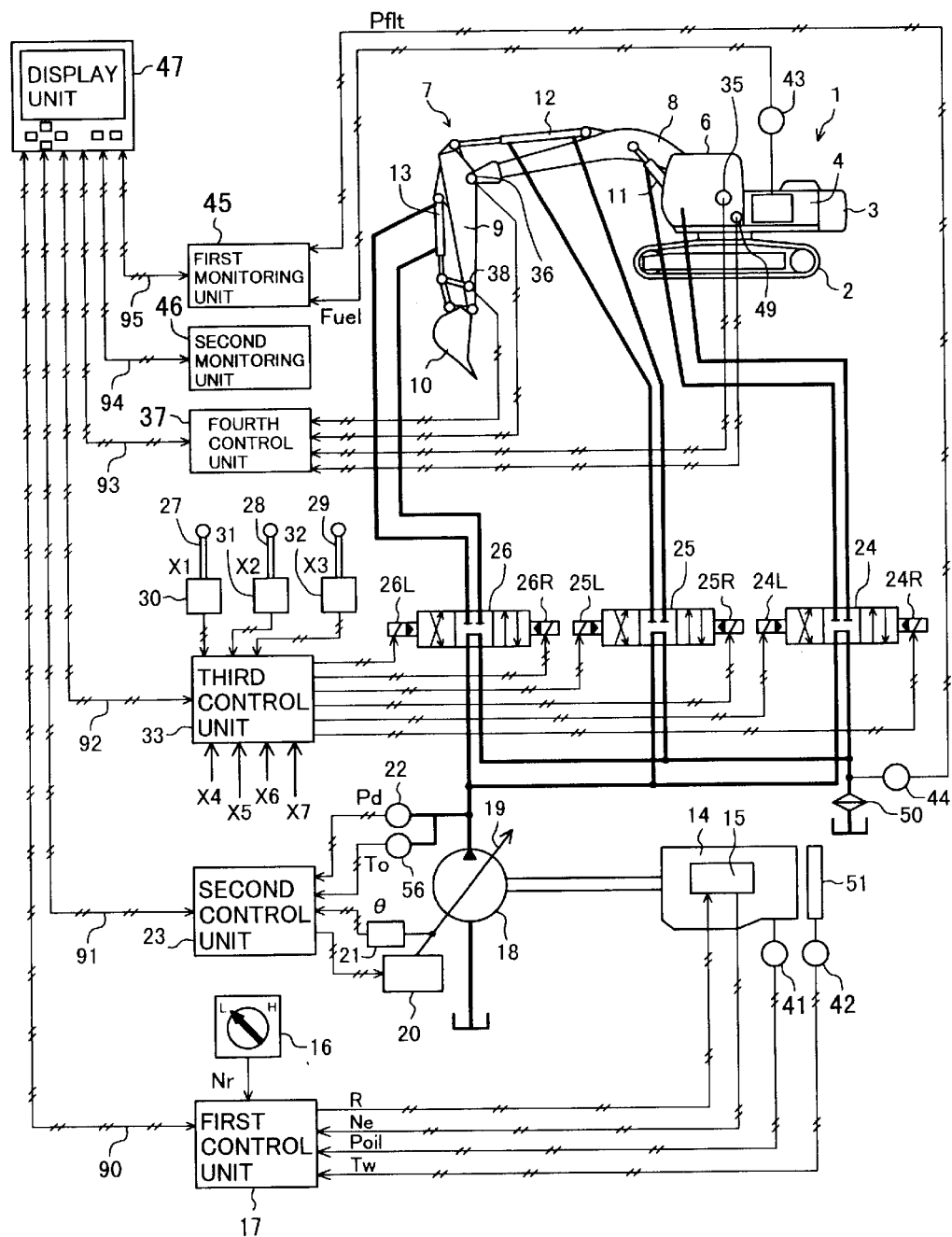
FIG. 39 is a block diagram showing an electronic control system of a hydraulic excavator equipped with an information display unit according to a third embodiment of the present invention, along with the hydraulic excavator and a hydraulic system mounted therein.

In FIG. 39, the first to fourth control units 17, 23, 33, 37 and the first and second monitoring units 45, 46 are connected to the information display unit 47 via individual communication lines 90 to 95, respectively. The information display unit 47 transmits and receives data to and from the control units and the monitoring units via the communication lines 90 to 95. The information display unit 47 comprises an operating portion 470, a display control portion 471, and a display portion 472 (FIG. 2) that are similar to those in the first and second embodiments.

This third embodiment can also provide the similar advantages to those obtainable with the first and second embodiments.

Fourth Embodiment

A fourth embodiment of the present invention will be described with reference to FIGS. 40 to 56. While the screen image displayed on the screen of the display portion of the information display unit (i.e., the displayed screen image) is divided into the main display area and sub-display area in the first and second embodiments, the displayed screen image is not so clearly divided into areas in this fourth embodiment so that the sub-screen has flexibility in position at which it is displayed.

Figure 40:
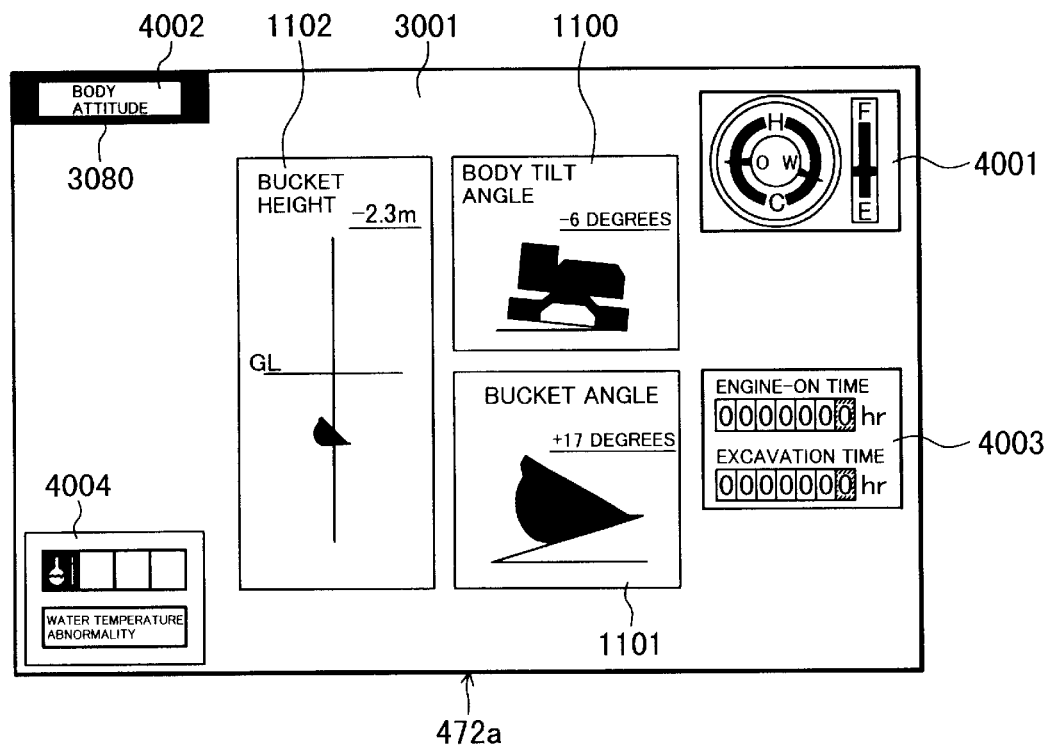
FIG. 40 shows one example of a screen image displayed on an information display unit according to a fourth embodiment of the present invention when a main screen displaying body attitude information is selected.
Figure 41:
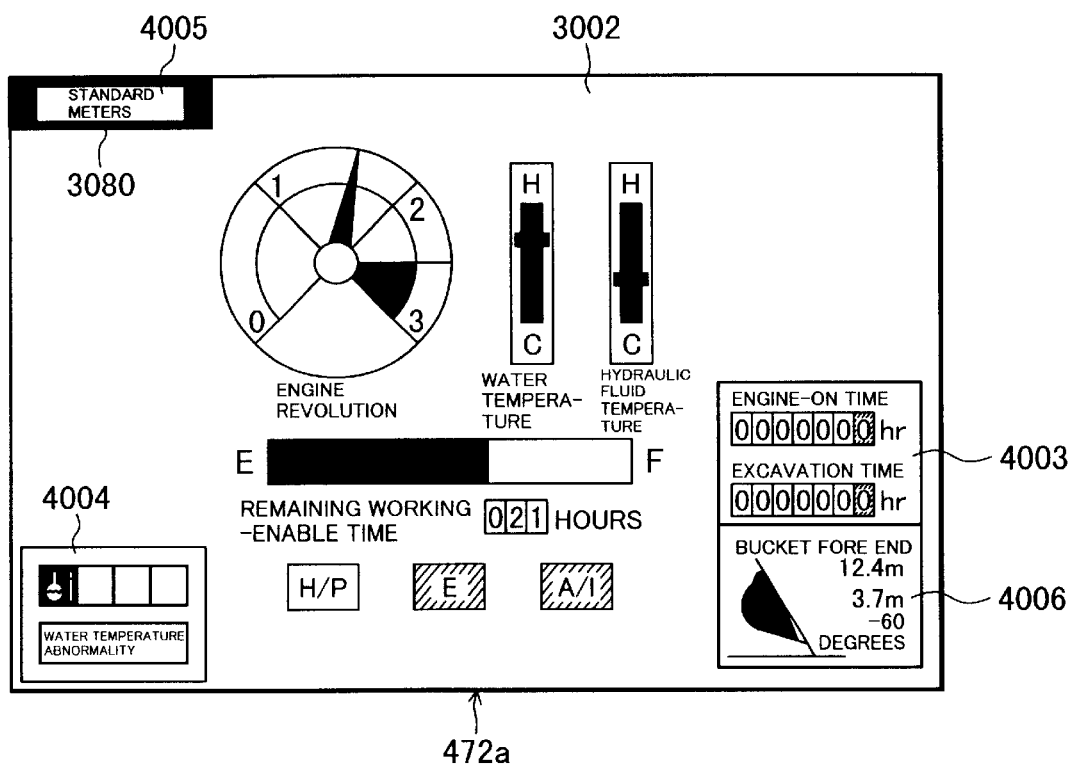
FIG. 41 shows another example of the screen image displayed on the information display unit when a main screen displaying meter information is selected.
Figure 42:
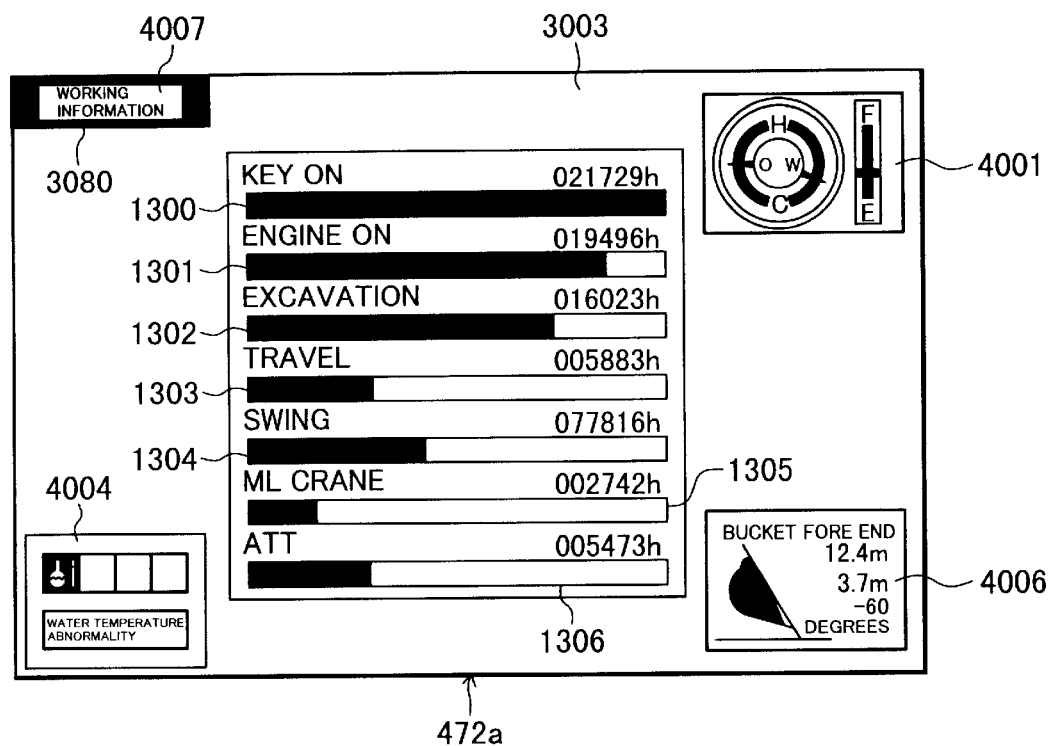
FIG. 42 shows still another example of the screen image displayed on the information display unit when a main screen displaying working time information is selected.
Figure 43:
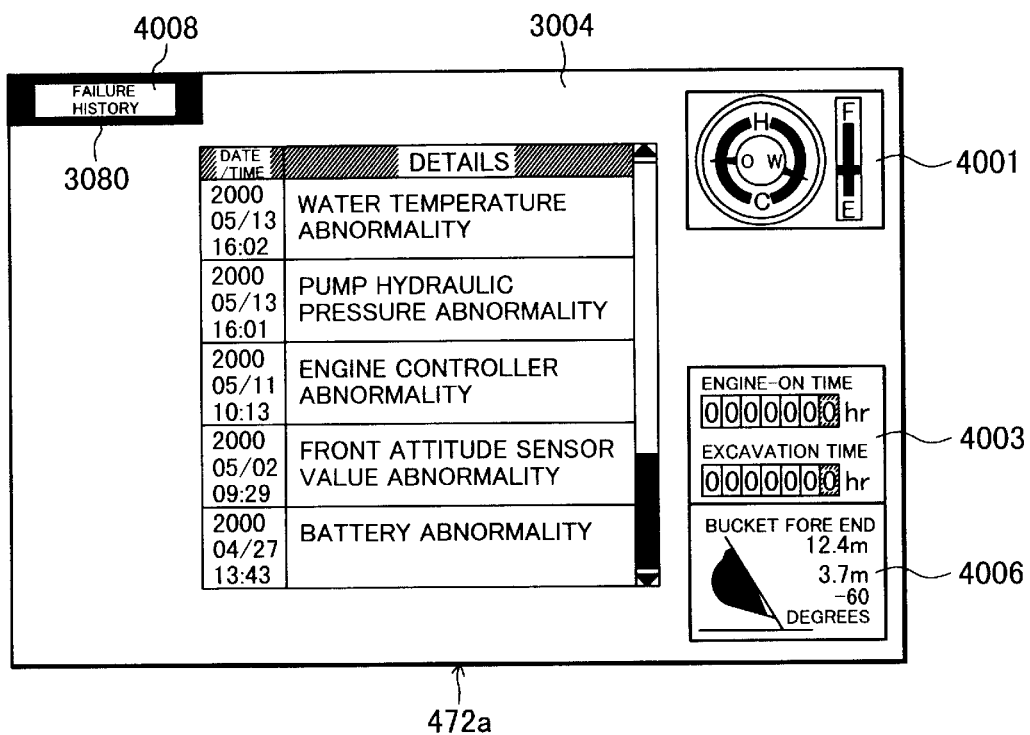
FIG. 43 shows still another example of the screen image displayed on the information display unit when a main screen displaying abnormality warning information is selected.
Figure 44:
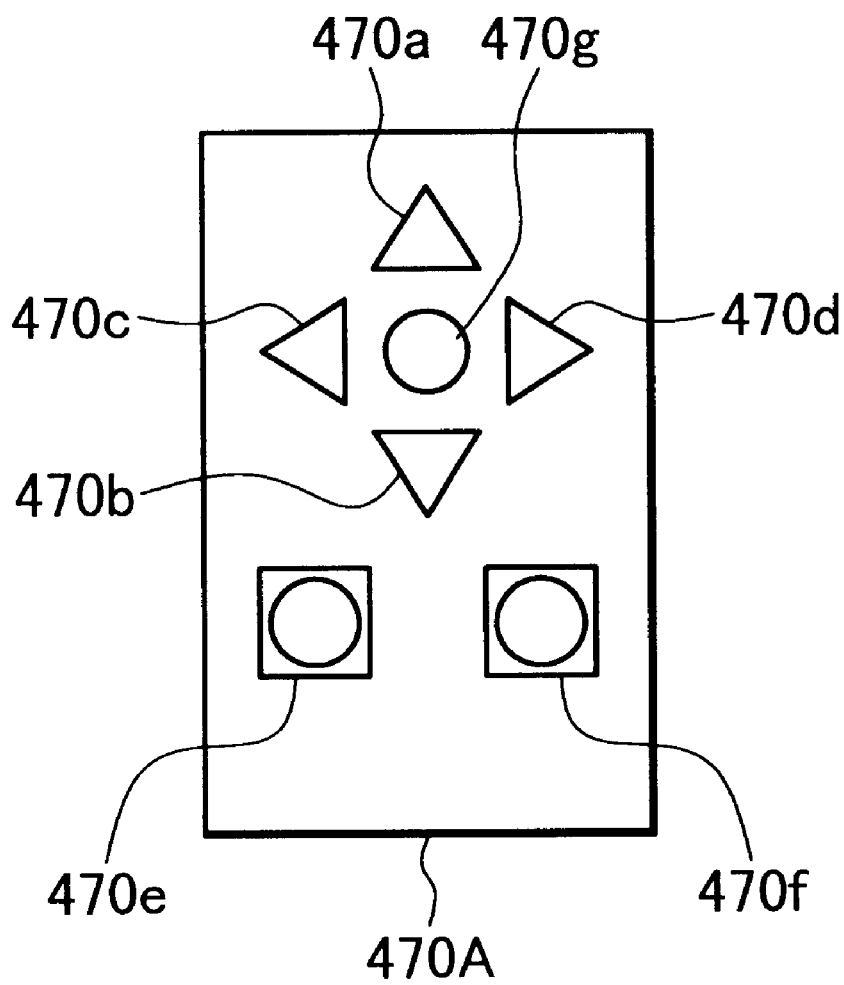
FIG. 44 shows a key arrangement on an operating portion of the information display unit.

FIGS. 40 to 43 correspond respectively to FIGS. 5, 4, 6 and 7 described above in connection with the first embodiment. In FIG. 40, the screen 472a of the display portion 472 (see FIG. 2) displays a screen image comprising one main screen 3001 and sub-screens 4001, 4002, 4003, 4004 in the same number as the information categories. In FIG. 41, the screen 472a displays a screen image comprising one main screen 3002 and sub-screens 4003, 4004, 4005, 4006 in the same number as the information categories. In FIG. 42, the screen 472a displays a screen image comprising one main screen 3003 and sub-screens 4001, 4004, 4006, 4007 in the same number as the information categories. In FIG. 43, the screen 472a displays a screen image comprising one main screen 3004 and sub-screens 4001, 4003, 4006, 4008 in the same number as the information categories. The main screens 3001 to 3004 are each not defined by definite boundary lines, and a screen area other than the sub-screens serves as a main screen area.

It is assumed that, as with the second embodiment, four categories, i.e., the meter information (category A), the body attitude information (category B), the working information (category C), and the abnormality warning information (category D), are set as the information categories to be displayed, and that the body attitude information of category B and the working information of category C have respective sub-categories similarly to the second embodiment.

The main screens 3001 to 3004 display information of the categories A to D in detail, respectively.

The sub-screens 4002, 4005, 4007, 4008 corresponding to the information categories, for which information is displayed in detail in the main screens 3001 to 3004, display the names of the corresponding information categories. The other sub-screens 4001, 4003, 4004 (FIG. 40), 4003, 4004, 4006 (FIG. 41), 4001, 4004, 4006 (FIG. 42), and 4001, 4003, 4006 (FIG. 43) display information of the corresponding information categories in the simplified form.

More specifically, the sub-screen 4002 in FIG. 40 displays characters "Body Attitude" of the information category B, and the sub-screens 4001, 4003, 4004 display respectively the meter information, the working information and the abnormality warning information in the simplified form. The sub-screen 4005 in FIG. 41 displays characters "Meter Information" of the information category A, and the sub-screens 4003, 4004, 4006 display respectively the working information, the abnormality warning information and the body attitude information in the simplified form. The sub-screen 4007 in FIG. 42 displays characters "Working Information" of the information category C, and the sub-screens 4001, 4004, 4006 display respectively the meter information, the abnormality warning information and the body attitude information in the simplified form. The sub-screen 4008 in FIG. 43 displays characters "Failure History" of the information category D, and the sub-screens 4001, 4003, 4006 display respectively the meter information, the working information and the body attitude information in the simplified form.

Further, in FIGS. 40 to 43, a cursor 3080 is displayed to be positioned in the sub-screens 4002, 4005, 4007, 4008 in which the names of the corresponding information categories are displayed. In the illustrated example, the cursor 3080 is displayed in the form of an image in which each of the sub-screens 4002, 4005, 4007, 4008 is trimmed with thick lines. Alternatively, the cursor may be displayed by blinking the sub-screens 4002, 4005, 4007, 4008, or by changing the color tone of the sub-screens 4002, 4005, 4007, 4008 so that each sub-screen can be discriminated from the other area.

Which one of the main screens 3001 to 3004 is selected (i.e., which one of the information categories is displayed on the main screen in detail) is decided by moving the cursor 3080. The operator is able to move the cursor 3080 using an operating portion 470A shown in FIG. 44. The operating portion 470A is the same as the operating portion 470 shown in FIG. 2 except that a decision key 470g is additionally provided at the center of the arrow keys 470a, 470b, 470c, 470d. Arrows indicated in the arrow keys 470a, 470b, 470c, 470d correspond to respective directions in which the cursor 3080 is moved.

Figure 45:
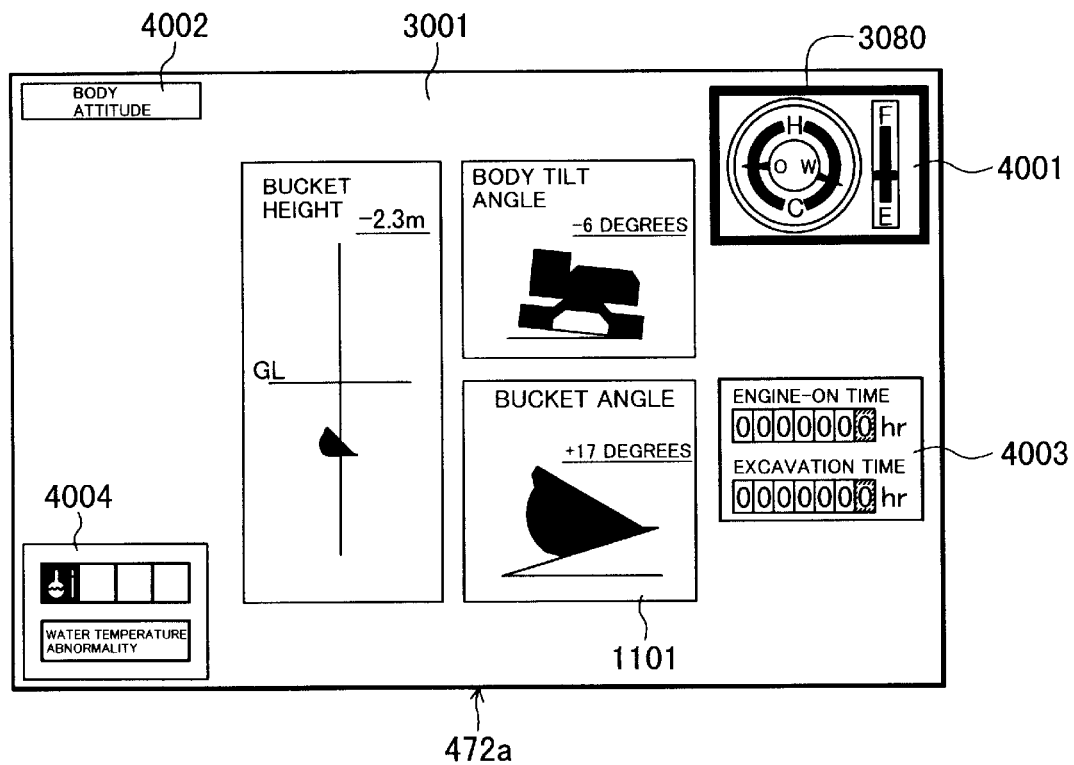
FIG. 45 shows still another example of the screen image displayed on the information display unit in a state in which a cursor is moved to another sub-screen in the screen image of FIG. 40.

Manipulations made by the operator for changing and selecting the main screen (information category displayed in detail) will be described with reference to FIGS. 45 to 47.

A description is first made of the case of changing the screen image from one shown in FIG. 40 to another shown in FIG. 41.

In FIG. 40, the cursor 3080 is positioned in the sub-screen 4002 as described above. When the operator depresses the rightward arrow key 470d on the operating portion 470A in that condition, the cursor 3080 is moved to the sub-screen 4001 as shown in FIG. 45. When the operator depresses the decision key 470g on the operating portion 470A in that condition, the displayed screen image is changed as shown in FIG. 41. Specifically, the main screen 3001 is changed to the main screen 3002. At the same time, the sub-screen 4002 that has been so far displayed is changed to the sub-screen 4005, the sub-screen 4001 disappears, and the sub-screen 4006 appears. Further, the cursor 3080 is moved to the sub-screen 4005.

Change from the screen image shown in FIG. 40 to that shown in each of FIGS. 42 and 43 is performed in a similar manner.

Figure 46:
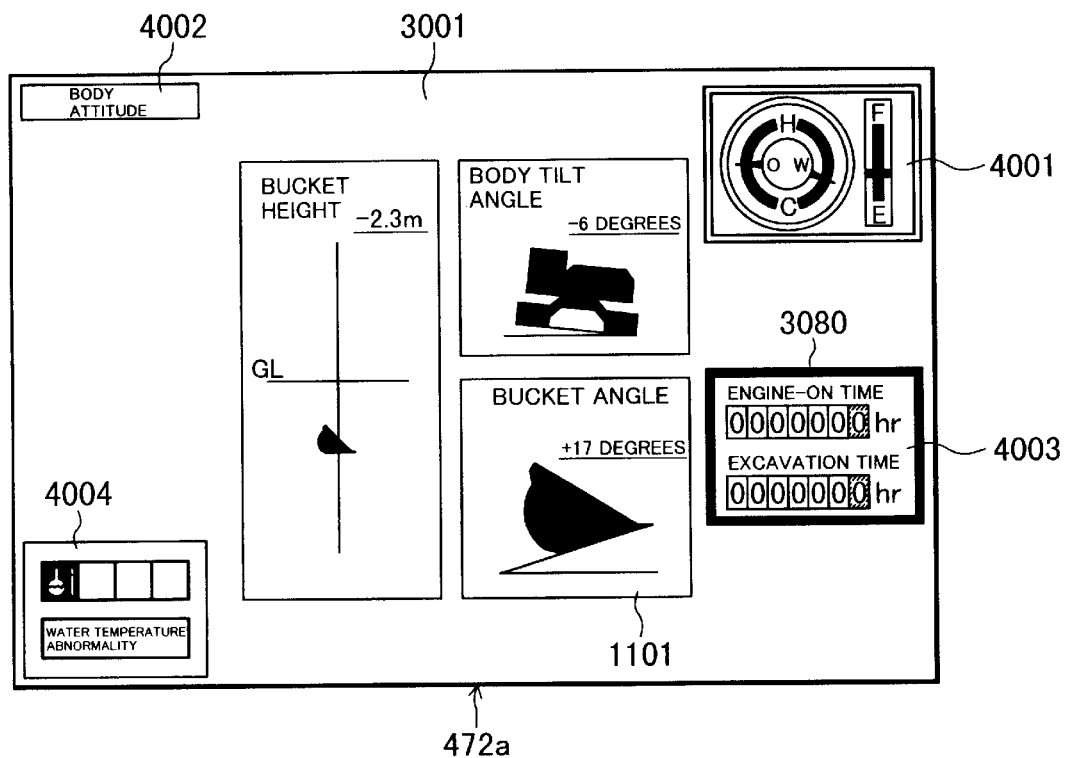
FIG. 46 shows still another example of the screen image displayed on the information display unit in a state in which a cursor is moved to still another sub-screen in the screen image of FIG. 40.

More specifically, when the operator depresses the rightward arrow key 470d on the operating portion 470A and then the downward arrow key 470b in the screen condition shown in FIG. 40, the cursor 3080 is moved to the sub-screen 4003 as shown in FIG. 46. When the operator depresses the decision key 470g on the operating portion 470A in that condition, the screen image is changed as shown in FIG. 42. Specifically, the main screen 3001 is changed to the main screen 3003. At the same time, the sub-screen 4002 that has been so far displayed is changed to the sub-screen 4007, the sub-screen 4003 disappears, and the sub-screen 4006 appears. Further, the cursor 3080 is moved to the sub-screen 4007.

Figure 47:
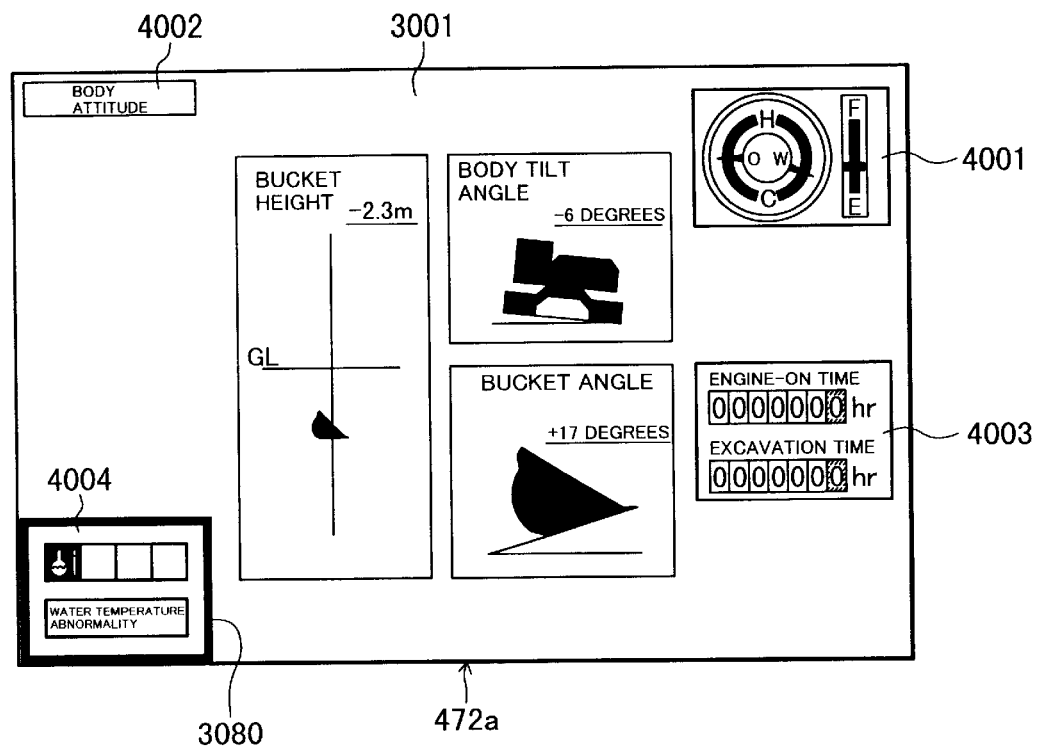
FIG. 47 shows still another example of the screen image displayed on the information display unit in a state in which a cursor is moved to still another sub-screen in the screen image of FIG. 40.

Also, when the operator depresses the downward arrow key 470b on the operating portion 470A in the screen condition shown in FIG. 40, the cursor 3080 is moved to the sub-screen 4004 as shown in FIG. 47. When the operator depresses the decision key 470g on the operating portion 470A in that condition, the screen image is changed as shown in FIG. 43. Specifically, the main screen 3001 is changed to the main screen 3004. At the same time, the sub-screen 4002 that has been so far displayed is changed to the sub-screen 4008, the sub-screen 4004 disappears, and the sub-screen 4006 appears. Further, the cursor 3080 is moved to the sub-screen 4008.

A description is now made of procedures for selecting and changing the sub-categories of the category B and the category C.

Figure 48:
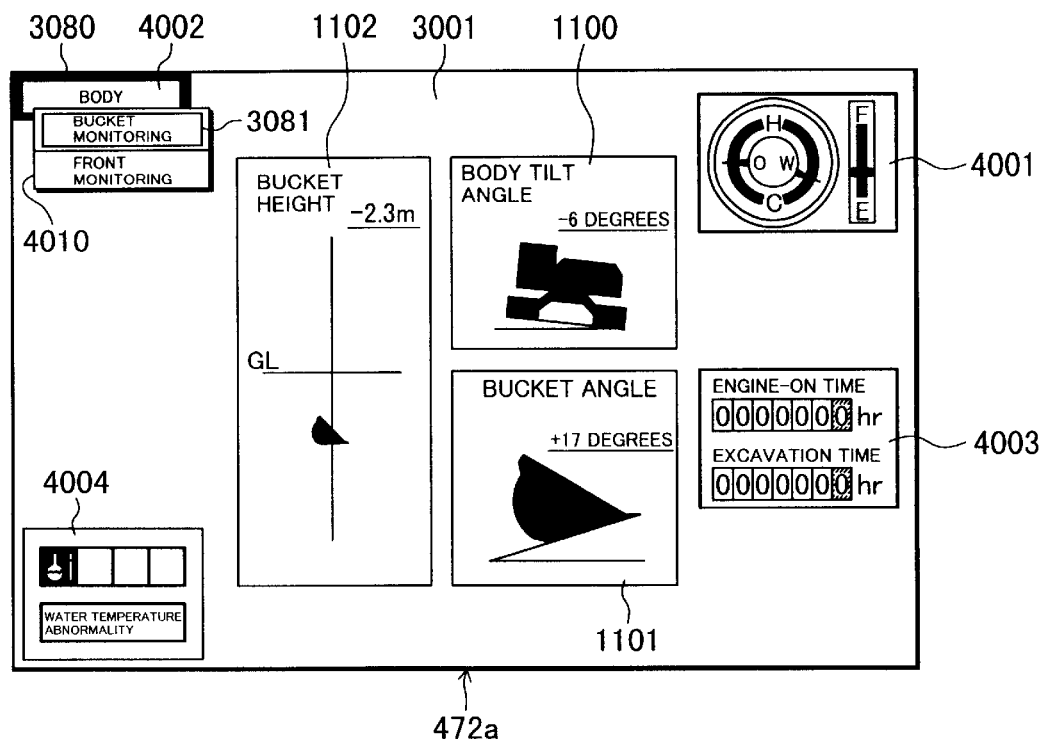
FIG. 48 shows still another example of the screen image displayed on the information display unit in a state in which a menu screen for a sub-screen has appeared on the screen image of FIG. 40.

FIG. 48 shows a state after shifting to the sub-category (hierarchy 2) of the category B from the screen image of FIG. 40 in which the body attitude information of the category B is displayed on the main screen 3001. When the operator depresses the decision key 470g on the operating operation 470A in the screen condition shown in FIG. 40, the screen image is changed, as shown in FIG. 48, such that a menu screen 4010 for the sub-categories appears in a partly overlapped relation to the sub-screen 4002. The menu screen 4010 has two items "Bucket Monitoring" and "Front Monitoring". "Bucket Monitoring" corresponds to the information of the bucket attitude and body attitude 1100, 1101, 1102 that are currently displayed on the main screen 3001. "Front Monitoring" corresponds to the information of the working device attitude 1103 shown in FIG. 16. Further, a sub-cursor 3081 is positioned at the item "Bucket Monitoring" to indicate that the body attitude information currently displayed on the main screen 3001 is the information of the bucket attitude and body attitude 1100, 1101, 1102.

Figure 49:
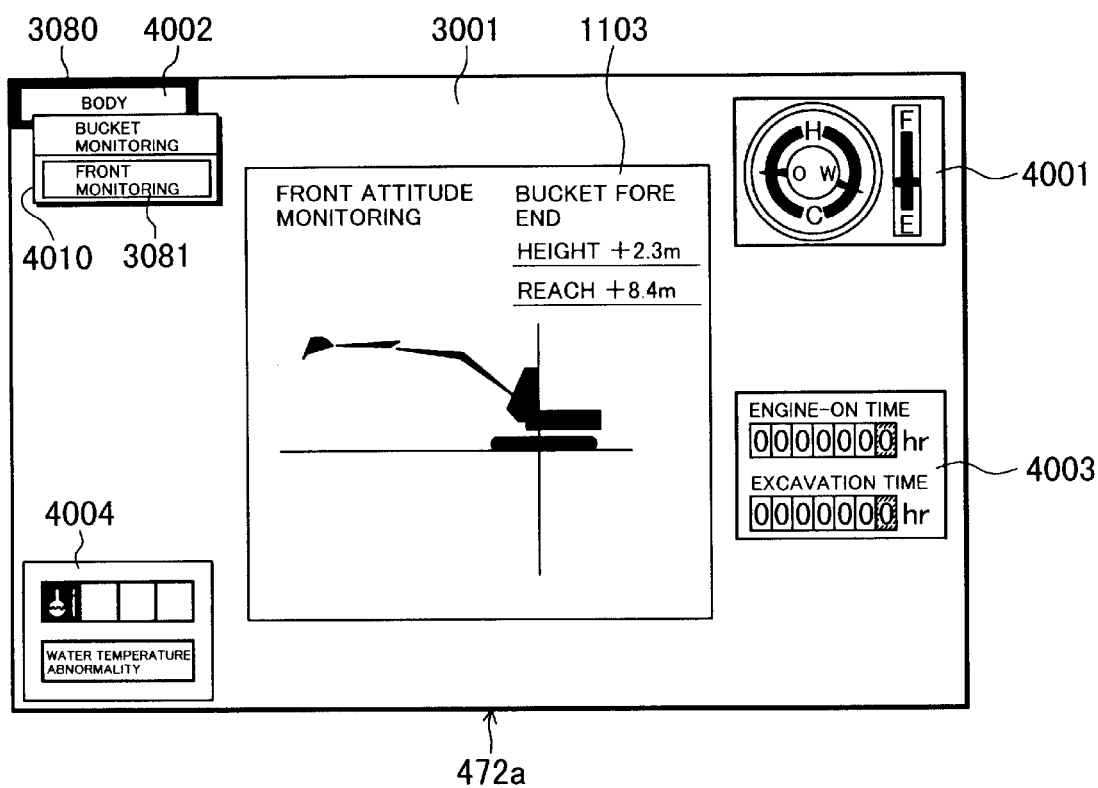
FIG. 49 shows still another example of the screen image displayed on the information display unit when a main screen displaying, as body attitude information, working device attitude information is selected upon manipulation made on the menu screen for the sub-screen in the screen image of FIG. 48.

When the operator depresses the downward arrow key 470b on the operating portion 470A in the screen condition shown in FIG. 48, the screen image is changed as shown in FIG. 49. Specifically, the sub-cursor 3081 in the menu screen 4010 is moved from the item "Bucket Monitoring" to "Front Monitoring", and the information of the working device attitude 1103 is displayed on the main screen 3001.

Figure 50:
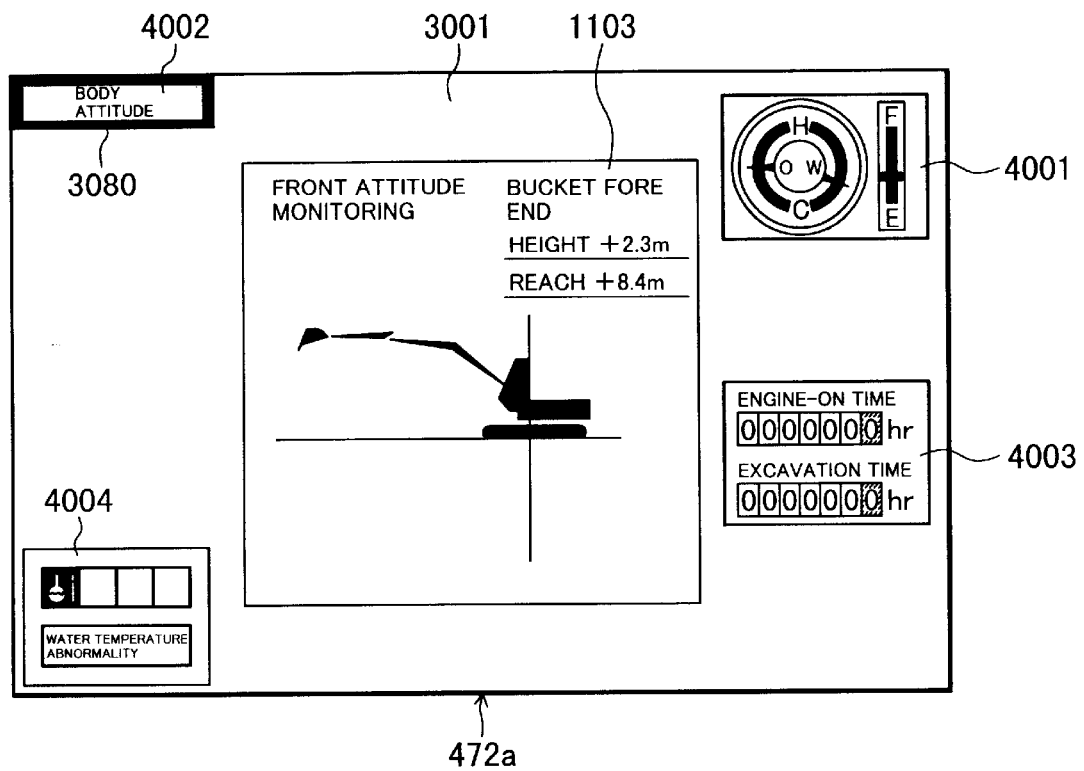
FIG. 50 shows still another example of the screen image displayed on the information display unit in a state in which the menu screen for the sub-screen has disappeared from the screen image of FIG. 49.

When the operator depresses the decision key 470g on the operating portion 470A in the screen condition shown in FIG. 49, the screen image is changed as shown in FIG. 50. Specifically, the menu screen 4010 for the sub-categories disappears, and only the sub-screen 4002 is displayed. Comparing FIG. 50 with FIG. 40, the body attitude information displayed on the main screen 3001 is changed from the bucket attitude and body attitude information 1100, 1101, 1102 to the working device attitude information 1103.

Figure 51:
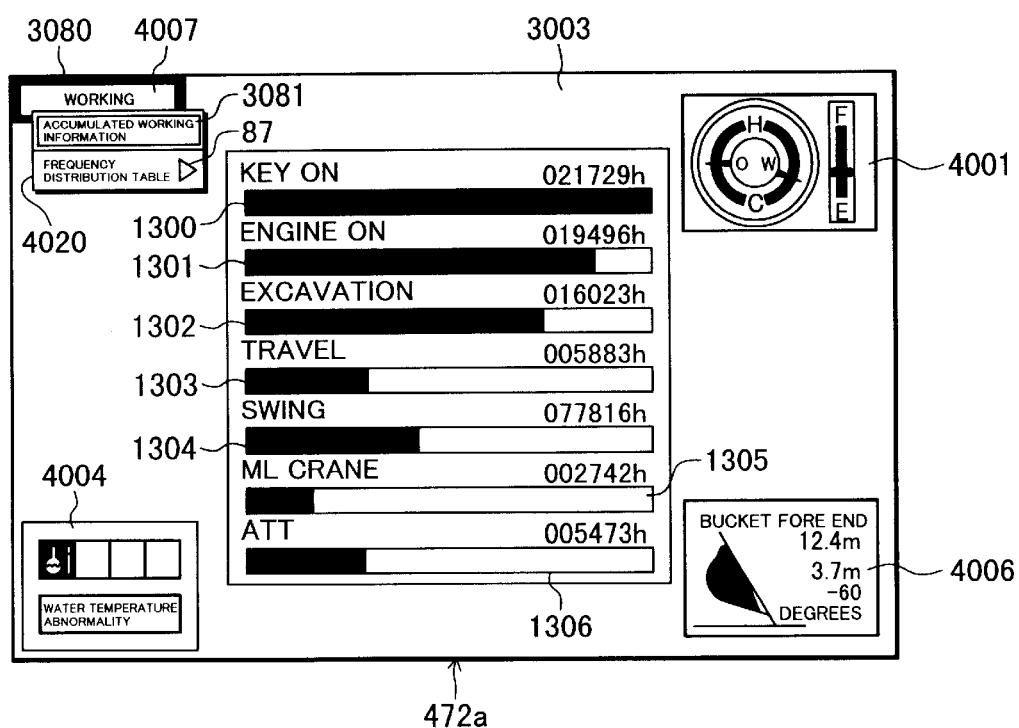
FIG. 51 shows still another example of the screen image displayed on the information display unit in a state in which the menu screen for the sub-screen has appeared on the screen image of FIG. 42.

FIG. 51 shows a state after shifting to the sub-category (hierarchy 2) of the category C from the screen image of FIG. 42 in which the working information (working time information) of the category C is displayed on the main screen 3003. When the operator depresses the decision key 470g on the operating portion 470A in the screen condition shown in FIG. 42, the screen image is changed, as shown in FIG. 51, such that a menu screen 4020 for the sub-categories (hierarchy 2) appears in a partly overlapped relation to the sub-screen 4007. The menu screen 4020 has two items "Accumulated Working Time" and "Frequency Distribution Table". "Accumulated Working Time" corresponds to the respective information of the key-on time 1300, the engine-on time 1301, the excavation time 1302, the travel time 1303, the swing time 1304, the ML crane operating time 1305, and the attachment operating time 1306 that are currently displayed on the main screen 3003. "Frequency Distribution Table" corresponds to the respective information of the engine revolution speed frequency distribution 1307, the cooling water temperature frequency distribution 1308, the hydraulic fluid temperature frequency distribution 1309, the excavation load frequency distribution 1310, and the pump load frequency distribution 1311 that are shown in FIGS. 18 to 22. Further, the sub-cursor 3081 is positioned at the item "Accumulated Working Time" to indicate that the working information currently displayed on the main screen 3003 is the accumulated working time information 1300 to 1306. A symbolic illustration 87 for operation guide is displayed at the item "Frequency Distribution Table", and is designed in imitation of the leftward key arrow 470d on the operating portion 470A.

Figure 52:
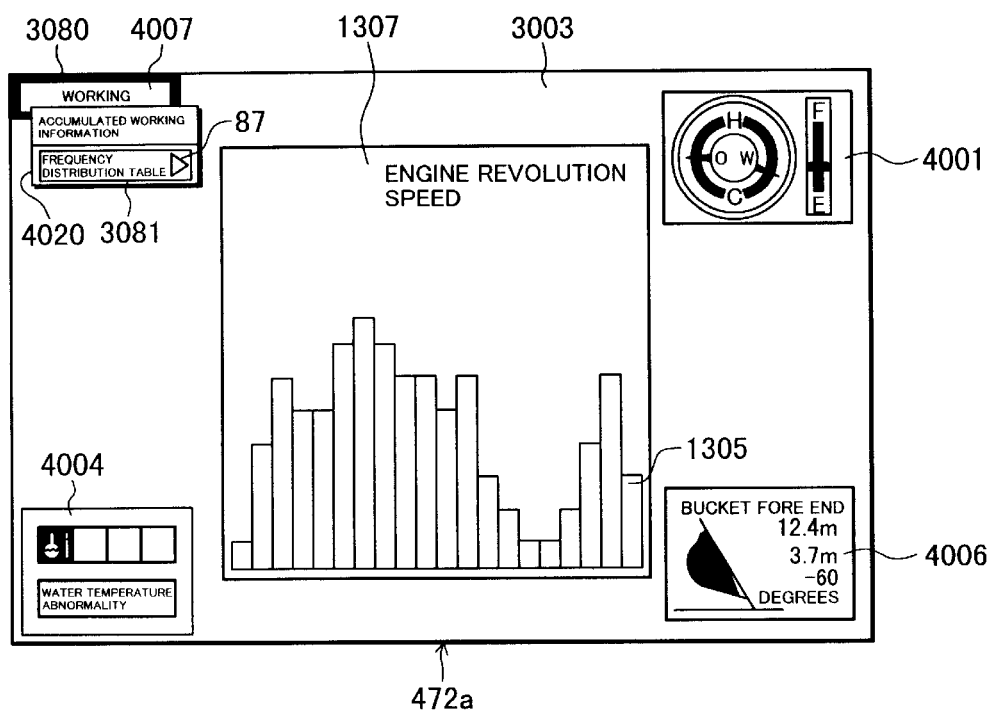
FIG. 52 shows still another example of the screen image displayed on the information display unit when a main screen displaying, as working information, a frequency distribution table is selected upon manipulation made on the menu screen for the sub-screen in the screen image of FIG. 51.

When the operator depresses the downward arrow key 470b on the operating portion 470A in the screen condition shown in FIG. 51, the screen image is changed as shown in FIG. 52. Specifically, the sub-cursor 3081 in the menu screen 4020 is moved from the item "Accumulated Working Time" to "Frequency Distribution Table", and the engine revolution speed frequency distribution 1307 is displayed on the main screen 3003.

Figure 53:
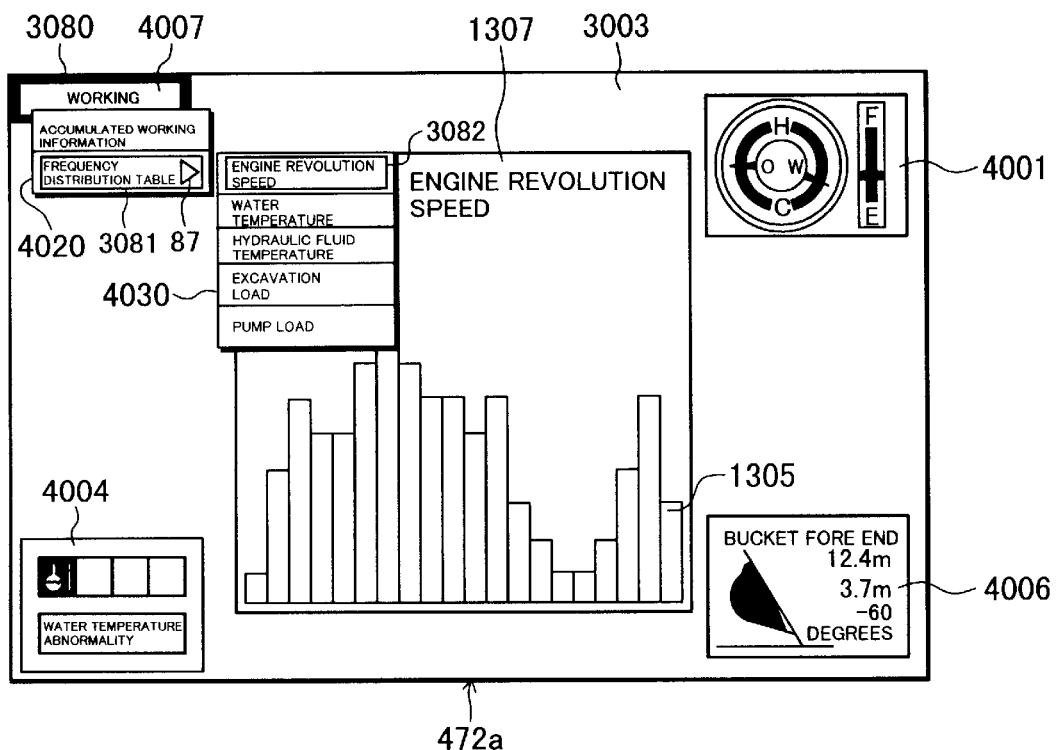
FIG. 53 shows still another example of the screen image displayed on the information display unit in a state in which a lower menu screen has appeared on the screen image of FIG. 52 upon manipulation made on the menu screen for the sub-screen.

When the operator depresses the decision key 470g on the operating portion 470A in the screen condition shown in FIG. 52, the screen image is changed as shown in FIG. 53. Specifically, a menu screen 4030 for lower sub-categories (hierarchy 3) appears on the right side of the item "Frequency Distribution Table" in the menu screen 4020. The menu screen 4030 has items "Engine Revolution Speed", "Water Temperature", "Hydraulic Fluid Temperature", "Excavation Load", and "Pump Load". These items correspond respectively to the engine revolution speed frequency distribution 1307, the cooling water temperature frequency distribution 1308, the hydraulic fluid temperature frequency distribution 1309, the excavation load frequency distribution 1310, and the pump load frequency distribution 1311 that are shown in FIGS. 18 to 22. Further, the sub-cursor 3082 is positioned at the item "Engine Revolution Speed" to indicate that the frequency distribution table displayed on the main screen 3003 is the engine revolution speed frequency distribution 1307.

Figure 54:
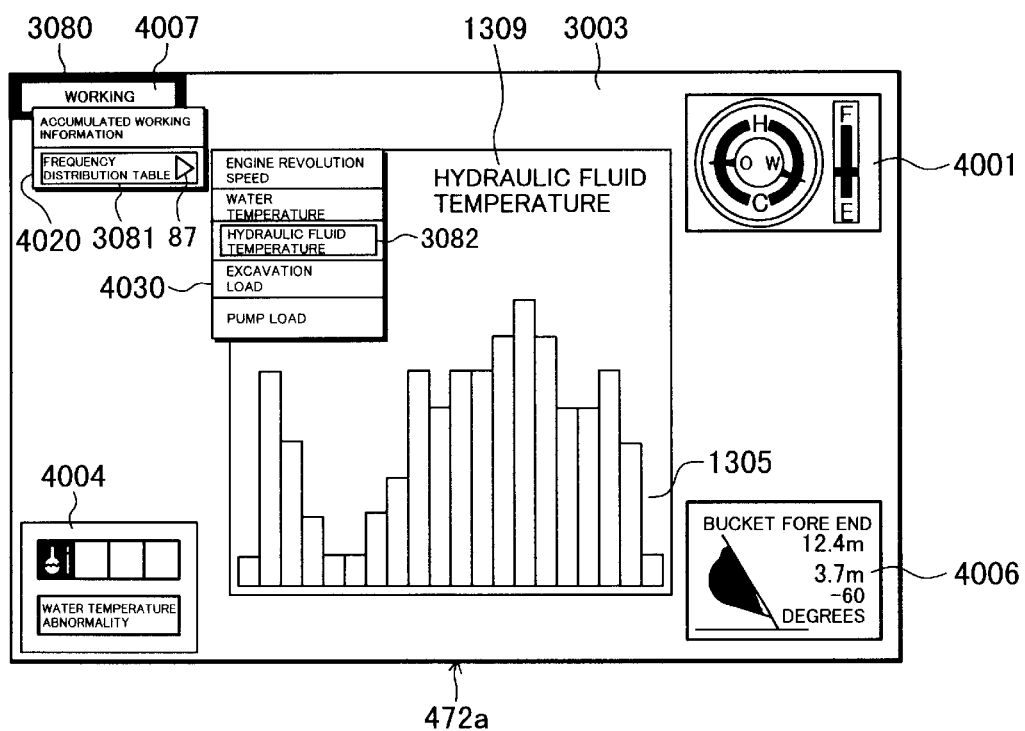
FIG. 54 shows still another example of the screen image displayed on the information display unit when a main screen displaying, as a frequency distribution table, a hydraulic fluid temperature distribution is selected upon manipulation made on a lower menu screen in the screen image of FIG. 53.

When the operator depresses the downward arrow key 470b on the operating portion 470A twice in the screen condition shown in FIG. 53, the screen image is changed as shown in FIG. 54. Specifically, the sub-cursor 3082 in the menu screen 4030 is moved from the item "Engine Revolution Speed" to "Hydraulic Fluid Temperature", and the hydraulic fluid temperature frequency distribution 1309 is displayed on the main screen 3003.

Figure 55:
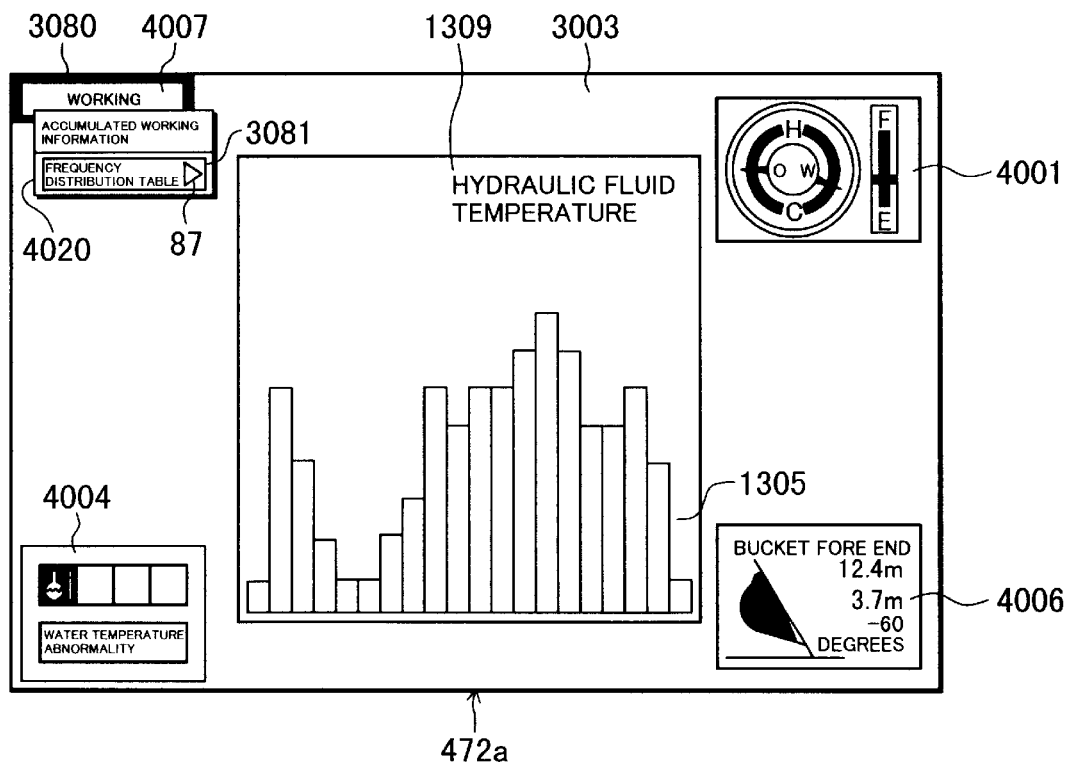
FIG. 55 shows still another example of the screen image displayed on the information display unit in a state in which the lower menu screen has disappeared from the screen image of FIG. 54.

When the operator depresses the decision key 470g on the operating portion 470A in the screen condition shown in FIG. 54, the screen image is changed as shown in FIG. 55. Specifically, the menu screen 4030 for lower sub-categories of the hierarchy 3 disappears, and the sub-screen 4007 and the menu screen 4020 for the hierarchy 2 are displayed. Comparing FIG. 55 with FIG. 52, the working information displayed on the main screen 3003 is changed from the engine revolution speed frequency distribution 1307 to the hydraulic fluid temperature frequency distribution 1309.

Figure 56:
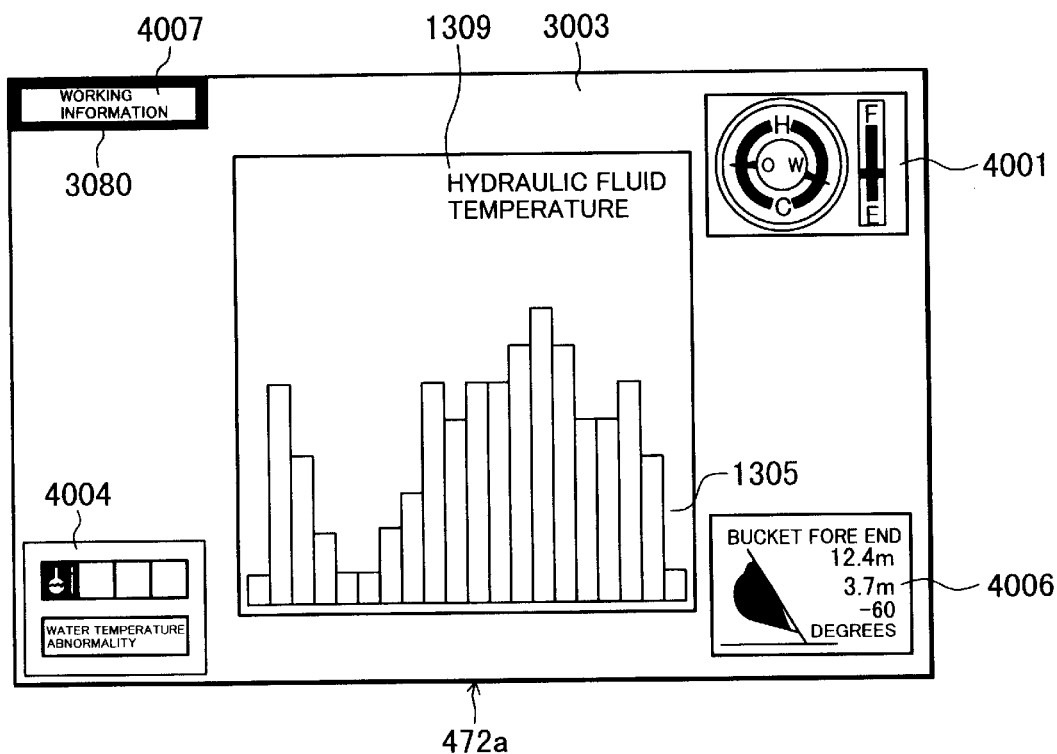
FIG. 56 shows still another example of the screen image displayed on the information display unit in a state in which the menu screen for the sub-screen has disappeared from the screen image of FIG. 55.

When the operator depresses the decision key 470g on the operating portion 470A in the screen condition shown in FIG. 55, the screen image is changed as shown in FIG. 56. Specifically, the menu screen 4020 for the sub-categories disappears, and only the sub-screen 4007 is displayed. Comparing FIG. 56 with FIG. 42, the working information displayed on the main screen 3003 is changed to the hydraulic fluid temperature frequency distribution 1309 from the respective information of the key-on time 1300, the engine-on time 1301, the excavation time 1302, the travel time 1303, the swing time 1304, the ML crane operating time 1305, and the attachment operating time 1306.

This fourth embodiment having the above-described construction can also provide the similar advantages to those obtainable with the first and second embodiments.

In the fourth embodiment, when the main screens 3001 to 3004 is changed from one to another, the sub-screens 4002, 4005, 4007, 4008 each displaying the name of the information category, for which information is displayed in detail in corresponding one of the main screens 3001 to 3004, are always displayed in the same upper left position of the screen image, and the sub-screens 4001, 4003, 4004, 4006 each displaying the information in the simplified form, other than the information category, for which information is displayed in detail in corresponding one of the main screens 3001 to 3004, are always displayed in the same respective positions for every category. However, display positions of those sub-screens may be changed as appropriate. For example, when the screen image of FIG. 54 is changed to the screen image of FIG. 41 with depression of the decision key 470g, the sub-screen 4006 displaying the body attitude information of the category B in the simplified form may be displayed in the position at which the sub-screen 4001 displaying the meter information of the category A in the simplified form has been so far displayed. Alternatively, it may be displayed in a place where a free widest space is available in the entirety of the screen image, after seeking such a place.

Further, positions of the sub-screens 4001 to 4008 may be moved with proper combination of key manipulations made on the operating portion 470A in a like manner to dragging common in computer operations.

Additionally, in the first to fourth embodiments described above, the plurality of sub-screens are provided respectively corresponding to the plurality of information categories A, B, C, D. However, since the sub-screen corresponding to the information category, for which information is displayed in detail in the main screen, is mainly intended to display the name of the information category, only character information may be displayed instead of displaying the sub-screen in the form of a rimmed box.

Industrial Applicability

According to the present invention, plural kinds of information can be displayed in a combined and selective manner, and an operator is able to confirm the information with higher efficiency.

What is claimed is:

1. An information display unit for a construction machine, said information display unit being provided inside a cab (6) of a construction machine (1) and having a display portion (472, 472a) capable of displaying plural kinds of information including body information and maintenance information, wherein a screen image displayed on said display portion (472, 472a) comprises one main screen (1001–1004; 3001–3004) and a plurality of sub-screens (2001–2008; 4001–4008);

said main screen displays information regarding one of a plurality of information categories (A, B, C, D) in detail;

said plurality of sub-screens correspond to at least the information categories other than the information category, for which information is displayed on said main screen in detail, and display information regarding the corresponding information categories in the simplified form; and input means (470) for selecting and changing the information category to be displayed on said main screen is provided, whereby with manipulation of said input means, information regarding the category displayed in one of said plurality of sub-screens is displayed on said main screen in detail and information regarding the category, which has been so far displayed on said main screen, is displayed in arbitrary one of said plurality of sub-screens in the simplified form.

2. An information display unit for a construction machine according to claim 1, wherein said main screen (1001–1004; 3001–3004) has a size occupying a substantial proportion of said display portion (472, 472a), and said plurality of sub-screens (2001–2008; 4001–4008) are smaller than said main screen.

3. An information display unit for a construction machine according to claim 1, wherein said plurality of sub-screens (2001–2008; 4001–4008) display typical information contained in the corresponding information category.

4. An information display unit for a construction machine according to claim 1, wherein at least one (B, C) of said plurality of information categories (A, B, C, D) includes combination of plural items of sub-category information belonging to the relevant information category, said main screen (1001, 1003; 3001, 3003) selectively displays at least one of said plural items of sub-category information, and the sub-category information displayed on said main screen is selected and changed with manipulation of said input means (470).

5. An information display unit for a construction machine according to claim 1, wherein a screen image displayed on said display portion (472, 472a) has a main display area (1000) and a sub-display area (2000) that are located in preset positions, said main display area displaying said main screen (1001–1004), said sub-display area (2000) displaying said plurality of sub-screens (2001–2008), and said plurality of sub-screens are disposed respectively corresponding to said plurality of information categories (A, B, C, D).

6. An information display unit for a construction machine according to claim 5, wherein one of said sub-screens (2001–2008) in said sub-display area (2000) corresponding to one of said information categories (A, B, C, D), for which information is displayed on said main screen (1001–1004) in said main display area (1000) in detail, displays symbolic illustrations (80, 81) for operation guide, which are in imitation of arrow keys and serve as aids for changing said information categories (A, B, C, D) from one to another with manipulation of said input means (470).

7. An information display unit for a construction machine according to claim 5, wherein said plurality of sub-screens (2001–2008) in said sub-display area (2000) serve as index tags for said information categories (A, B, C, D) displayed on said main screen (1001–1004) in said main display area (1000), and are designed with layout in imitation of index tags for said main display area.

8. An information display unit for a construction machine according to claim 5, wherein at least one (B, C) of said plurality of information categories (A, B, C, D) includes combination of plural items of sub-category information belonging to the relevant information category, and said main screen (1001, 1003) in said main display area (1000) selectively displays at least one of said plural items of sub-category information; and wherein the sub-category information displayed on said main screen is selected and changed with manipulation of said input means (470).

9. An information display unit for a construction machine according to claim 8, wherein when at least one of said plural items of sub-category information is displayed on said main screen (1001, 1003) in said main display area (1000), one of said sub-screens (2002, 2007) in said sub-display area (2000) corresponding to the information category, to which the displayed sub-category information belongs, displays symbolic illustrations (80, 81) for operation guide, which are in imitation of arrow keys and serve as aids for changing the information category with manipulation of said input means (470), and said one sub-screen and said main display area display symbolic illustrations (82, 85) for operation guide, which are in imitation of arrow keys and serve as aids for changing the sub-category information with manipulation of said input means.

10. An information display unit for a construction machine according to claim 1, wherein said plurality of information categories include at least meter information and abnormality warning information (D).

11. A display control unit for an information display unit (47) for a construction machine, said information display unit being provided inside a cab (6) of a construction machine (1) and having a display portion (472, 472a) capable of displaying plural kinds of information including body information and maintenance information, said display control unit comprising:

processing control means (470, STEP 1004, 1005, 1006) for performing control such that a screen image displayed on said display portion (472, 472a) of said information display unit (47) comprises one main screen (1001–1004; 3001–3004) and a plurality of sub-screens (2001–2008; 4001–4008), said main screen displays information regarding one of a plurality of information categories (A, B, C, D) in detail, and said plurality of sub-screens correspond to at least the information categories other than the information category, for which information is displayed on said main screen in detail, and display information regarding the corresponding information categories in the simplified form; and changing means (470, STEP 1002, 1003) operating such that when input means (470) for selecting the information category to be displayed on said main screen is manipulated, information regarding the category displayed in one of said plurality of sub-screens is displayed on said main screen in detail and information regarding the category, which has been so far displayed on said main screen, is displayed in arbitrary one of said plurality of sub-screens in the simplified form.

* * * * *